US009384904B2

(12) United States Patent
Inoue et al.

(10) Patent No.: US 9,384,904 B2
(45) Date of Patent: Jul. 5, 2016

(54) NEGATIVE ELECTRODE FOR POWER STORAGE DEVICE, METHOD FOR FORMING THE SAME, AND POWER STORAGE DEVICE

(71) Applicant: SEMICONDUCTOR ENERGY LABORATORY CO., LTD., Atsugi-shi, Kanagawa-ken (JP)

(72) Inventors: Nobuhiro Inoue, Kanagawa (JP); Sachiko Kataniwa, Tochigi (JP); Kazutaka Kuriki, Kanagawa (JP); Junpei Momo, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 0 days.

(21) Appl. No.: 13/792,598

(22) Filed: Mar. 11, 2013

(65) Prior Publication Data

US 2013/0266858 A1 Oct. 10, 2013

(30) Foreign Application Priority Data

Apr. 6, 2012 (JP) ................................. 2012-087116

(51) Int. Cl.
 *H01M 4/02* (2006.01)
 *H01G 11/28* (2013.01)
 *H01M 4/62* (2006.01)
 *H01G 11/50* (2013.01)

(52) U.S. Cl.
 CPC ............... *H01G 11/28* (2013.01); *H01G 11/50* (2013.01); *H01M 4/628* (2013.01); *Y02E 60/13* (2013.01); *Y02T 10/7022* (2013.01)

(58) Field of Classification Search
 CPC ........................................................ H01M 4/02

USPC ......................................................... 429/211
See application file for complete search history.

(56) References Cited

U.S. PATENT DOCUMENTS 5,015,547 A 5/1991 Koshiba et al.
5,338,625 A 8/1994 Bates et al.
(Continued)

FOREIGN PATENT DOCUMENTS

JP 04-080331 A 3/1992
JP 11-060385 A 3/1999
(Continued)

OTHER PUBLICATIONS

International Search Report (Application No. PCT/JP2013/060263; PCT16794) Dated Jun. 25, 2013.
(Continued)

*Primary Examiner* — Jacob Marks
(74) *Attorney, Agent, or Firm* — Nixon Peabody LLP; Jeffrey L. Costellia

(57) ABSTRACT

An object is to suppress electrochemical decomposition of an electrolyte solution and the like at a negative electrode in a lithium ion battery or a lithium ion capacitor; thus, irreversible capacity is reduced, cycle performance is improved, or operating temperature range is extended. A negative electrode for a power storage device including a negative electrode current collector, a negative electrode active material layer which is over the negative electrode current collector and includes a plurality of particles of a negative electrode active material, and a film covering part of the negative electrode active material. The film has an insulating property and lithium ion conductivity.

8 Claims, 32 Drawing Sheets

(56) References Cited

U.S. PATENT DOCUMENTS

| | | | |
|---|---|---|---|
| 6,063,142 A | 5/2000 | Kawakami et al. |
| 6,218,050 B1 | 4/2001 | Yoon et al. |
| 6,333,128 B1 | 12/2001 | Sunagawa et al. |
| 6,641,955 B1 | 11/2003 | Matsubara et al. |
| 6,685,804 B1 | 2/2004 | Ikeda et al. |
| 6,828,063 B2 | 12/2004 | Park et al. |
| 6,887,511 B1 | 5/2005 | Shima et al. |
| 7,179,561 B2 | 2/2007 | Niu et al. |
| 7,192,673 B1 | 3/2007 | Ikeda et al. |
| 7,235,330 B1 | 6/2007 | Fujimoto et al. |
| 7,241,533 B1 | 7/2007 | Ikeda et al. |
| 7,285,359 B2 | 10/2007 | Yamamoto et al. |
| 7,410,728 B1 | 8/2008 | Fujimoto et al. |
| 7,745,047 B2 | 6/2010 | Zhamu et al. |
| 7,781,101 B2 | 8/2010 | Okazaki et al. |
| 7,794,881 B1 | 9/2010 | Fujimoto et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,080,337 B2 | 12/2011 | Higuchi et al. |
| 8,278,011 B2 | 10/2012 | Zhu et al. |
| 8,399,132 B2 | 3/2013 | Park |
| 2002/0168574 A1 | 11/2002 | Ahn et al. |
| 2004/0101761 A1 | 5/2004 | Park et al. |
| 2004/0126659 A1 | 7/2004 | Graetz et al. |
| 2005/0008935 A1 | 1/2005 | Skotheim et al. |
| 2006/0040182 A1 | 2/2006 | Kawakami et al. |
| 2007/0007239 A1 | 1/2007 | Lee et al. |
| 2007/0092797 A1 | 4/2007 | Konishiike et al. |
| 2008/0003503 A1 | 1/2008 | Kawakami et al. |
| 2008/0254296 A1 | 10/2008 | Handa et al. |
| 2009/0029245 A1* | 1/2009 | Ibaragi et al. ............. 429/176 |
| 2009/0029264 A1 | 1/2009 | Nakazawa et al. |
| 2009/0092892 A1* | 4/2009 | Yamaguchi et al. ......... 429/125 |
| 2009/0136847 A1 | 5/2009 | Jeong et al. |
| 2009/0169996 A1 | 7/2009 | Zhamu et al. |
| 2009/0214958 A1* | 8/2009 | Park .......................... 429/324 |
| 2009/0311608 A1 | 12/2009 | Hirose et al. |
| 2010/0143798 A1 | 6/2010 | Zhamu et al. |
| 2010/0176337 A1 | 7/2010 | Zhamu et al. |
| 2010/0209784 A1 | 8/2010 | Yamazaki et al. |
| 2010/0248034 A1 | 9/2010 | Oki et al. |
| 2010/0310908 A1* | 12/2010 | Zhang et al. ................ 429/90 |
| 2010/0330421 A1 | 12/2010 | Cui et al. |
| 2011/0012067 A1 | 1/2011 | Kay |
| 2011/0052997 A1 | 3/2011 | Kim et al. |
| 2011/0084229 A1 | 4/2011 | Kawakami et al. |
| 2011/0097627 A1* | 4/2011 | Watanabe et al. ............. 429/206 |
| 2011/0111303 A1 | 5/2011 | Kung et al. |
| 2011/0121240 A1 | 5/2011 | Amine et al. |
| 2011/0151290 A1 | 6/2011 | Cui et al. |
| 2011/0159372 A1 | 6/2011 | Zhamu et al. |
| 2011/0177396 A1 | 7/2011 | Moriwaka et al. |
| 2011/0229795 A1 | 9/2011 | Niu et al. |
| 2011/0250506 A1* | 10/2011 | Koshina ................ H01M 4/38 429/338 |
| 2011/0250509 A1 | 10/2011 | Yamaguchi et al. |
| 2011/0266654 A1 | 11/2011 | Kuriki et al. |
| 2011/0291240 A1 | 12/2011 | Yamazaki |
| 2012/0045692 A1 | 2/2012 | Takemura et al. |
| 2012/0141866 A1 | 6/2012 | Kuriki et al. |
| 2012/0328956 A1 | 12/2012 | Oguni et al. |
| 2013/0052528 A1 | 2/2013 | Kuriki et al. |
| 2013/0164619 A1 | 6/2013 | Yamakaji et al. |
| 2013/0230772 A1 | 9/2013 | Noda et al. |
| 2013/0323585 A1 | 12/2013 | Inoue et al. |

FOREIGN PATENT DOCUMENTS

| | | |
|---|---|---|
| JP | 11-096993 | 4/1999 |
| JP | 2001-210315 A | 8/2001 |
| JP | 2004-014381 | 1/2004 |
| JP | 2004-281317 A | 10/2004 |
| JP | 2004-303593 A | 10/2004 |
| JP | 2005-272983 A | 10/2005 |
| JP | 2005-302510 | 10/2005 |
| JP | 2005-332769 | 12/2005 |
| JP | 2006-059641 | 3/2006 |
| JP | 2006-265751 A | 10/2006 |
| JP | 2007-005201 A | 1/2007 |
| JP | 2009-164014 A | 7/2009 |
| JP | 2009-524567 | 7/2009 |
| JP | 2009-176721 A | 8/2009 |
| JP | 2010-244847 | 10/2010 |
| JP | 2010-250968 A | 11/2010 |
| JP | 2011-503804 | 1/2011 |
| JP | 2011-517053 | 5/2011 |
| JP | 2011-159534 A | 8/2011 |
| JP | 2013-051033 | 3/2013 |
| WO | WO-2006/062947 | 6/2006 |
| WO | WO-2007/061945 | 5/2007 |
| WO | WO-2009/061685 | 5/2009 |
| WO | WO-2009/127901 | 10/2009 |
| WO | WO-2009/144600 | 12/2009 |
| WO | WO-2010/125467 | 11/2010 |
| WO | WO-2013/031709 A1 | 3/2013 |

OTHER PUBLICATIONS

Written Opinion (Application No. PCT/JP2013/060263; PCT16794) Dated Jun. 25, 2013.

Inoue.N et al., Improvement of cycle performance of lithium ion batteries at elevated temperature of 60° C. using graphite coated with metal oxide, 222nd ECS Meeting, Abstract, Oct. 7, 2012, pp. 654.

Ogumi.Z, "Lithium Secondary Battery", published on Mar. 20, 2008; Chapter 6, Negative Electrode;, pp. 116-124, Ohmsha, Ltd., Japan.

Inoue.N et al., Improvement of cycle performance of lithium ion batteries at elevated temperature of 60° C., 222nd ECS Meeting, Dec. 7, 2012, pp. 654.

Zhou.X et al., "Graphene modified LiFePO4 cathode materials for high power lithium ion batteries", J. Mater. Chem. (Journal of Materials Chemistry), 2011, vol. 21, pp. 3353-3358.

Kohno.H et al., "Silicon Nanoneedles Grown by a Simple Thermal Treatment Using Metal-Sulfur Catalysts", Jpn. J. Appl. Phys. (Japanese Journal of Applied Physics), Feb. 1, 2002, vol. 41, No. 2A, pp. 577-578.

Kamins.T et al., "Ti-catalyzed Si nanowires by chemical vapor deposition: Microscopy and growth mechanisms", J. Appl. Phys. (Journal of Applied Physics), Jan. 15, 2001, vol. 89, No. 2, pp. 1008-1016.

Cui.L et al., "Crystalline-Amorphous Core-Shell Silicon Nanowires for High Capacity and High Current Battery Electrodes", Nano Letters, 2009, vol. 9, No. 1, pp. 491-495.

Su.F et al., "Flexible and planar graphene conductive additives for lithium-ion batteries", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Zempachi Ogumi et al., "6.1.6 Influence of Electrolytic Solution and Surface Film Formation", Lithium secondary battery, Mar. 20, 2008, pp. 116-124, Ohmsha.

\* cited by examiner

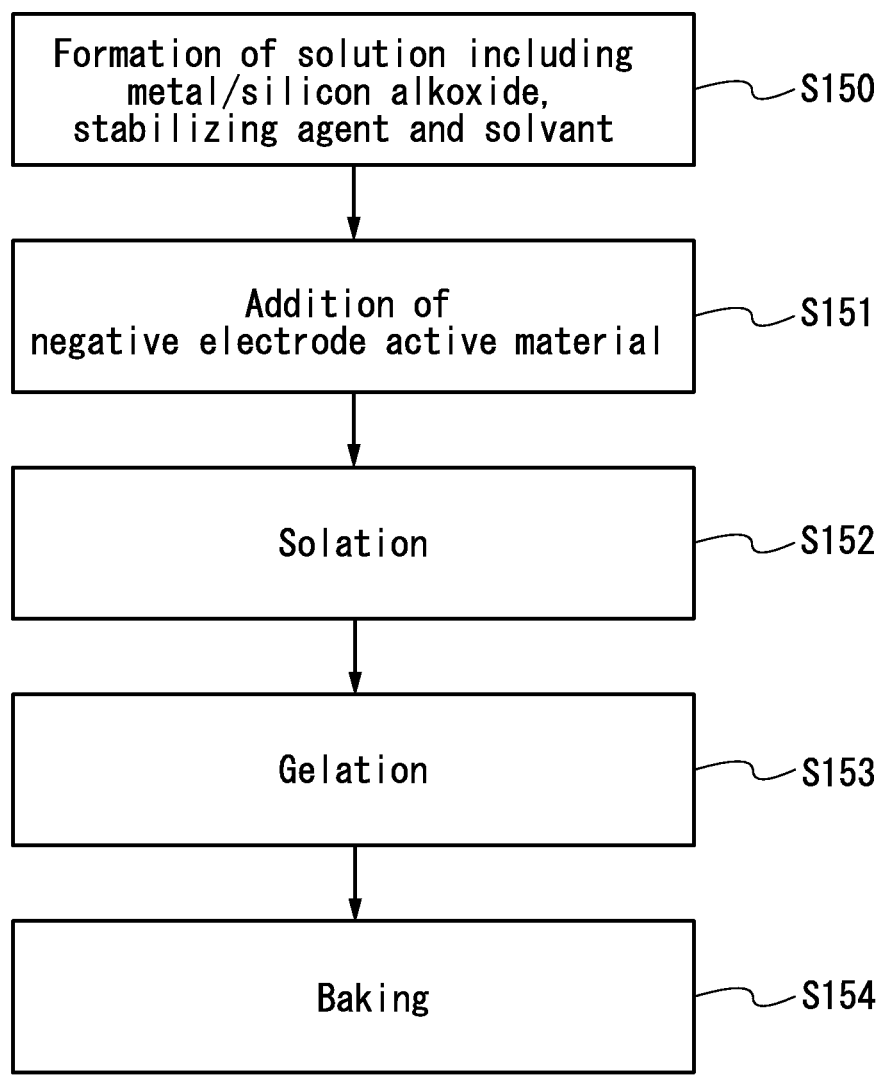

NEGATIVE ELECTRODE FOR POWER STORAGE DEVICE, METHOD FOR FORMING THE SAME, AND POWER STORAGE DEVICE

TECHNICAL FIELD

The present invention relates to a negative electrode for a power storage device, a method for forming the negative electrode, and a power storage device.

BACKGROUND ART

A variety of power storage devices, for example, non-aqueous secondary batteries such as lithium ion batteries (LIBs), lithium ion capacitors (LICs), and air cells have been actively developed in recent years. In particular, demand for lithium ion batteries with high output and high energy density has rapidly grown with the development of the semiconductor industry, as in the cases of electrical appliances, for example, portable information terminals such as mobile phones, smart-phones, and laptop computers, portable music players, and digital cameras; medical equipment; and next-generation clean energy vehicles such as hybrid electric vehicles (HEVs), electric vehicles (EVs), and plug-in hybrid electric vehicles (PHEVs). The lithium ion batteries are essential for today's information society as chargeable energy supply sources.

A negative electrode for the power storage devices such as the lithium ion batteries and the lithium ion capacitors is a structure body including at least a current collector (hereinafter referred to as a negative electrode current collector) and an active material layer (hereinafter referred to as a negative electrode active material layer) provided over a surface of the negative electrode current collector. The negative electrode active material layer contains an active material (hereinafter referred to as a negative electrode active material), such as carbon or silicon, which can store and release lithium ions serving as carrier ions.

At present, a negative electrode of a lithium ion battery using a graphite based carbon material is generally formed by mixing graphite (black lead) that is a negative electrode active material, acetylene black (AB) as a conductive additive, PVDF that is a resin as a binder to form slurry, applying the slurry over a current collector, and drying the slurry, for example.

Such a negative electrode of a lithium ion battery and a lithium ion capacitor has an extremely low electrode potential and a high reducing ability. For this reason, an electrolyte solution using an organic solvent is reduced and decomposed. The range of potentials in which the electrolysis of an electrolyte solution does not occur is referred to as a potential window. The negative electrode essentially needs to have an electrode potential in the potential window of the electrolyte solution. However, the negative electrode potential of a lithium ion battery or a lithium ion capacitor is out of the potential windows of almost all electrolyte solutions. Actually, a decomposition product thereof forms a passivating film (also referred to as a solid electrolyte film or solid electrolyte interphase (SEI)) on the surface of the negative electrode, and the passivating film prevents further reductive decomposition. Consequently, lithium ions can be inserted into the negative electrode with the use of a low electrode potential below the potential window of the electrolyte solution (e.g., Non-Patent Document 1).

However, such a film on the surface of the negative electrode which is formed by the decomposition product of the electrolyte solution kinetically suppresses the decomposition of the electrolyte solution, which leads to a gradual deterioration. Therefore, it cannot be said that such a film is a stable film. Since the decomposition reaction particularly speeds up at high temperature, the decomposition reaction greatly hinders operation of the negative electrode in high temperature environments. In addition, the formation of the film on the surface generates irreversible capacity, so that part of discharge capacity is lost. For these reasons, there are demands for a film on the surface of the negative electrode which is more stable and can be formed without losing its capacity.

REFERENCE

Non-Patent Document

[Non-Patent Document 1] Zempachi Ogumi, "Lithium Secondary Battery", Ohmsha, Ltd., first impression of the first edition published on March, 20, H20, pp. 116-118

DISCLOSURE OF INVENTION

Conventionally, it has been considered that the film on the surface of the negative electrode is formed due to battery reaction in charging, and the amount of charge used for forming the film cannot be discharged. For this reason, the initial capacity of a lithium ion battery is reduced as irreversible capacity.

Further, it has been considered that even a film formed on the surface of the negative electrode in the first charge is not satisfactorily stable and does not suppress decomposition of the electrolyte solution completely, and the decomposition of the electrolyte solution takes place particularly at high temperature.

As the electrochemical decomposition of the electrolyte solution takes place, the amount of lithium responsible for charge and discharge is decreased in response to the number of electrons used in the decomposition reaction of the electrolyte solution. Therefore, as charge and discharge are repeated, the capacity of the lithium ion battery is lost after a while. In addition, the higher the temperature is, the faster the electrochemical reaction is. Consequently, the capacity of the lithium ion battery decreases more significantly, as charge and discharge are repeated at high temperature.

The above problems exist not only in lithium ion batteries but also in lithium ion capacitors.

In view of the above, an object of one embodiment of the present invention is to reduce irreversible capacity which causes a decrease in the initial capacity of a lithium ion battery or a lithium ion capacitor and to suppress the electrochemical decomposition of an electrolyte solution and the like at a negative electrode.

Further, an object of one embodiment of the present invention is to suppress decomposition reaction of an electrolyte solution and the like caused as side reaction of charge and discharge in repeated charges and discharges of a lithium ion battery or a lithium ion capacitor so that the cycle performance of the lithium ion battery or the lithium ion capacitor is increased.

Furthermore, an object of one embodiment of the present invention is to suppress the decomposition reaction of an electrolyte solution, which speeds up at high temperature, and to prevent a decrease in capacity in charge and discharge at high temperature so that the operating temperature range of a lithium ion battery or a lithium ion capacitor is extended.

In addition, one embodiment of the present invention provides a negative electrode for a power storage device which solves the above problems.

One embodiment of the present invention provides a power storage device including the negative electrode for a power storage device.

One embodiment of the present invention provides a method for forming the negative electrode for a power storage device.

It is probable that decomposition of an electrolyte solution occurs electrochemically. Graphite or silicon has been conventionally used as a negative electrode active material, and electric conductivity thereof is relatively high. Even silicon that is a semiconductor has high electric conductivity in the state where lithium is inserted into the silicon. For this reason, the decomposition reaction of an electrolyte solution takes place on a surface of a negative electrode active material.

On the other hand, a particulate negative electrode active material with an average diameter of several hundred nanometers to several tens of micrometers is used in a negative electrode of a lithium ion battery or a lithium ion capacitor to maintain a constant speed of charge and discharge. Thus, the negative electrode can be regarded as a porous electrode that is an aggregate of particles of a negative electrode active material and the surface area thereof is large. Consequently, an area where battery reaction can occur is large, which enhances the decomposition reaction of an electrolyte solution.

In view of the above, a surface of a negative electrode active material is covered with an insulating metal oxide to prevent decomposition of an electrolyte solution on the surface of the negative electrode active material, which occupies a large part of the area of an electrode.

Therefore, one embodiment of the present invention is a negative electrode for a power storage device including a negative electrode current collector, a negative electrode active material layer which is over the negative electrode current collector and includes a plurality of particles of a negative electrode active material, and a film covering part of the plurality of particles of the negative electrode active material. The film has an insulating property and lithium ion conductivity.

A particulate material is used for the negative electrode active material. For example, a particulate negative electrode active material with an average diameter of more than or equal to 6 μm and less than or equal to 30 μm can be used.

There is no particular limitation on the material for the negative electrode active material as long as it is a material with which a metal can be dissolved/precipitated or a material into/from which metal ions can be inserted/extracted. For the negative electrode active material, a lithium metal, a carbon-based material, silicon, a silicon alloy, or tin can be used, for example.

The lithium metal is preferable because of its low redox potential (which is lower than that of the standard hydrogen electrode by 3.045 V) and high specific capacity per weight and volume (which are 3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, and pitch-based artificial graphite and natural graphite such as spherical natural graphite.

Graphite has a low potential substantially equal to that of a lithium metal (0.1 V to 0.3 V vs. Li$^+$/Li) when lithium ions are intercalated into the graphite (when a lithium-graphite intercalation compound is generated). For this reason, a lithium ion battery can have a high operating voltage. In addition, graphite is preferable because of its advantages such as relatively high capacity per volume, small volume expansion, low cost, and greater safety than that of a lithium metal.

As the negative electrode active material, an alloy-based material which enables charge-discharge reaction by alloying and dealloying reaction with a lithium metal can be used. For example, a material including at least one of Al, Si, Ge, Sn, Pb, Sb, Bi, Ag, Zn, Cd, In, Ga, and the like can be given. Such elements have higher capacity than carbon. In particular, silicon has a theoretical capacity of 4200 mAh/g, which is significantly high. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, as the negative electrode active material, an oxide such as titanium dioxide ($TiO_2$), lithium titanium oxide ($Li_4Ti_5O_{12}$), a lithium-graphite intercalation compound ($Li_xC_6$), niobium oxide ($Nb_2O_5$), tungsten oxide ($WO_2$), molybdenum oxide ($MoO_2$), or the like can be used.

Further alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g).

A nitride containing lithium and a transition metal is preferably used, in which case lithium ions are included in the negative electrode active material, and thus the negative electrode active material can be used in combination with a material for a positive electrode active material which does not include lithium ions, such as $V_2O_5$ or $Cr_3O_8$. Note that in the case of using a material including lithium ions as the positive electrode active material, the nitride containing lithium and a transition metal can be used for the negative electrode active material by extracting lithium ions in advance.

Still further alternatively, as the negative electrode active material, a material which causes conversion reaction can be used. For example, a transition metal oxide which does not cause alloying reaction with lithium, such as cobalt oxide (CoO), nickel oxide (NiO), or iron oxide (FeO), may be used. Other examples of the material which causes conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

Other than lithium ions used for lithium ion batteries or lithium ion capacitors, examples of carrier ions include alkali-metal ions such as sodium ions and potassium ions; alkaline-earth metal ions such as calcium ions, strontium ions, and barium ions; beryllium ions; magnesium ions; and the like.

As a film covering a particle of such a negative electrode active material, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium oxide ($Nb_2O_5$) has a low electron conductivity of $10^{-9}$ S/cm$^2$ and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions.

Thus, having carrier ion conductivity, a film covering a negative electrode active material can transmit carrier ions, and battery reaction of the negative electrode active material can occur. On the other hand, having an insulating property, the film can suppress the reaction between the electrolyte solution and the negative electrode active material. Therefore, it is preferable that a material having a high carrier ion diffusion coefficient be used for a metal oxide film, and the metal oxide film be an insulating film formed as thin as possible. The thickness of the film is preferably more than or equal to 5 nm and less than or equal to 50 nm.

When a negative electrode active material is entirely isolated electrically, electrons are prevented from freely moving inside and outside the negative electrode active material; thus, battery reaction cannot occur. Therefore, to secure a path for electron conduction with the outside, the negative electrode active material needs to be prevented from being completely covered with a film and at least part of the negative electrode active material needs to be exposed without being covered. A film covering part of a particulate negative electrode active material is formed on a surface of the negative electrode active material in such a manner; thus, battery reaction of the negative electrode active material can occur and the decomposition reaction of the electrolyte solution can be suppressed.

Further, one embodiment of the present invention is a method for forming a negative electrode for a power storage device including the steps of forming a dispersion solution by dispersing particulate graphite in a solution including metal alkoxide, a stabilizing agent, and a solvent; hydrolyzing and condensing the metal alkoxide so that the metal alkoxide is changed into a gel, thereby attaching the gel including a metal of the metal alkoxide on a surface of the particulate graphite; forming a metal oxide film on the surface of the particulate graphite by baking the gel through heating treatment; and performing baking after slurry including the particulate graphite provided with the metal oxide film and a binder is applied over a negative electrode current collector.

The metal oxide film covering the surface of the negative electrode active material can be formed by a sol-gel method. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. Thus, the metal oxide film is formed on the surface of the negative electrode active material.

Here, in order that the negative electrode active material can cause battery reaction, the metal oxide film covering the negative electrode active material needs to transmit carrier ions such as lithium ions. Therefore, it is preferable that a material having a high carrier ion diffusion coefficient be used for the metal oxide film, and the metal oxide film be an insulating film formed as thin as possible. In terms of thin film formation, the sol-gel method is well suited.

In a negative electrode active material which is entirely isolated electrically, electrons are prevented from freely moving inside and outside the negative electrode active material; thus, battery reaction cannot occur. Therefore, to secure a path for electron conduction with the outside, the negative electrode active material needs to be prevented from being completely covered with a metal oxide film and at least part of the negative electrode active material needs to be exposed without being covered. For this purpose, the sol-gel method by which a thin metal oxide film can be formed is suited for forming the metal oxide film.

As described above, decomposition reaction of an electrolyte solution can be suppressed in a lithium ion battery or a lithium ion capacitor by forming a film having an insulating property and lithium ion conductivity on a surface of a particulate negative electrode active material.

According to one embodiment of the present invention, irreversible capacity which causes a decrease in the initial capacity of a lithium ion battery or a lithium ion capacitor can be reduced and the electrochemical decomposition of an electrolyte solution and the like at a negative electrode can be suppressed.

Further, according to one embodiment of the present invention, decomposition reaction of an electrolyte solution and the like caused as side reaction of charge and discharge in repeated charges and discharges of a lithium ion battery or a lithium ion capacitor can be suppressed, and thus the cycle performance of the lithium ion battery or the lithium ion capacitor can be increased.

Furthermore, according to one embodiment of the present invention, the decomposition reaction of an electrolyte solution, which speeds up at high temperature, is suppressed and a decrease in capacity in charge and discharge at high temperature is prevented so that the operating temperature range of a lithium ion battery or a lithium ion capacitor can be extended.

In addition, according to one embodiment of the present invention, a negative electrode for a power storage device which solves the above problems can be provided.

According to one embodiment of the present invention, a power storage device including the negative electrode for a power storage device can be provided.

According to one embodiment of the present invention, a method for forming the negative electrode for a power storage device can be provided.

BRIEF DESCRIPTION OF DRAWINGS

FIG. 2 illustrates a method for forming a film.

BEST MODE FOR CARRYING OUT THE INVENTION

Embodiments and examples are described below with reference to drawings. However, the embodiments and the examples can be implemented with various modes. It will be readily appreciated by those skilled in the art that modes and details can be changed in various ways without departing from the spirit and scope of the present invention. Thus, the present invention should not be interpreted as being limited to the following description of the embodiments and the examples.

Embodiment 1

In this embodiment, a structure of a negative electrode active material having a film which can suppress decomposition reaction of an electrolyte solution is described with reference to FIGS. 1A and 1B.

Figure 1A:
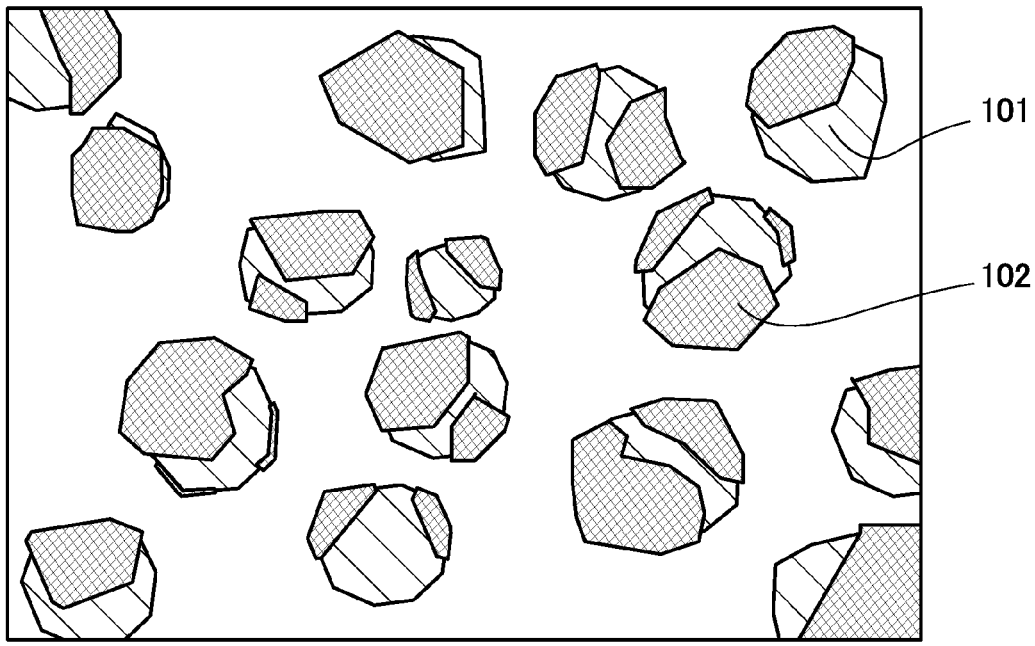
FIGS. 1A and 1B each illustrate a negative electrode active material having a film.
Figure 1B:
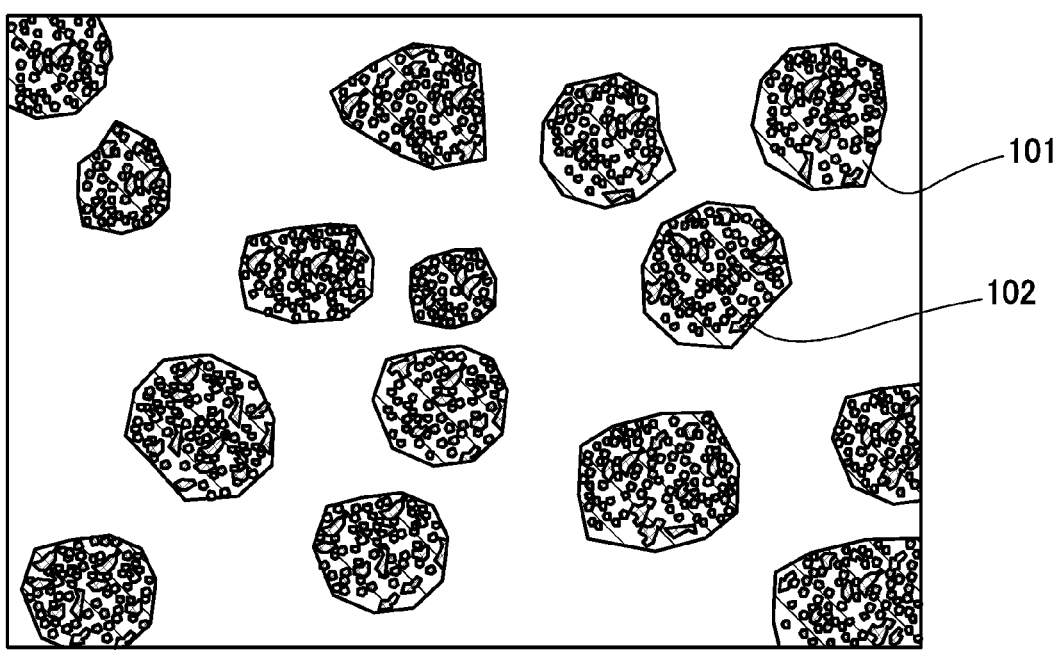

FIGS. 1A and 1B illustrate negative electrode active materials used in a negative electrode for a power storage device, which is one embodiment of the present invention. A negative electrode active material 101 is a particle, fine particle, or powder (hereinafter referred to as particulate negative electrode active material). Particles of the negative electrode active material 101 are not necessarily in a spherical shape and the particles may have given shapes different from each other. As the particulate negative electrode active material 101, a commercial negative electrode active material can be used, and it is possible to use a negative electrode active material with an average diameter used as a conventional negative electrode active material. For example, a particulate negative electrode active material with an average diameter of more than or equal to 6 μm and less than or equal to 30 μm can be used. A method for forming the negative electrode active material 101 is not limited as long as the negative electrode active material 101 has the above-described shape.

For the material of the negative electrode active material 101, graphite that is a carbon material generally used in the field of power storage can be used. Examples of graphite include low crystalline carbon such as soft carbon and hard carbon and high crystalline carbon such as natural graphite, kish graphite, pyrolytic graphite, mesophase pitch based carbon fiber, meso-carbon microbeads (MCMB), mesophase pitches, petroleum-based or coal-based coke, and the like.

Further, a material which is alloyed and dealloyed with carrier ions giving and receiving charges may be used. Examples of such a material include magnesium, calcium, aluminum, silicon, germanium, tin, lead, arsenic, antimony, bismuth, silver, gold, zinc, cadmium, and mercury.

Films 102 are provided on a surface of a particle of such a negative electrode active material 101. As illustrated in FIG. 1A, the films 102 do not entirely cover the surface of the particle of the negative electrode active material 101, and partly cover the surface. Thus, there are a region covered with the film 102 and a region not covered with the film 102 in the surface of the particle of the negative electrode active material 101. In addition, the films 102 covering the particle of the negative electrode active material 101 may each have a relatively large surface covering a few percent to several tens of percent of the surface area of the particle of the negative electrode active material 101 as illustrated in FIG. 1A or a surface with a very small area as illustrated in FIG. 1B. The size of the film 102 attached on the surface of the particle of the negative electrode active material 101 can be appropriately adjusted depending on conditions of a sol-gel method described later, the shape or state of a surface of a negative electrode active material to be used, or the like.

As the material of the film 102, an oxide film of any one of niobium, titanium, vanadium, tantalum, tungsten, zirconium, molybdenum, hafnium, chromium, aluminum, and silicon or an oxide film containing any one of these elements and lithium can be used. The film 102 formed using such a material is denser than a conventional film formed on a surface of a negative electrode due to a decomposition product of an electrolyte solution.

For example, niobium oxide ($Nb_2O_5$) has a low electron conductivity of $10^{-9}$ S/cm$^2$ and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions.

Thus, having carrier ion conductivity, the film 102 covering the negative electrode active material 101 can transmit carrier ions, and battery reaction of the negative electrode active material 101 can occur. On the other hand, having an insulating property, the film 102 can suppress the reaction between an electrolyte solution and the negative electrode active material 101. Therefore, it is preferable that a material having a high carrier ion diffusion coefficient be used for the film 102, and the film 102 be an insulating film formed as thin as possible. The thickness of the film 102 is preferably more than or equal to 5 nm and less than or equal to 50 nm.

When the negative electrode active material 101 is entirely isolated electrically, electrons are prevented from freely moving inside and outside the negative electrode active material 101; thus, a battery reaction cannot occur. Therefore, to ensure a path for electron conduction with the outside, the negative electrode active material 101 needs to be prevented from being completely covered with the films 102 and at least part of the negative electrode active material 101 needs to be exposed without being covered with the films 102. The films 102 covering part of the particle of the negative electrode active material 101 is formed on the surface of the particle of the negative electrode active material 101 in such a manner; thus, battery reaction of the negative electrode active material 101 can occur and the decomposition reaction of the electrolyte solution can be suppressed.

This embodiment can be implemented in combination with any of other embodiments as appropriate.

Embodiment 2

In this embodiment, a method for forming a film on a particulate negative electrode active material, which is one embodiment of the present invention, is described with reference to FIG. 2.

First, as Step S150, a solvent to which metal alkoxide and a stabilizing agent are added is stirred to form a solution. Toluene can be used as the solvent, for example. Ethyl acetoacetate can be used as the stabilizing agent, for example. Alternatively, as Step S150, a solvent to which silicon alkoxide and a stabilizing agent are added is stirred to form a solution.

For the metal alkoxide, a desired metal for a metal oxide film formed as the film on the negative electrode active material is selected.

Next, as Step S151, the solution to which a particulate negative electrode active material such as graphite is added is stirred. The solution is made into thick paste by stirring the solution to which a solvent such as toluene is added, and the surface of the negative electrode active material is covered with the metal alkoxide or the silicon alkoxide. Step S150 and Step S151 are preferably performed in an environment at low humidity, such as a dry room. This is because hydrolysis reaction can be suppressed.

Next, in Step S152 and Step S153, the metal alkoxide or the silicon alkoxide on the surface of the particulate negative electrode active material is changed into a metallic gel by a sol-gel method.

As Step S152, a small amount of water is added to the solution to which the negative electrode active material such as graphite is added, so that the metal alkoxide or the silicon alkoxide reacts with the water (i.e., hydrolysis reaction) to form a decomposition product which is a sol. Here, the term "being a sol" refers to being in a state where solid fine particles are substantially uniformly dispersed in a liquid. The small amount of water may be added by exposing the solution to which the negative electrode active material is added to the air. For example, in the case where $Nb(OEt)_5$ which is one of niobium alkoxide is used as the metal alkoxide, hydrolysis reaction represented by Formula 1 occurs.

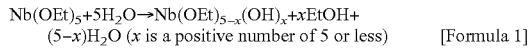

$Nb(OEt)_5 + 5H_2O \rightarrow Nb(OEt)_{5-x}(OH)_x + xEtOH + (5-x)H_2O$ ($x$ is a positive number of 5 or less)  [Formula 1]

Alternatively, for example, in the case where $Si(OEt)_4$ which is one of silicon alkoxide is used, hydrolysis reaction represented by Formula 2 occurs.

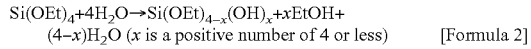

$Si(OEt)_4 + 4H_2O \rightarrow Si(OEt)_{4-x}(OH)_x + xEtOH + (4-x)H_2O$ ($x$ is a positive number of 4 or less)  [Formula 2]

Next, as Step S153, the decomposition product changed into the sol is dehydrated and condensed to be a reactant which is a gel. Here, "being a gel" refers to being in a state where a decomposition product which is a sol and has fluidity is solidified, and a three-dimensional network structure is developed due to attractive interaction between solid fine particles. In the case where $Nb(OEt)_5$ which is one of niobium alkoxide is used as the metal alkoxide, condensation reaction represented by Formula 3 occurs.

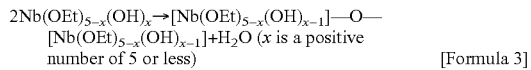

$2Nb(OEt)_{5-x}(OH)_x \rightarrow [Nb(OEt)_{5-x}(OH)_{x-1}] \!-\! O \!-\! [Nb(OEt)_{5-x}(OH)_{x-1}] + H_2O$ ($x$ is a positive number of 5 or less)  [Formula 3]

Alternatively, for example, in the case where $Si(OEt)_4$ which is one of silicon alkoxide is used, condensation reaction represented by Formula 4 occurs.

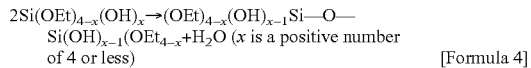

$2Si(OEt)_{4-x}(OH)_x \rightarrow (OEt)_{4-x}(OH)_{x-1}Si \!-\! O \!-\! Si(OH)_{x-1}(OEt_{4-x} + H_2O$ ($x$ is a positive number of 4 or less)  [Formula 4]

Through this step, the reactant which is a gel attached on the surface of the particulate negative electrode active material can be formed. Note that although solation by hydrolysis reaction and gelation by condensation reaction are separately described above as two steps, Steps S152 and S153, for convenience, both reactions occur almost at the same time in practice. This is because the structure of metal alkoxide or silicon alkoxide gradually changes into that of a stable substance which is a gel, depending on conditions of temperature and water.

Then, as Step S154, the dispersion liquid is baked under an atmospheric pressure, whereby the particulate negative electrode active material with a metal oxide film or a silicon oxide film attached on the surface thereof can be obtained. The temperature of the baking is more than or equal to 300° C. and less than or equal to 900° C., preferably more than or equal to 500° C. and less than or equal to 800° C.

Through the above steps, a negative electrode active material covered with a film formed of a metal oxide film or a silicon oxide film is formed. In the case of forming a film on a negative electrode active material by the sol-gel method in such a manner, the above steps can be even employed for a negative electrode active material having a complicated shape, and a large number of films can be formed; therefore, the sol-gel method is an optimal method for a mass production process.

Embodiment 3

In this embodiment, a negative electrode for a power storage device using a particulate negative electrode active material having a film and a method for forming the negative electrode are described with reference to FIGS. 3A to 3D.

Figure 3A:
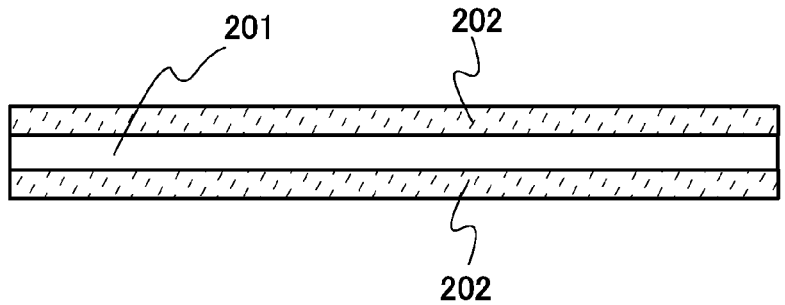
FIGS. 3A to 3D illustrate a negative electrode.

As illustrated in FIG. 3A, a negative electrode 200 includes a negative electrode current collector 201 and a negative electrode active material layer 202 provided on one or both surfaces (on the both surfaces in the drawing) of the negative electrode current collector 201.

The negative electrode current collector 201 is formed using a highly conductive material which is not alloyed with a carrier ion such as lithium. For example, stainless steel, iron, aluminum, copper, nickel, or titanium can be used. Alternatively, an alloy material such as an alloy of aluminum and nickel or an alloy of aluminum and copper may be used. In addition, the negative electrode current collector 201 can have a foil-like shape, a plate-like shape (sheet-like shape), a net-like shape, a punching-metal shape, an expanded-metal shape, or the like as appropriate. The negative electrode current collector 201 preferably has a thickness of more than or equal to 10 μm and less than or equal to 30 μm.

The negative electrode active material layer 202 is provided on one or both surfaces of the negative electrode current collector 201. For the negative electrode active material layer 202, the particulate negative electrode active material covered with films formed of a metal oxide film or a silicon oxide film, which is described in Embodiment 1 or 2, is used.

In this embodiment, the negative electrode active material layer 202 formed by mixing and baking the above-described negative electrode active material, a conductive additive, and a binder is used.

Figure 3B:
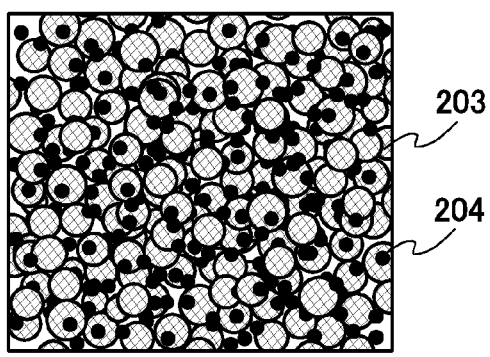

The negative electrode active material layer 202 is described with reference to FIG. 3B. FIG. 3B is a cross-sectional view of part of the negative electrode active material layer 202. The negative electrode active material layer 202 includes a particulate negative electrode active material 203 described in Embodiment 1 or 2, a conductive additive 204, and a binder (not illustrated). The particulate negative electrode active material 203 is covered with films formed of a metal oxide film or a silicon oxide film as described in the above embodiments.

The conductive additive 204 increases the conductivity between particles of negative electrode active material 203 or between the negative electrode active material 203 and the negative electrode current collector 201, and is preferably added to the negative electrode active material layer 202. A material with a large specific surface is desirably used as the conductive additive 204, and acetylene black (AB) or the like is preferably used. Alternatively, a carbon material such as a carbon nanotube, graphene, or fullerene can be used. Note that the case of using graphene is described later as an example.

As the binder, a material which at least binds the negative electrode active material, the conductive additive, and the current collector is used. Examples of the binder include resin materials such as polyvinylidene fluoride (PVDF), a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, and polyimide.

The negative electrode 200 is formed in the following manner. First, the particulate negative electrode active material having films formed by the method described in Embodiment 2 is mixed with a solvent such as NMP (N-methylpyrrolidone), in which a vinylidene fluoride based polymer such as polyvinylidene fluoride is dissolved, to form slurry.

Next, the slurry is applied on one or both of the surfaces of the negative electrode current collector 201, and dried. In the case where both of the surfaces of the negative electrode current collector 201 are subjected to the application step, the surfaces are provided with the negative electrode active material layer 202 at the same time or one by one. Then, rolling with a roller press machine is performed, whereby the negative electrode 200 is formed.

Next, an example of using graphene as the conductive additive added to the negative electrode active material layer 202 is described with reference to FIGS. 3C and 3D.

Here, graphene in this specification includes single-layer graphene and multilayer graphene including two to hundred layers. Single-layer graphene refers to a sheet of a monolayer of carbon molecules. Graphene oxide refers to a compound formed by oxidation of such graphene. When graphene oxide is reduced to form graphene, oxygen contained in the graphene oxide is not entirely extracted and part of the oxygen remains in the graphene. When the graphene contains oxygen, the proportion of oxygen is higher than or equal to 2 atomic % and lower than or equal to 20 atomic %, preferably higher than or equal to 3 atomic % and lower than or equal to 15 atomic %.

Here, in the case of reducing multilayer graphene to obtain multilayer graphene, an interlayer distance of the multilayer graphene is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In other words, the multilayer graphene used in a power storage device of one embodiment of the present invention can have an interlayer distance longer than 0.34 nm that is the interlayer distance of general graphite. Since the multilayer graphene used in the power storage device of one embodiment of the present invention can have a long interlayer distance, carrier ions can easily transfer between layers of the multilayer graphene.

Figure 3C:
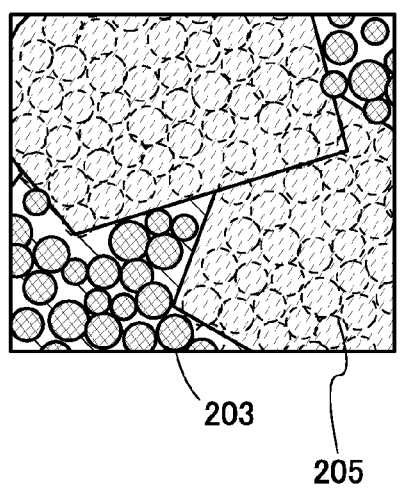

FIG. 3C is a plan view of part of the negative electrode active material layer 202 using graphene. The negative electrode active material layer 202 includes the particulate negative electrode active material 203 and graphenes 205 which cover a plurality of particles of the negative electrode active material 203 and at least partly surround the plurality of particles of negative electrode active material 203. A binder which is not illustrated may be added; however, in the case where the graphenes 205 are contained so that they are bound to each other to function well as a binder, the binder is not necessarily added. The different graphenes 205 cover surfaces of the plurality of particles of the negative electrode active material 203 in the negative electrode active material layer 202 in the plan view. The particles of the negative electrode active material 203 may partly be exposed.

Figure 3D:
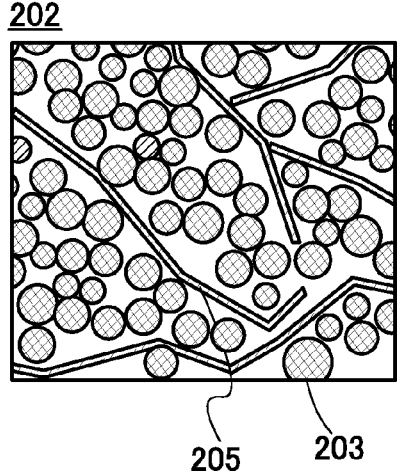

FIG. 3D is a cross-sectional view of part of the negative electrode active material layer 202 in FIG. 3C. FIG. 3D illustrates the negative electrode active material 203 and the graphenes 205. The graphenes 205 cover a plurality of particles of the negative electrode active material 203 in the negative electrode active material layer 202 in the plan view. The graphenes 205 are observed to have linear shapes in the cross-sectional view. One graphene or plural graphenes overlap with the plurality of particles of the negative electrode active material 203, or the plurality of particles of the negative electrode active material 203 is at least partly surrounded with one graphene or plural graphenes. Note that the graphene 205 has a bag-like shape and the plurality of particles of the negative electrode active material is surrounded with the bag-like portion in some cases. The graphene 205 partly has openings where the particles of the negative electrode active material 203 are exposed in some cases.

The desired thickness of the negative electrode active material layer 202 is determined in the range of 20 μm to 150 μm.

Note that the negative electrode active material layer 202 may be predoped with lithium. Predoping with lithium may be performed in such a manner that a lithium layer is formed on a surface of the negative electrode active material layer 202 by a sputtering method. Alternatively, lithium foil is provided on the surface of the negative electrode active material layer 202, whereby the negative electrode active material layer 202 can be predoped with lithium.

As an example of the negative electrode active material 203, there is a material whose volume is expanded by occlusion of carrier ions. Thus, the negative electrode active material layer including such a material gets friable and is partly broken by charge and discharge, which reduces the reliability (e.g., cycle performance) of the power storage device.

That is to say, a binder does not have to be used in forming the negative electrode active material layer 202. Accordingly, the proportion of the negative electrode active material in the negative electrode active material layer 202 with certain weight (certain volume) can be increased, leading to an increase in charge and discharge capacity per unit weight (unit volume) of the electrode.

The graphene 205 has conductivity and is in contact with a plurality of particles of the negative electrode active material 203; thus, it also serves as a conductive additive. That is, a conductive additive does not have to be used in forming the negative electrode active material layer 202. Accordingly, the proportion of the negative electrode active material in the negative electrode active material layer 202 with certain weight (certain volume) can be increased, leading to an increase in charge and discharge capacity per unit weight (unit volume) of the electrode.

Further, the graphene 205 efficiently forms a sufficient conductive path of electrons in the negative electrode active material layer 202, which increases the conductivity of the negative electrode 200.

Note that the graphene 205 also functions as a negative electrode active material that can occlude and release carrier ions, leading to an increase in charge capacity of the negative electrode 200.

Next, a method for forming the negative electrode active material layer 202 in FIGS. 3C and 3D is described.

First, the particulate negative electrode active material 203 having films, which is described in Embodiment 1 or 2, and a dispersion liquid containing graphene oxide are mixed to form slurry.

Next, the slurry is applied over the negative electrode current collector 201. Next, drying is performed in a vacuum for a certain period of time to remove a solvent from the slurry applied over the negative electrode current collector 201. Then, rolling with a roller press machine is performed.

Then, the graphene oxide is electrochemically reduced with electric energy or thermally reduced by heating treatment to form the graphene 205. Particularly in the case where electrochemical reduction treatment is performed, a proportion of $C(\pi)-C(\pi)$ double bonds of graphene formed by the electrochemical reduction treatment is higher than that of graphene formed by heating treatment; therefore, the graphene 205 having high conductivity can be formed. Through the above steps, the negative electrode active material layer 202 used as a conductive additive can be formed on one or both of the surfaces of the negative electrode current collector 201, and thus the negative electrode 200 can be formed.

Embodiment 4

In this embodiment, a structure of a lithium ion battery as a power storage device and a method for manufacturing the lithium ion battery are described.
(Positive Electrode)

First, a positive electrode and a method for forming the positive electrode method are described.

Figure 4A:
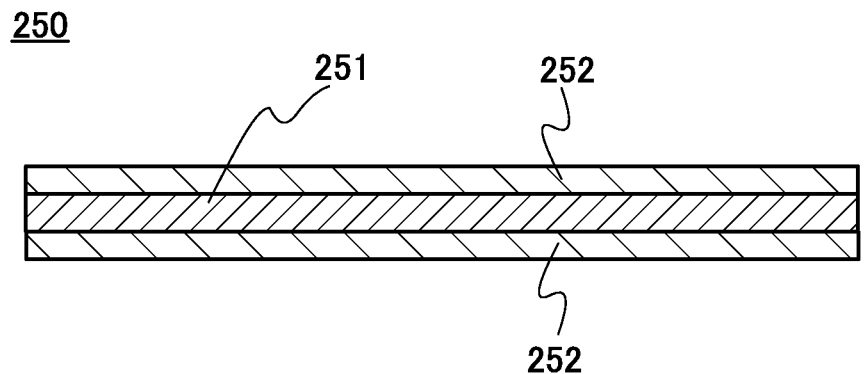
FIGS. 4A to 4C illustrate a positive electrode.

FIG. 4A is a cross-sectional view of a positive electrode 250. In the positive electrode 250, a positive electrode active material layer 252 is formed over a positive electrode current collector 251.

For the positive electrode current collector 251, a highly conductive material such as a metal typified by stainless steel, gold, platinum, zinc, iron, copper, aluminum, or titanium, or an alloy of these metals can be used. Note that the positive electrode current collector 251 can be formed using an aluminum alloy to which an element which improves heat resistance, such as silicon, titanium, neodymium, scandium, or molybdenum, is added. Further alternatively, the positive electrode current collector 251 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 251 can have a foil-like shape, a plate-like shape (a sheet-like shape), a net-like shape, a punching-metal shape, an expanded-metal shape, or the like as appropriate.

In addition to a positive electrode active material, a conductive additive and a binder may be included in the positive electrode active material layer 252.

As the positive electrode active material of the positive electrode active material layer 252, a material that can insert and extract carrier ions such as lithium ions can be used. For example, a lithium-containing composite oxide with an olivine crystal structure, a layered rock-salt crystal structure, or a spinel crystal structure can be given as the positive electrode active material that can insert and extract lithium ions.

As the lithium-containing composite oxide with an olivine crystal structure, a composite oxide represented by a general formula $LiMPO_4$ (M is one or more of Fe(II), Mn(II), Co(II), and Ni(II)) can be given. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), $LiFe_fNi_gCo_hMn_iPO_4$ (f+g+h+i≤1, 0<f<1, 0<g<1, 0<h<1, and 0<i<1), and the like.

$LiFePO_4$ is particularly preferable because it meets requirements with balance for a positive electrode active material, such as safety, stability, high capacity density, high potential, and the existence of lithium ions that can be extracted in initial oxidation (charging).

Examples of the lithium-containing composite oxide with a layered rock-salt crystal structure include lithium cobalt oxide ($LiCoO_2$); $LiNiO_2$; $LiMnO_2$; $Li_2MnO_3$; an NiCo-based lithium-containing composite oxide (a general formula thereof is $LiNi_xCo_{1-x}O_2$ (0<x<1)) such as $LiNi_{0.8}Co_{0.2}O_2$; an NiMn-based lithium-containing composite oxide (a general formula thereof is $LiNi_xMn_{1-x}O_2$ (0<x<1)) such as $LiNi_{0.5}Mn_{0.5}O_2$; and an NiMnCo-based lithium-containing composite oxide (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. Moreover, $Li(Ni_{0.8}Co_{0.15}Al_{0.05})O_2$, $Li_2MnO_3$—$LiMO_2$ (M=Co, Ni, or Mn), and the like can be given.

$LiCoO_2$ is particularly preferable because it has high capacity, is more stable in the air than $LiNiO_2$, and is more thermally stable than $LiNiO_2$, for example.

Examples of the lithium-containing composite oxide with a spinel crystal structure include $LiMn_2O_4$, $Li_{1+x}Mn_{2-x}Oh$, $Li(MnAl)_2O_4$, $LiMn_{1.5}Ni_{0.5}O_4$, and the like.

A lithium-containing composite oxide with a spinel crystal structure including manganese, such as $LiMn_2O_4$, is preferably mixed with a small amount of lithium nickel oxide (e.g., $LiNiO_2$ or $LiNi_{1-x}MO_2$ (M=Co, Al, or the like)), in which case elution of manganese and decomposition of an electrolyte solution are suppressed, for example.

As the positive electrode active material, a composite oxide represented by a general formula $Li_{(2-j)}MSiO_4$ (M is one or more of Fe(II), Mn(II), Co(II), and Ni(II); 0≤j≤2) can be used. Typical examples of the general formula $Li_{(2-j)}MSiO_4$ include $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_gSiO_4$, $Li_{(2-j)}Fe_mNi_nMn_gSiO_4$, $Li_{(2-j)}Ni_mCo_nMn_gSiO_4$ (m+n+q≤1, 0<m<1, 0<n<1, and 0<q<1), $Li_{(2-j)}Fe_rNi_sCo_tMn_uSiO_4$ (r+s+t+u≤1, 0<r<1, 0<s<1, 0<t<1, and 0<u<1), and the like.

Further, as the positive electrode active material, a nasicon compound represented by a general formula $A_xM_2(XO_4)_3$ (A=Li, Na, or Mg; M=Fe, Mn, Ti, V, Nb, or Al; and X=S, P, Mo, W, As, or Si) can be used. Examples of the nasicon compound include $Fe_2(MnO_4)_3$, $Fe_2(SO_4)_3$, $Li_3Fe_2(PO_4)_3$, and the like. Further alternatively, as the positive electrode active material, a compound represented by a general formula $Li_2MPO_4F$, $Li_2MP_2O_7$, or $Li_5MO_4$ (M=Fe or Mn); perovskite fluoride such as $NaF_3$ or $FeF_3$; metal chalcogenide such as $TiS_2$ or $MoS_2$ (sulfide, selenide, or telluride); a lithium-containing composite oxide with an inverse spinel crystal structure such as $LiMVO_4$; a vanadium oxide based material (e.g., $V_2O_5$, $V_6O_{13}$, or $LiV_3O_8$); a manganese oxide based material; an organic sulfur based material; or the like can be used.

In the case where carrier ions are alkali metal ions other than lithium ions, alkaline-earth metal ions, beryllium ions, or magnesium ions, the positive electrode active material layer 252 may contain, instead of lithium in the lithium compound and the lithium-containing composite oxide, an alkali metal (e.g., sodium or potassium), an alkaline-earth metal (e.g., calcium, strontium, or barium), beryllium, or magnesium.

The positive electrode active material layer 252 is not necessarily formed in contact with the positive electrode current collector 251. Between the positive electrode current collector 251 and the positive electrode active material layer 252, any of the following functional layers may be formed using a conductive material such as a metal: an adhesive layer for the purpose of improving adhesiveness between the positive electrode current collector 251 and the positive electrode active material layer 252, a planarization layer for reducing unevenness of the surface of the positive electrode current collector 251, a heat radiation layer for radiating heat, and a stress relaxation layer for relieving stress of the positive electrode current collector 251 or the positive electrode active material layer 252.

Figure 4B:
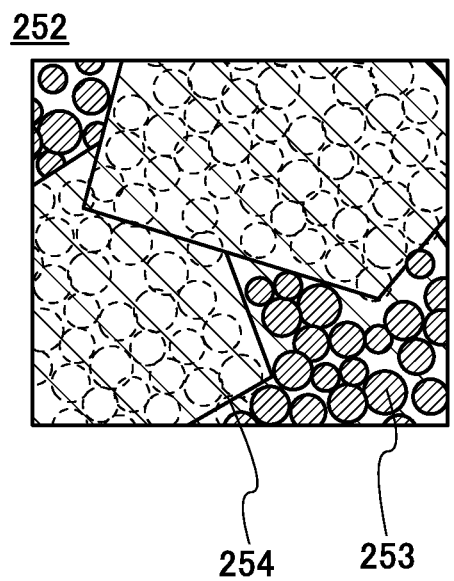

FIG. 4B is a plan view of the positive electrode active material layer 252. As the positive electrode active material layer 252, a particulate positive electrode active material 253 that can occlude and release carrier ions is used. An example is shown in which graphenes 254 covering a plurality of particles of the positive electrode active material 253 and at least partly surrounding the plurality of particles of the positive electrode active material 253 are included. The different graphenes 254 cover surfaces of the plurality of particles of the positive electrode active material 253. The particles of the positive electrode active material 253 may partly be exposed.

The size of the particle of the positive electrode active material 253 is preferably greater than or equal to 20 nm and less than or equal to 100 nm. Note that the size of the particle of the positive electrode active material 253 is preferably smaller because electrons transfer in the positive electrode active material 253.

Although sufficient characteristics can be obtained even when the surface of the positive electrode active material 253 is not covered with a graphite layer, it is preferable to use the positive electrode active material 253 covered with a graphite layer, in which case hopping of carrier ions occurs between particles of the positive electrode active material 253, so that current flows.

Figure 4C:
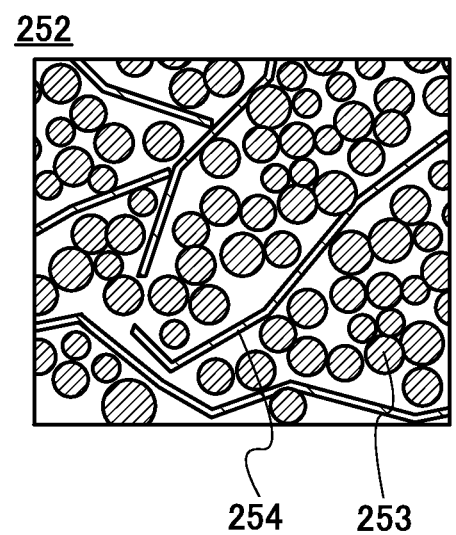

FIG. 4C is a cross-sectional view of part of the positive electrode active material layer 252 in FIG. 4B. The positive electrode active material layer 252 includes the positive electrode active material 253 and the graphenes 254 covering a plurality of particles of the positive electrode active material 253. The graphene 254 has a linear shape when observed in the cross-sectional view. One graphene or plural graphenes overlap with the plurality of particles of the positive electrode active material, or the plurality of particles of the positive electrode active material is at least partly surrounded with one graphene or plural graphenes. Note that the graphene has a bag-like shape and the plurality of particles of the positive electrode active material is surrounded with the bag-like portion in some cases. In addition, the particles of the positive electrode active material is partly not covered with the graphenes and exposed in some cases.

The desired thickness of the positive electrode active material layer 252 is determined in the range of 20 μm to 100 μm. It is preferable to adjust the thickness of the positive electrode active material layer 252 as appropriate so that cracks and separation do not occur.

Note that the positive electrode active material layer 252 may contain a known conductive additive, for example, acetylene black particles having a volume 0.1 to 10 times as large as that of the graphene or carbon particles such as carbon nanofibers having a one-dimensional expansion.

As an example of the positive electrode active material 253, a material whose volume is expanded by occlusion of ions serving as carriers is given. When such a material is used, the positive electrode active material layer gets vulnerable and is partly collapsed by charge and discharge, which results in lower reliability of a power storage device. However, even when the volume of the positive electrode active material expands due to charge and discharge, the graphene partly covers the periphery of the positive electrode active material, which allows prevention of dispersion of the positive electrode active material and the breakage of the positive electrode active material layer. That is to say, the graphene has a function of maintaining the bond between the positive electrode active materials even when the volume of the positive electrode active materials fluctuates by charge and discharge.

The graphene 254 is in contact with the plurality of particles of the positive electrode active material 253 and serves also as a conductive additive. Further, the graphene 254 has a function of holding the positive electrode active material 253 capable of occluding and releasing carrier ions. Thus, a binder does not have to be mixed into the positive electrode active material layer 252. Accordingly, the amount of the positive electrode active material in the positive electrode active material layer can be increased, which allows an increase in discharge capacity of non-aqueous secondary batteries.

Next, description is given of a method for forming the positive electrode active material layer 252.

First, slurry containing particulate positive electrode active materials and graphene oxide is formed. Next, the slurry is applied to the positive electrode current collector 251. Then, heating is performed in a reduced atmosphere for reduction treatment so that the positive electrode active materials are baked and oxygen included in the graphene oxide is extracted to form graphene. Note that oxygen in the graphene oxide is not entirely extracted and partly remains in the graphene. Through the above process, the positive electrode active material layer 252 can be formed over the positive electrode current collector 251. Consequently, the positive electrode active material layer 252 has higher conductivity.

Graphene oxide contains oxygen and thus is negatively charged in a polar solvent. As a result of being negatively charged, graphene oxide is dispersed in the polar solvent. Therefore, particles of the positive electrode active material contained in the slurry are not easily aggregated, so that the size of the particle of the positive electrode active material can be prevented from increasing due to aggregation. Thus, the transfer of electrons in the positive electrode active materials is facilitated, resulting in an increase in conductivity of the positive electrode active material layer.

Next, a structure and a method for manufacturing a lithium secondary battery are described with reference to FIGS. 5A and 5B. Here, a cross-sectional structure of the lithium ion secondary battery is described below.

(Coin-Type Lithium Ion Battery)

Figure 5A:
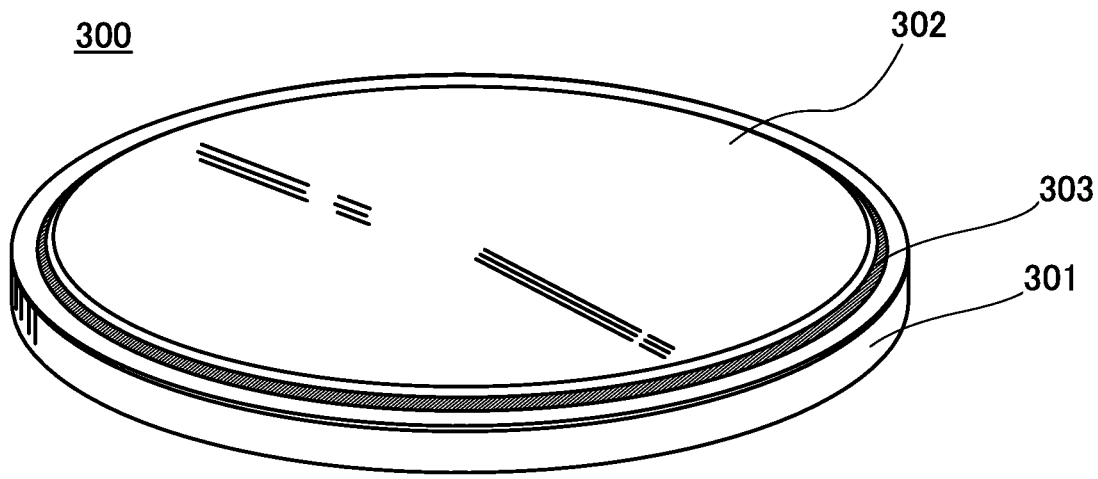
FIGS. 5A and 5B illustrate a coin-type lithium ion battery.
Figure 5B:
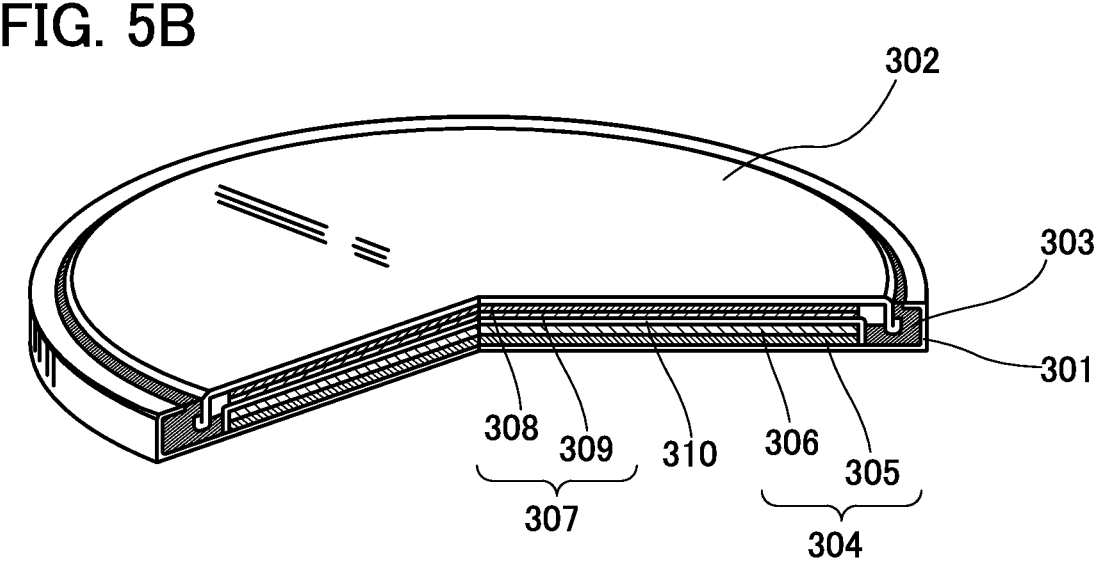

FIG. 5A is an external view of a coin-type (single-layer flat type) lithium ion battery, and FIG. 5B is a cross-sectional view thereof.

In a coin-type lithium ion battery 300, a positive electrode can 301 serving also as a positive electrode terminal and a negative electrode can 302 serving also as a negative electrode terminal are insulated and sealed with a gasket 303 formed of polypropylene or the like. In a manner similar to that of the above, a positive electrode 304 includes a positive electrode current collector 305 and a positive electrode active material layer 306 which is provided to be in contact with the positive electrode current collector 305. On the other hand, a negative electrode 307 includes a negative electrode current collector 308 and a negative electrode active material layer 309 which is provided to be in contact with the negative electrode current collector 308. A separator 310 and an electrolyte (not illustrated) are included between the positive electrode active material layer 306 and the negative electrode active material layer 309.

As the negative electrode 307, the negative electrode described in any of Embodiments 1 to 3 is used. As the positive electrode 304, the positive electrode 250 described in this embodiment can be used.

For the separator 310, an insulator such as cellulose (paper), polypropylene with pores, or polyethylene with pores can be used.

As the electrolyte of an electrolyte solution, a material which contains carrier ions is used. Typical examples of the electrolyte include lithium salts such as $LiClO_4$, $LiAsF_6$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, $LiN(C_2F_5SO_2)_2$, and the like.

In the case where carrier ions are alkali metal ions other than lithium ions, alkaline-earth metal ions, beryllium ions, or magnesium ions, the electrolyte may contain, instead of lithium in the lithium salts, an alkali metal (e.g., sodium or potassium), an alkaline-earth metal (e.g., calcium, strontium, or barium), beryllium, or magnesium.

As a solvent for the electrolyte solution, a material that can transfer carrier ions is used. As the solvent for the electrolyte solution, an aprotic organic solvent is preferably used. Typical examples of aprotic organic solvents include ethylene carbonate (EC), propylene carbonate, butylene carbonate, chloroethylene carbonate, vinylene carbonate, dimethyl carbonate, diethyl carbonate (DEC), ethyl methyl carbonate (EMC), γ-butyrolactone, γ-valerolactone, methyl formate, methyl acetate, methyl butyrate, 1,3-dioxane, 1,4-dioxane, dimethyl sulfoxide, diethyl ether, methyl diglyme, acetonitrile, benzonitrile, dimethoxyethane, tetrahydrofuran, sulfolane, and sultone, and one or more of these materials can be used. When a gelled high-molecular material is used as the solvent for the electrolyte solution, safety against liquid leakage and the like is improved. Further, a lithium ion battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which are less likely to burn and volatilize as the solvent for the electrolyte solution can prevent the lithium ion battery from exploding or catching fire even when the secondary battery internally shorts out or the internal temperature increases due to overcharging or the like.

Instead of the electrolyte solution, a solid electrolyte including a sulfide-based inorganic material, an oxide-based inorganic material, or the like, or a solid electrolyte including a polyethylene oxide (PEO)-based high-molecular material or the like can be used. In the case of using the solid electrolyte, a separator is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistant property to a liquid (e.g., an electrolyte solution) in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 5B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type lithium ion battery 300 is manufactured.

(Laminated Lithium Ion Battery)

Next, an example of a laminated lithium ion battery is described with reference to FIG. 6.

Figure 6:
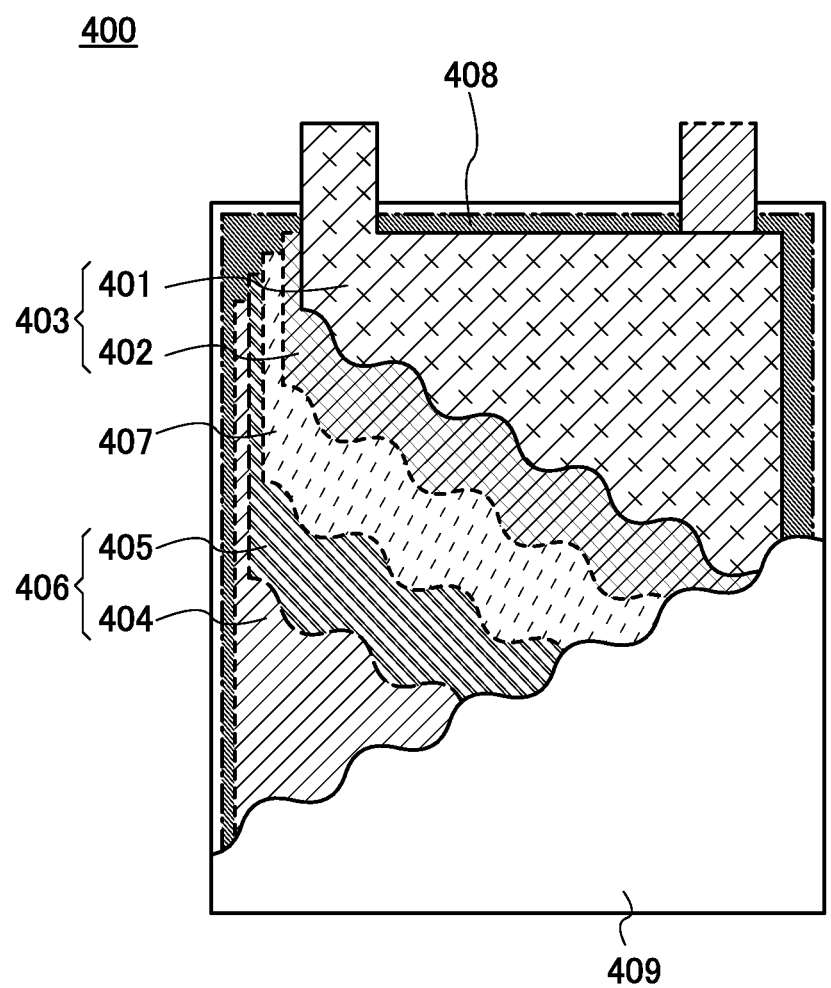
FIG. 6 illustrates a laminated lithium ion battery.

In a laminated lithium ion battery 400 illustrated in FIG. 6, a positive electrode 403 including a positive electrode current collector 401 and a positive electrode active material layer 402, a separator 407, and a negative electrode 406 including a negative electrode current collector 404 and a negative electrode active material layer 405 are stacked and sealed in an exterior body 409, and then an electrolyte solution 408 is injected into the exterior body 409. Although FIG. 6 illustrates the laminated lithium ion battery 400 with a structure in which one sheet-like positive electrode 403 and one sheet-like negative electrode 406 are stacked, to increase the capacity of the battery, the stack is preferably wound or a plurality of positive electrodes and negative electrodes are stacked and then laminated. Particularly in the case of the laminated lithium ion battery, the battery has flexibility and thus is suitable for applications which require flexibility.

In the laminated lithium ion battery 400 illustrated in FIG. 6, the positive electrode current collector 401 and the negative electrode current collector 404 serve as terminals for an electrical contact with the outside. For this reason, the positive electrode current collector 401 and the negative electrode current collector 404 are arranged so that part of the positive electrode current collector 401 and part of the negative electrode current collector 404 are exposed outside the exterior body 409.

As the exterior body 409 in the laminated lithium ion battery 400, for example, a laminate film having a three-layer structure in which a highly flexible metal thin film of aluminum, stainless steel, copper, nickel, or the like is provided over the inner surface of a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of an electrolytic solution and a gas can be blocked and an insulating property and resistance to the electrolytic solution can be provided.

(Cylindrical Lithium Ion Battery)

Figure 7A:
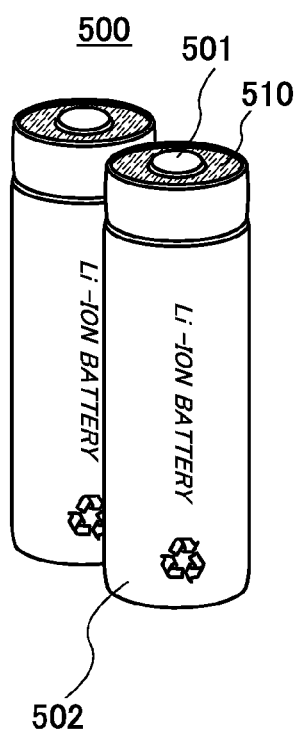
FIGS. 7A and 7B illustrate a cylindrical lithium ion battery.

Next, an example of a cylindrical lithium ion battery is described with reference to FIGS. 7A and 7B. As illustrated in FIG. 7A, a cylindrical lithium ion battery 500 includes a positive electrode cap (battery lid) 501 on its top surface and a battery can (exterior can) 502 on its side surface and bottom surface. The positive electrode cap 501 and the battery can 502 are insulated from each other by a gasket 510

(Insulating Packing)

Figure 7B:
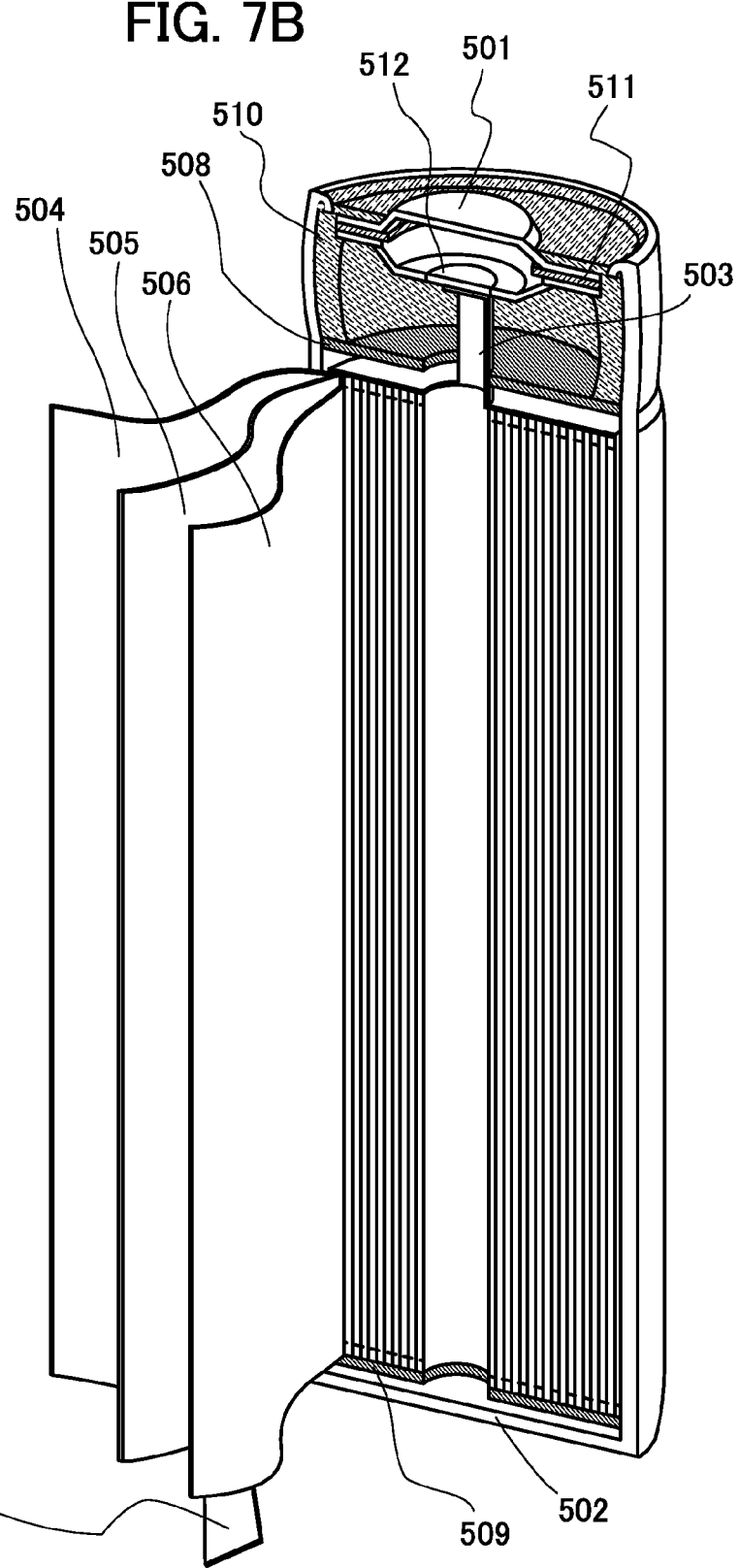

FIG. 7B is a diagram schematically illustrating a cross section of the cylindrical lithium ion battery. In the battery can 502 with a hollow cylindrical shape, a battery element is provided in which a strip-like positive electrode 504 and a strip-like negative electrode 506 are wound with a separator 505 provided therebetween. Although not illustrated, the battery element is wound around a center pin as a center. One end of the battery can 502 is close and the other end thereof is open. For the battery can 502, a metal having a corrosion-resistant property to a liquid (e.g., an electrolyte solution) in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 502, the battery element in which the positive electrode, the negative electrode, and the separator are wound is interposed between a pair of insulating plates 508 and 509 which face each other. Further, an electrolyte solution (not illustrated) is injected inside the battery can 502 in which the battery element is provided. An electrolyte solution which is similar to that of the coin-type lithium ion battery or the laminated lithium ion battery can be used.

Although the positive electrode 504 and the negative electrode 506 can be formed in a manner similar to that of the positive electrode and the negative electrode of the coin-type lithium ion battery, the difference lies in that, since the positive electrode and the negative electrode of the cylindrical lithium ion battery are wound, active materials are formed on both sides of the current collectors. A positive electrode terminal (positive electrode current collecting lead) 503 is connected to the positive electrode 504, and a negative electrode terminal (negative electrode current collecting lead) 507 is connected to the negative electrode 506. A metal material such as aluminum can be used for both the positive electrode terminal 503 and the negative electrode terminal 507. The positive electrode terminal 503 is resistance-welded to a safety valve mechanism 512, and the negative electrode terminal 507 is resistance-welded to the bottom of the battery can 502. The safety valve mechanism 512 is electrically connected to the positive electrode cap 501 through a positive temperature coefficient (PTC) element 511. The safety valve mechanism 512 cuts off electrical connection between the positive electrode cap 501 and the positive electrode 504 when the internal pressure of the battery increases and exceeds a predetermined threshold value. The PTC element 511 is a heat sensitive resistor whose resistance increases as temperature rises, and controls the amount of current by increase in resistance to prevent unusual heat generation. Barium titanate ($BaTiO_3$)-based semiconductor ceramic or the like can be used for the PTC element.

Note that in this embodiment, the coin-type lithium ion battery, the laminated lithium ion battery, and the cylindrical lithium ion battery are given as examples of the lithium ion battery; however, any of lithium ion batteries with various shapes, such as a sealing-type lithium ion battery and a square-type lithium ion battery, can be used. Further, a structure in which a plurality of positive electrodes, a plurality of negative electrodes, and a plurality of separators are stacked or wound may be employed.

The negative electrode for a power storage device which is one embodiment of the present invention is used as the negative electrode in each of the lithium ion battery 300, the lithium ion battery 400, and the lithium ion battery 500 described in this embodiment. Thus, the lithium ion battery 300, the lithium ion battery 400, and the lithium ion battery 500 can have favorable cycle performance. In addition, generation of irreversible capacity can be prevented in initial charge and discharge; moreover, a lithium ion battery with favorable high temperature characteristics can be provided.

This embodiment can be implemented in combination with any of the other embodiments as appropriate.

Embodiment 5

In this embodiment, a lithium ion capacitor is described as a power storage device.

The lithium ion capacitor is a hybrid capacitor which combines a positive electrode of an electrical double layer capacitor (EDLC) and a negative electrode of a lithium ion battery using a carbon material, and also an asymmetric capacitor in which the principles of power storage are different between the positive electrode and the negative electrode. The positive electrode forms an electrical double layer and enables charge and discharge by a physical action, whereas the negative electrode enables charge and discharge by a chemical action of lithium. With the use of a negative electrode in which lithium is occluded in advance as the carbon material or the like that is a negative electrode active material, the lithium ion capacitor can have energy density dramatically higher than that of a conventional electrical double layer capacitor including a negative electrode using active carbon.

In the lithium ion capacitor, instead of the positive electrode active material layer in the lithium ion battery described in Embodiment 4, a material that can occlude at least one of lithium ions and anions may be used. Examples of such a material include active carbon, a conductive high molecule, a polyacene-based organic semiconductor (PAS), and the like.

The lithium ion capacitor has high efficiency of charge and discharge, capability of rapidly performing charge and discharge, and a long life even when it is repeatedly used.

As the negative electrode of such a lithium ion capacitor, the negative electrode for a power storage device described in any of Embodiments 1 to 3 is used. Thus, irreversible capacity generated in initial charge and discharge is suppressed, so that a power storage device having improved cycle performance can be manufactured. Further, a power storage device having excellent high temperature characteristics can be manufactured.

This embodiment can be implemented in combination with any of the other embodiments as appropriate.

Embodiment 6

A power storage device of one embodiment of the present invention can be used as a power supply of various electrical appliances which are driven by electric power.

Specific examples of electrical appliances each using the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, portable wireless devices, mobile phones, car phones, portable game machines, calculators, portable information terminals, electronic notebooks, e-book readers, electronic translators, audio input devices, video cameras, digital still cameras, toys, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, and medical equipment such as dialyzers. The examples also include industrial equipment such as guide lights, traffic lights, belt conveyors, elevators, escalators, industrial robots, power storage systems, and power storage devices for leveling the amount of power supply and smart grid. In addition, moving objects driven by an electric motor using power from a power storage device are also included in the category of electrical appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

In the above electrical appliances, the power storage device of one embodiment of the present invention can be used as a main power source for supplying enough power for almost the whole power consumption. Alternatively, in the above electrical appliances, the power storage device of one embodiment of the present invention can be used as an uninterruptible power source which can supply power to the electrical appliances when the supply of power from the main power source or a commercial power source is stopped. Still alternatively, in the above electrical appliances, the power storage device of one embodiment of the present invention can be used as an auxiliary power source for supplying power to the electrical appliances at the same time as the power supply from the main power source or a commercial power source.

Figure 8:
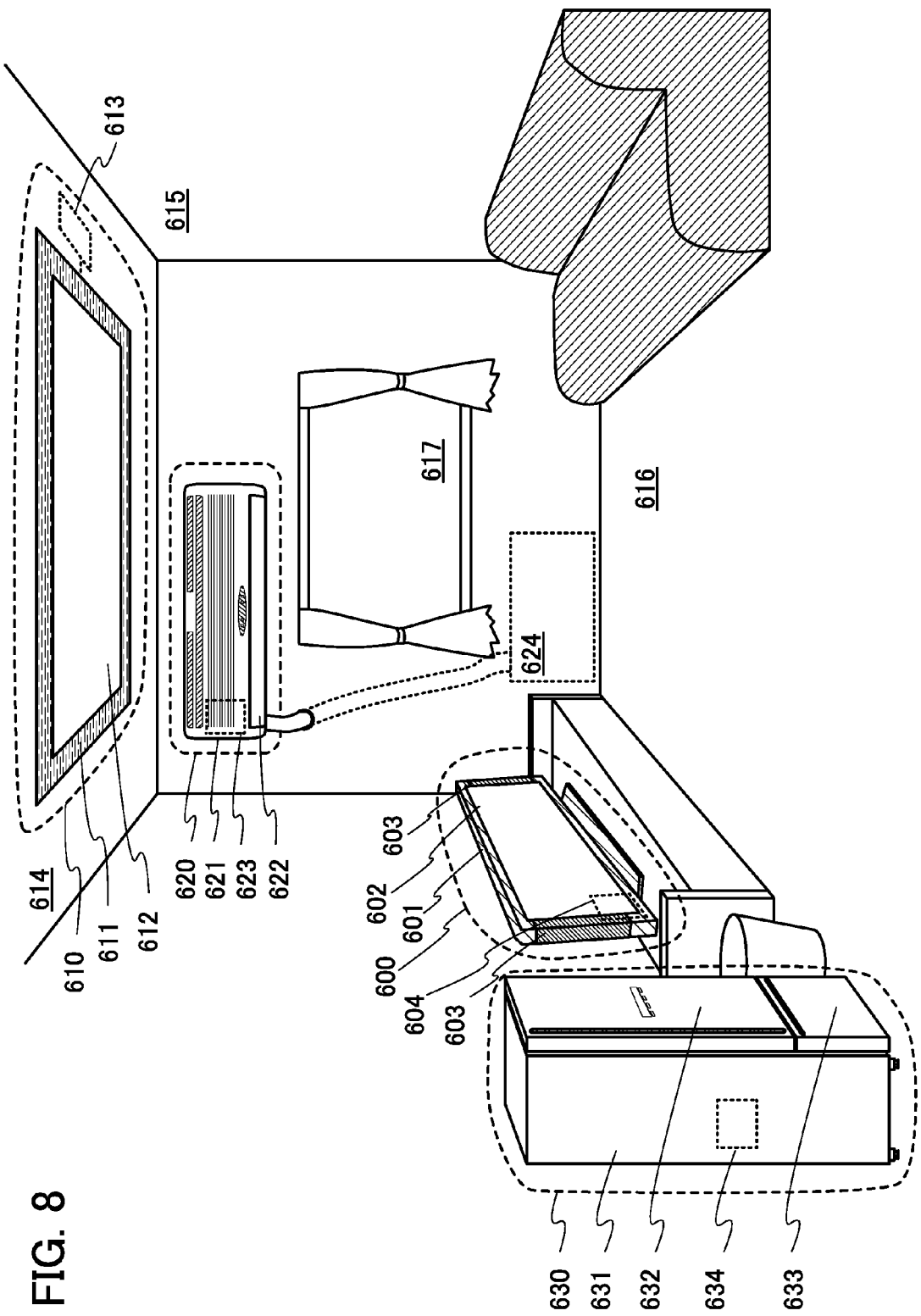
FIG. 8 illustrates electrical appliances.

FIG. 8 illustrates specific structures of the electrical appliances. In FIG. 8, a display device 600 is an example of an electrical appliance using a power storage device 604 of one embodiment of the present invention. Specifically, the display device 600 corresponds to a display device for TV broadcast reception and includes a housing 601, a display portion 602, speaker portions 603, the power storage device 604, and the like. The power storage device 604 of one embodiment of the present invention is provided in the housing 601. The display device 600 can receive power from a commercial power source. Alternatively, the display device 600 can use power stored in the power storage device 604. Thus, the display device 600 can be operated with the use of the power storage device 604 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 602.

Note that the display device includes, in its category, all of information display devices for personal computers, advertisement displays, and the like in addition to TV broadcast reception.

In FIG. 8, an installation lighting device 610 is an example of an electrical appliance using a power storage device 613 of one embodiment of the present invention. Specifically, the installation lighting device 610 includes a housing 611, a light source 612, the power storage device 613, and the like. Although FIG. 8 illustrates the case where the power storage device 613 is provided in a ceiling 614 on which the housing 611 and the light source 612 are installed, the power storage device 613 may be provided in the housing 611. The installation lighting device 610 can receive power from a commercial power source. Alternatively, the installation lighting device 610 can use power stored in the power storage device 613. Thus, the installation lighting device 610 can be operated with the use of the power storage device 613 of one embodiment of the present invention as an uninterruptible power source even when power cannot be supplied from a commercial power source due to power failure or the like.

Note that although the installation lighting device 610 provided in the ceiling 614 is illustrated in FIG. 8 as an example, the power storage device of one embodiment of the present invention can be used as an installation lighting device provided in, for example, a wall 615, a floor 616, a window 617, or the like other than the ceiling 614. Alternatively, the power storage device can be used in a tabletop lighting device or the like.

As the light source 612, an artificial light source which emits light artificially by using power can be used. Specifically, an incandescent lamp, a discharge lamp such as a fluorescent lamp, and a light-emitting element such as an LED and an organic EL element are given as examples of the artificial light source.

In FIG. 8, an air conditioner including an indoor unit 620 and an outdoor unit 624 is an example of an electrical appliance using a power storage device 623 of one embodiment of the present invention. Specifically, the indoor unit 620 includes a housing 621, an air outlet 622, the power storage device 623, and the like. Although FIG. 8 illustrates the case where the power storage device 623 is provided in the indoor unit 620, the power storage device 623 may be provided in the outdoor unit 624. Alternatively, the power storage device 623 may be provided in both the indoor unit 620 and the outdoor unit 624. The air conditioner can receive power from a commercial power source. Alternatively, the air conditioner can use power stored in the power storage device 623. Particularly in the case where the power storage devices 623 are provided in both the indoor unit 620 and the outdoor unit 624, the air conditioner can be operated with the use of the power storage device 623 of one embodiment of the present invention as an uninterruptible power source even when power cannot be supplied from a commercial power source due to power failure or the like.

Note that although the split-type air conditioner including the indoor unit and the outdoor unit is illustrated in FIG. 8 as an example, the power storage device of one embodiment of the present invention can be used in an air conditioner in which the functions of an indoor unit and an outdoor unit are integrated in one housing.

In FIG. 8, an electric refrigerator-freezer 630 is an example of an electrical appliance using a power storage device 634 of one embodiment of the present invention. Specifically, the electric refrigerator-freezer 630 includes a housing 631, a door for a refrigerator 632, a door for a freezer 633, the power storage device 634, and the like. The power storage device 634 is provided inside the housing 631 in FIG. 8. The electric refrigerator-freezer 630 can receive power from a commercial power source. Alternatively, the electric refrigerator-freezer 630 can use power stored in the power storage device 634. Thus, the electric refrigerator-freezer 630 can be operated with the use of the power storage device 634 of one embodiment of the present invention as an uninterruptible power source even when power cannot be supplied from a commercial power source due to power failure or the like.

Note that among the electrical appliances described above, a high-frequency heating apparatus such as a microwave oven and an electrical appliance such as an electric rice cooker require high power in a short time. The tripping of a circuit breaker of a commercial power source in use of electrical appliances can be prevented by using the power storage device of one embodiment of the present invention as an auxiliary power source for supplying power which cannot be supplied enough by a commercial power source.

In addition, in a time period when electrical appliances are not used, particularly when the proportion of the amount of power which is actually used to the total amount of power which can be supplied from a commercial power source (such a proportion referred to as a usage rate of power) is low, power can be stored in the power storage device, whereby the usage rate of power can be reduced in a time period when the electrical appliances are used. For example, in the case of the electric refrigerator-freezer 630, power can be stored in the power storage device 634 in nighttime when the temperature is low and the door for a refrigerator 632 and the door for a freezer 633 are not often opened and closed. On the other hand, in daytime when the temperature is high and the door for a refrigerator 632 and the door for a freezer 633 are frequently opened and closed, the power storage device 634 is used as an auxiliary power source; thus, the usage rate of power in daytime can be reduced.

This embodiment can be implemented in combination with any of the other embodiments as appropriate.

Embodiment 7

Next, a portable information terminal which is an example of an electrical appliance is described with reference to FIGS. 9A to 9C.

Figure 9A:
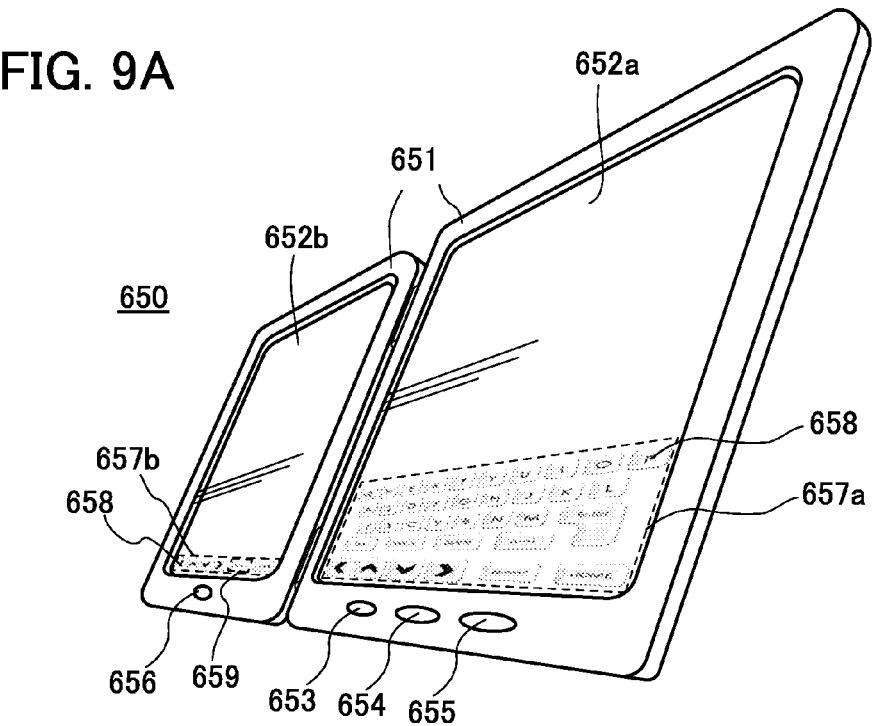
FIGS. 9A to 9C illustrate an electrical appliance.
Figure 9B:
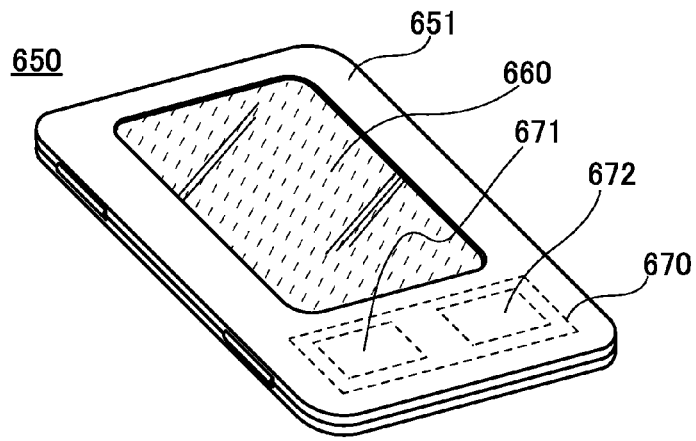

FIGS. 9A and 9B illustrate a tablet terminal 650 that can be folded. FIG. 9A illustrates the tablet terminal 650 in the state of being unfolded. The tablet terminal 650 includes a housing 651, a display portion 652a, a display portion 652b, a switch 653 for switching display modes, a power switch 654, a switch 655 for switching to power-saving-mode, and an operation switch 656.

Part of the display portion 652a can be a touch panel region 657a and data can be input when a displayed operation key 658 is touched. Note that FIG. 9A illustrates, as an example, that half of the area of the display portion 652a has only a display function and the other half of the area has a touch panel function. However, the structure of the display portion 652a is not limited to this, and all the area of the display portion 652a may have a touch panel function. For example, all the area of the display portion 652a can display keyboard buttons and serve as a touch panel while the display portion 652b can be used as a display screen.

Like the display portion 652a, part of the display portion 652b can be a touch panel region 657b. When a finger, a stylus, or the like touches the place where a button 659 for switching to keyboard display is displayed in the touch panel, keyboard buttons can be displayed on the display portion 652b.

Touch input can be performed on the touch panel regions 657a and 657b at the same time.

The switch 653 for switching display modes can switch the display between portrait mode, landscape mode, and the like, and between monochrome display and color display, for example. With the switch 655 for switching to power-saving mode, the luminance of display can be optimized depending on the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor.

Although the display area of the display portion 652a is the same as that of the display portion 652b in FIG. 9A, one embodiment of the present invention is not particularly limited thereto. The display area of the display portion 652a may be different from that of the display portion 652b, and further, the display quality of the display portion 652a may be different from that of the display portion 652b. For example, one of them may be a display panel that can display higher-definition images than the other.

FIG. 9B illustrates the tablet terminal 650 in the state of being closed. The tablet terminal 650 includes the housing 651, a solar cell 660, a charge and discharge control circuit 670, a battery 671, and a DCDC converter 672. Note that FIG. 9B illustrates an example in which the charge and discharge control circuit 670 includes the battery 671 and the DCDC converter 672, and the battery 671 includes the power storage device described in any of the above embodiments.

Since the tablet terminal 650 can be folded, the housing 651 can be closed when the tablet terminal 650 is not in use. Thus, the display portions 652a and 652b can be protected, thereby providing the tablet terminal 650 with excellent endurance and excellent reliability for long-term use.

The tablet terminal illustrated in FIGS. 9A and 9B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 660, which is attached on the surface of the tablet terminal 650, supplies power to the touch panel, the display portion, a video signal processor, and the like. Note that the solar cell 660 is preferably provided on one or two surfaces of the housing 651, in which case the battery 671 can be charged efficiently. The use of the power storage device of one embodiment of the present invention as the battery 671 has advantages such as a reduction is size.

The structure and operation of the charge and discharge control circuit 670 illustrated in FIG. 9B are described with reference to a block diagram in FIG. 9C. The solar cell 660, the battery 671, the DCDC converter 672, a converter 673, switches SW1 to SW3, and the display portion 652 are illustrated in FIG. 9C, and the battery 671, the DCDC converter 672, the converter 673, and the switches SW1 to SW3 correspond to the charge and discharge control circuit 670 illustrated in FIG. 9B.

First, an example of the operation in the case where power is generated by the solar cell 660 using external light is described. The voltage of power generated by the solar cell 660 is raised or lowered by the DCDC converter 672 so that the power has a voltage for charging the battery 671. Then, when the power from the solar cell 660 is used for the operation of the display portion 652, the switch SW1 is turned on and the voltage of the power is raised or lowered by the converter 673 so as to be a voltage needed for the display portion 652. In addition, when display on the display portion 652 is not performed, the switch SW1 may be turned off and the switch SW2 may be turned on so that the battery 671 is charged.

Here, the solar cell 660 is described as an example of a power generation means; however, there is no particular limitation on the power generation means, and the battery 671 may be charged with another power generation means such as a piezoelectric element or a thermoelectric conversion element (Peltier element). For example, the battery 671 may be charged with a non-contact power transmission module that transmits and receives power wirelessly (without contact) to charge the battery or with a combination of other charging means.

Figure 9C:
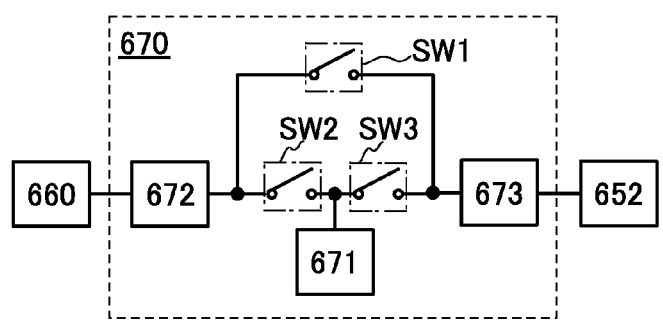

It is needless to say that one embodiment of the present invention is not limited to the electrical appliance illustrated in FIGS. 9A to 9C as long as the electrical appliance is equipped with the power storage device described in any of the above embodiments.

Embodiment 8

Further, an example of the moving object which is an example of the electrical appliance is described with reference to FIGS. 10A and 10B.

Any of the power storage device described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 10A:
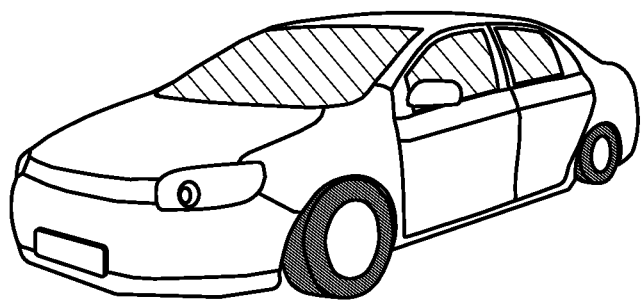
FIGS. 10A and 10B illustrate an electrical appliance.
Figure 10B:
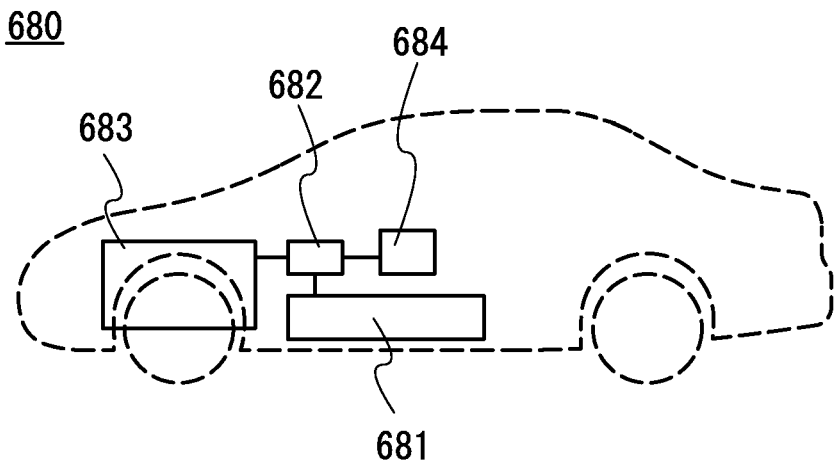

FIGS. 10A and 10B illustrate an example of an electric vehicle. An electric vehicle 680 is equipped with a battery 681. The output of the power of the battery 681 is adjusted by a control circuit 682 and the power is supplied to a driving device 683. The control circuit 682 is controlled by a processing unit 684 including a ROM, a RAM, a CPU, or the like which is not illustrated.

The driving device 683 includes a DC motor or an AC motor either alone or in combination with an internal-combustion engine. The processing unit 684 outputs a control signal to the control circuit 682 based on input data such as data on operation (e.g., acceleration, deceleration, or stop) by a driver of the electric vehicle 680 or data on driving the electric vehicle 680 (e.g., data on an upgrade or a downgrade, or data on a load on a driving wheel). The control circuit 682 adjusts the electric energy supplied from the battery 681 in response to the control signal of the processing unit 684 to control the output of the driving device 683. In the case where the AC motor is mounted, although not illustrated, an inverter which converts direct current into alternate current is also incorporated.

The battery 681 can be charged by external electric power supply using a plug-in technique. For example, the battery 681 is charged through a power plug from a commercial power source. The battery 681 can be charged by converting external power into DC constant voltage having a predetermined voltage level through a converter such as an ACDC converter. When the power storage device of one embodiment of the present invention is provided as the battery 681, capacity of the battery 681 can be increased and improved convenience can be realized. When the battery 681 itself can be made compact and lightweight with improved characteristics of the battery 681, the vehicle can be made lightweight, leading to an increase in fuel efficiency.

Note that it is needless to say that one embodiment of the present invention is not limited to the electrical appliance described above as long as the power storage device of one embodiment of the present invention is included.

This embodiment can be implemented in combination with any of the other embodiments as appropriate.

EXAMPLE 1

The present invention is described in detail below with Examples. Note that the present invention is not limited to Examples below.

(Evaluation of Film by XRD)

A structure of niobium oxide was evaluated by X-ray Diffraction (XRD). Here, graphite was not used. Niobium which is a gel was formed by a sol-gel method, put into a crucible, and baked at 600° C. for 3 hours to form niobium oxide, and the niobium oxide was measured. The measurement results obtained by XRD are shown in FIG. 11.

Figure 11:
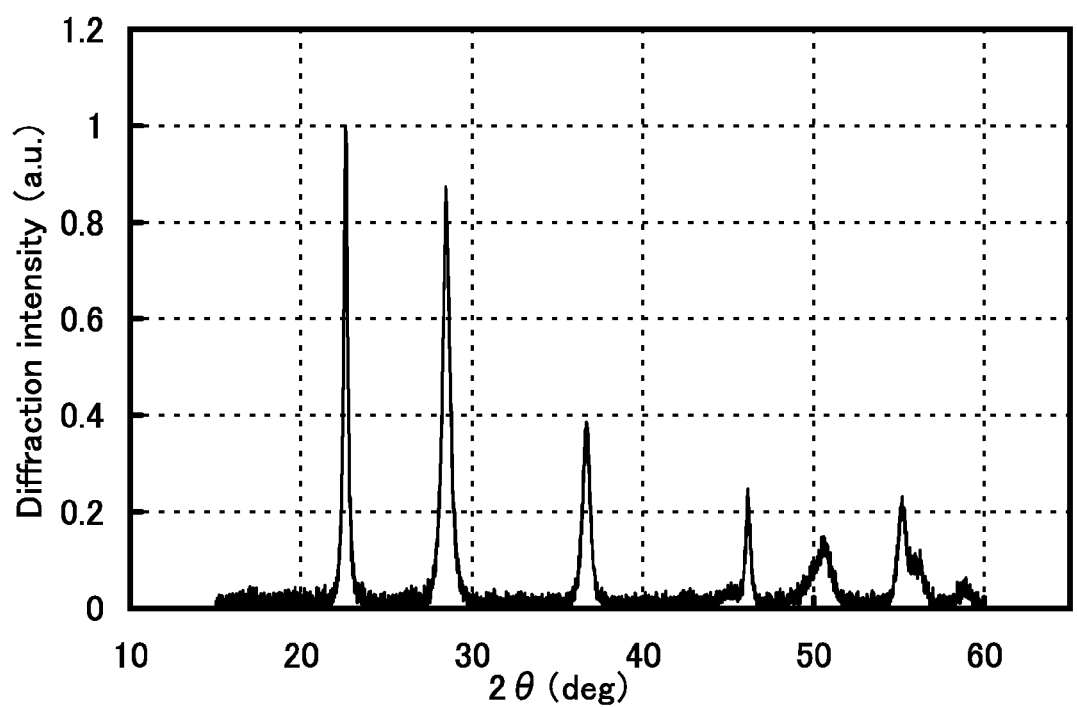
FIG. 11 shows X-ray diffraction spectrum.

In FIG. 11, the horizontal axis represents an X-ray diffraction angle and the vertical axis represents an X-ray diffraction intensity. Peaks of the XRD spectrum represent intensity of an X-ray which reflects at a crystal lattice surface. The larger intensity of a peak of the spectrum and the narrower the half bandwidth, the higher the crystallinity. Note that the crystal lattice surface and the X-ray diffraction angle correspond to each other, and a location where the peak of the XRD spectrum appears (a diffraction angle of 2θ) varies depending on a crystal structure and the crystal lattice surface.

The measurement results in FIG. 11 show that the film formed by the sol-gel method is $Nb_2O_5$ having a hexagonal crystal structure with a space group of P63/mmc.

Note that the sample of niobium oxide for this measurement by XRD was baked at 600° C., and even a sample baked at 500° C. had a similar crystal structure. On the other hand, a sample baked at low temperatures ranging from 200° C. to 300° C. becomes amorphous fine particles.

(Formation of Particulate Graphite Having Film)

Next, a negative electrode active material having a niobium oxide film was formed. As the negative electrode active material, graphite produced by JFE Chemical Corporation was used. First, as described in Embodiment 2, $Nb(OEt)_5$ and ethyl acetoacetate serving as a stabilizing agent to which toluene was added were stirred, so that a $Nb(OEt)_5$ toluene solution was formed. The compounding ratio of this solution was as follows: the $Nb(OEt)_5$ was $3.14 \times 10^{-4}$ mol; the ethyl acetoacetate, $6.28 \times 10^{-4}$ mol; and the toluene, 2 ml. Next, the $Nb(OEt)_5$ toluene solution to which particulate graphite that is the negative electrode active material was added was stirred in a dry room. Then, the solution was held at 50° C. in a humid environment for 3 hours so that the $Nb(OEt)_5$ in the $Nb(OEt)_5$ toluene solution to which the graphite was added was hydrolyzed and condensed. In other words, the $Nb(OEt)_5$ in the solution was made to react with water in the air so that hydrolysis reaction gradually occurs, and the $Nb(OEt)_5$ was condensed by dehydration reaction which sequentially occurred. In such a manner, niobium which is a gel was attached on the surface of the particulate graphite. Then, baking was performed at 500° C. in the air for 3 hours, whereby particulate graphite covered with a film formed of niobium oxide was formed.

(Observation of Film with Electron Microscope)

Figure 12A:
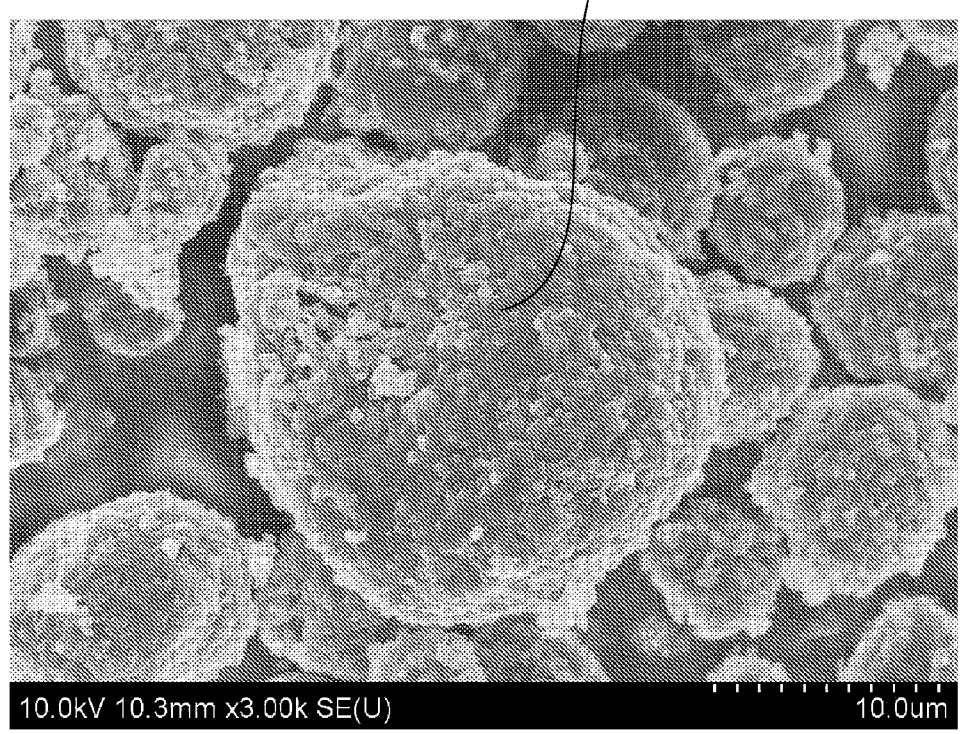
FIGS. 12A and 12B are SEM images.
Figure 12B:
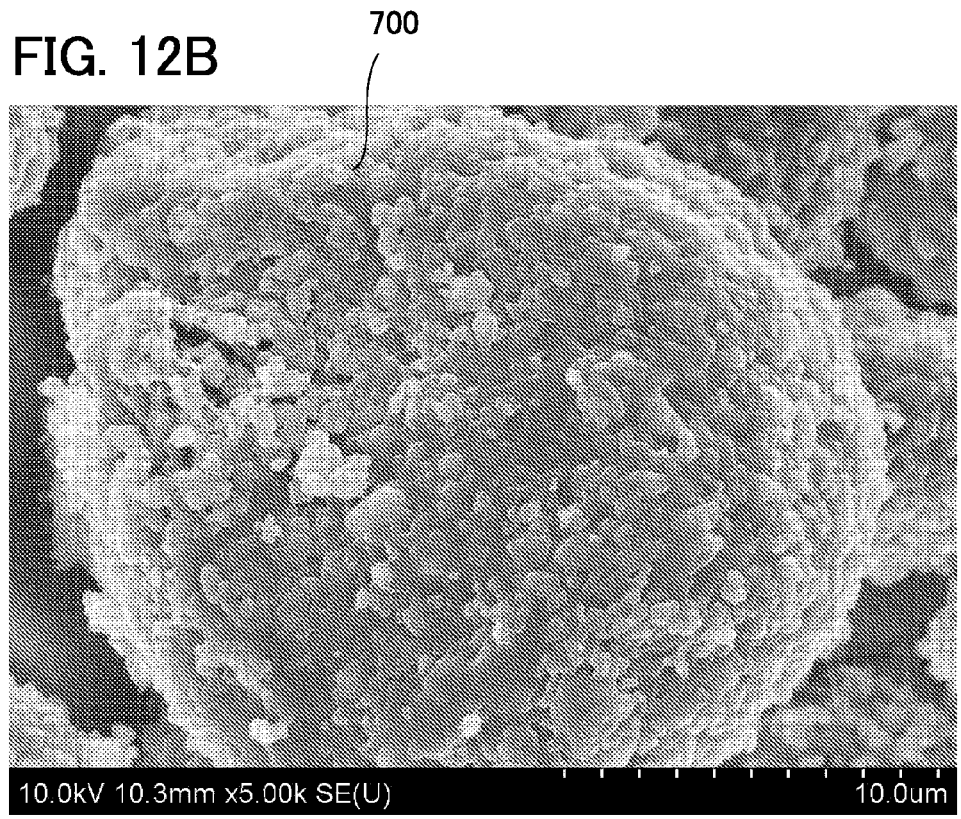

FIGS. 12A, 12B, 13A, and 13B are images of particulate graphite observed with a scanning electron microscope (SEM). FIGS. 12A and 12B are the SEM images of particulate graphite 700 which is not provided with a niobium oxide film. FIG. 12A is the SEM image at 3000-fold magnification, and FIG. 12B is the SEM image at 5000-fold magnification of part of the SEM image in FIG. 12A. The particulate graphite 700 with a diameter of approximately 20 μm and a rough surface is observed, and small particles aggregated on the surface of the particulate graphite 700 are observed.

Figure 13A:
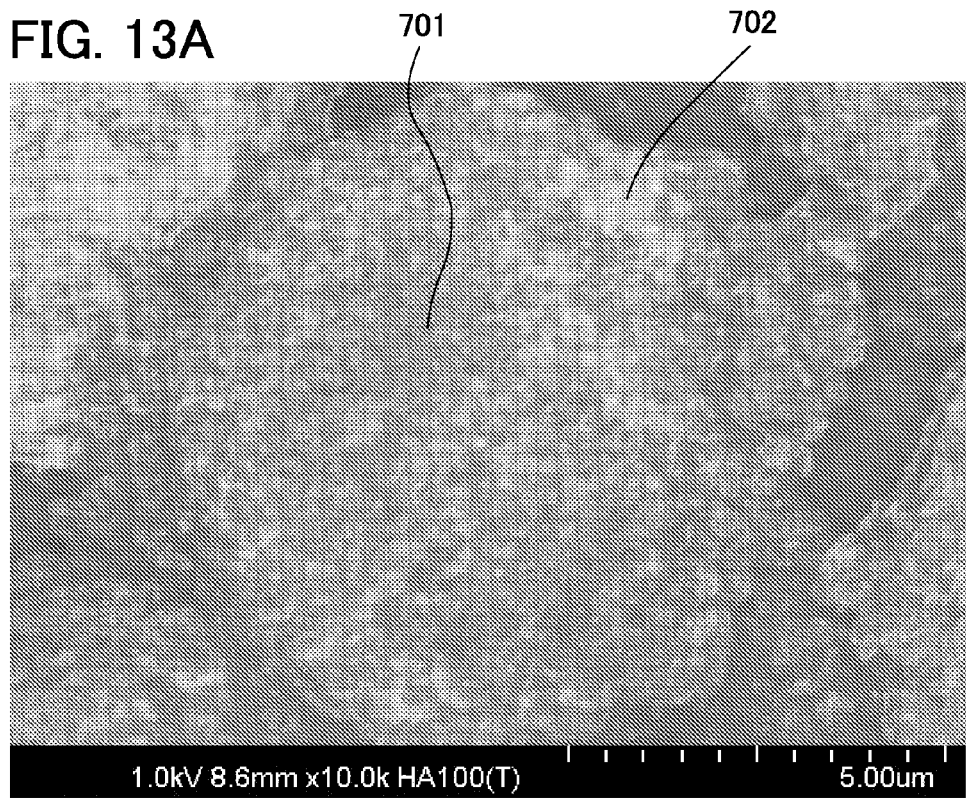
FIGS. 13A and 13B are SEM images.
Figure 13B:
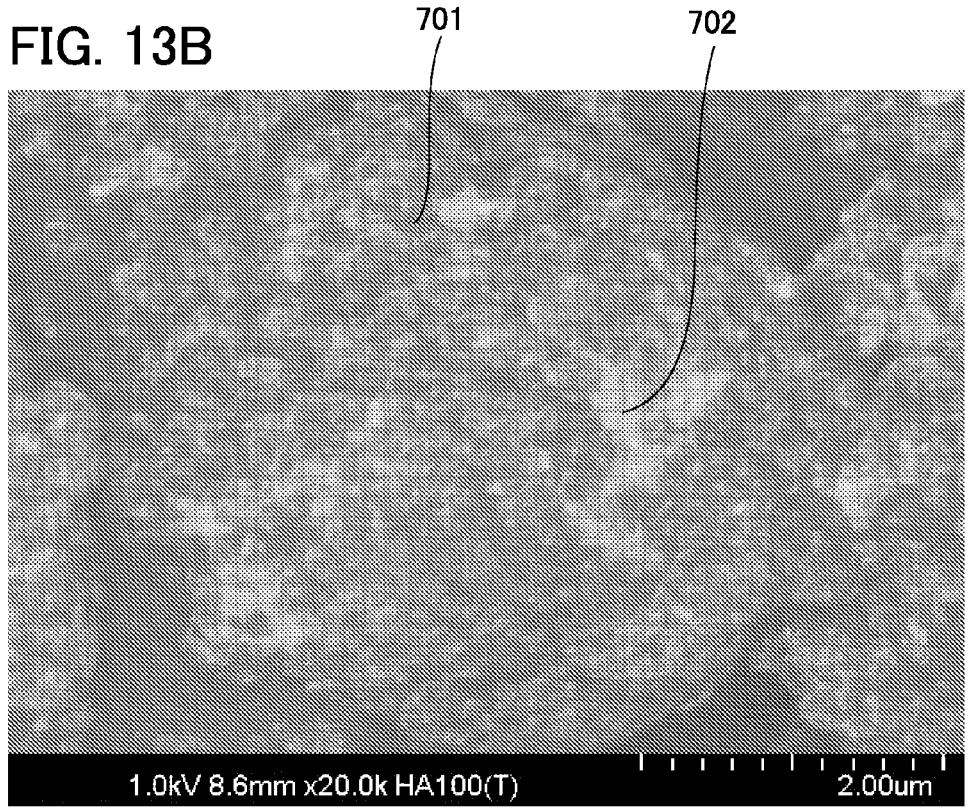

FIGS. 13A and 13B are the SEM images of the particulate graphite shown in FIGS. 12A and 12B the surface of which is covered with a niobium oxide film by the sol-gel method. Regions in a dark gray color in the SEM images of FIGS. 13A and 13B represent particulate graphite 701. On the other hand, white spot regions on the surface of the particulate graphite 701 are portions where niobium oxide films 702 are formed. As described above, from difference in contrast, the regions where the niobium oxide films are formed and the regions where the niobium films are not formed can be observed in the SEM images. It is observed that the niobium oxide films do not completely cover the surface of the particulate graphite 701, but the surface is partly covered.

Figure 14:
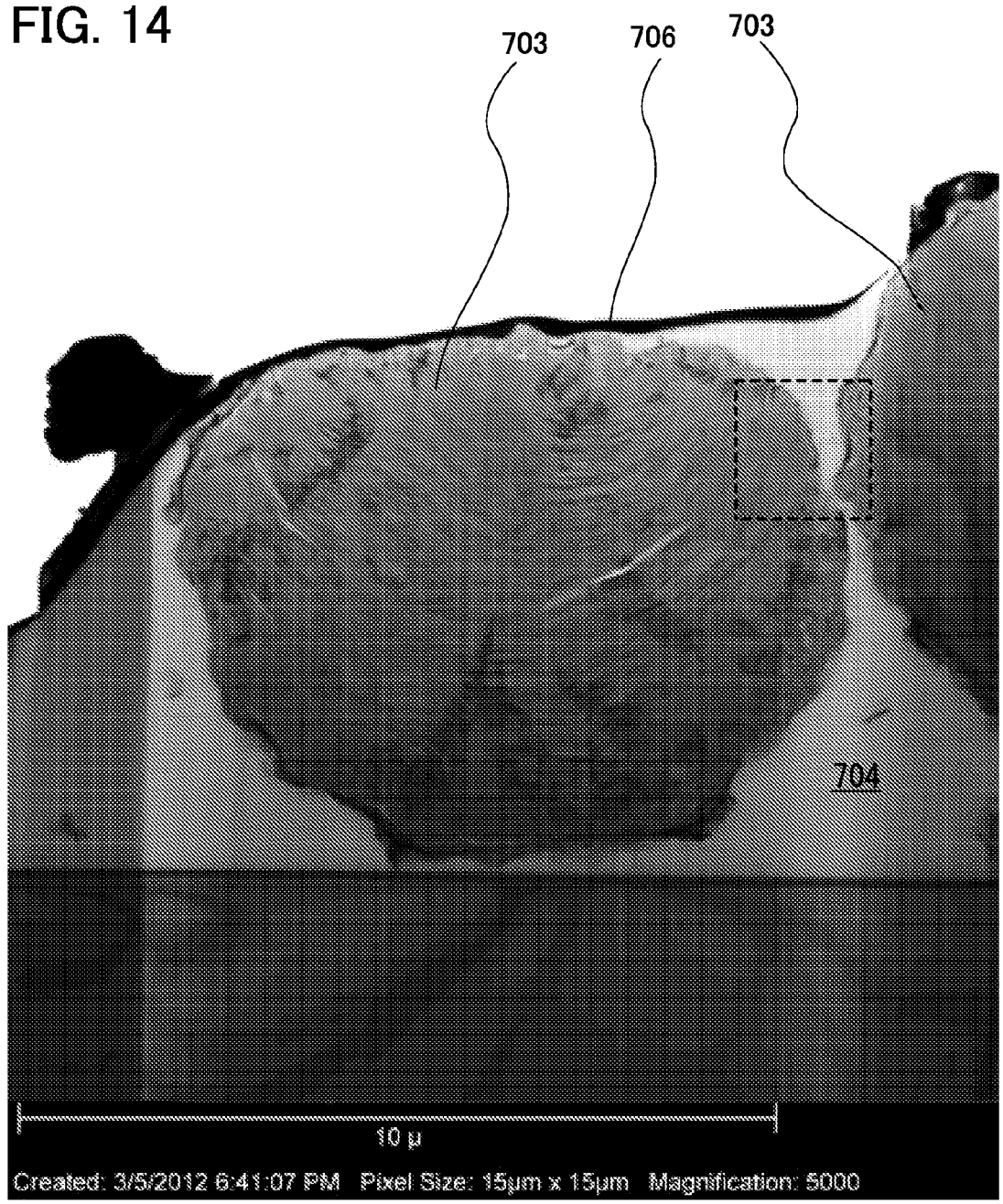
FIG. 14 is a TEM image.
Figure 15A:
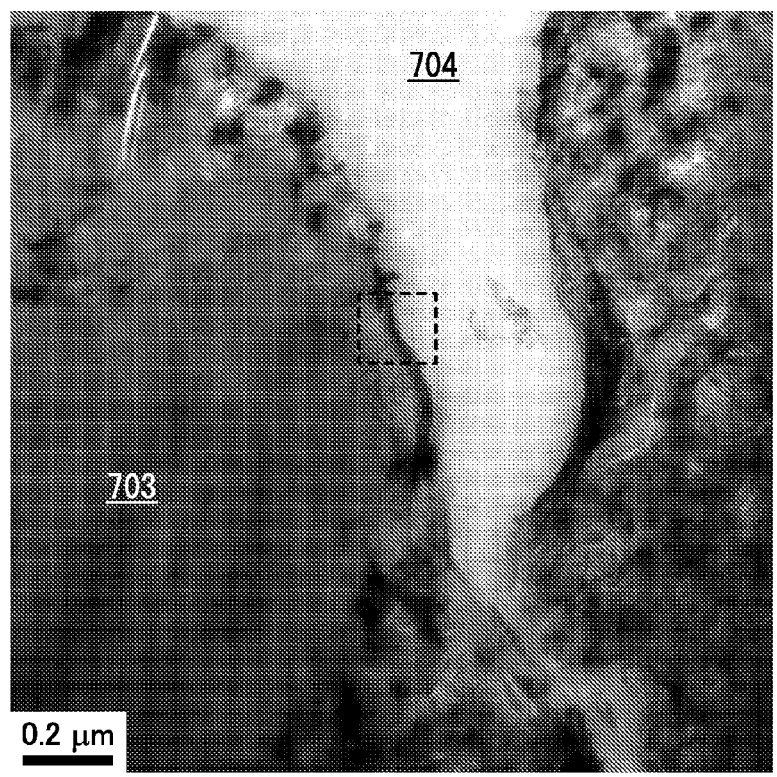
FIGS. 15A and 15B are TEM images.
Figure 15B:
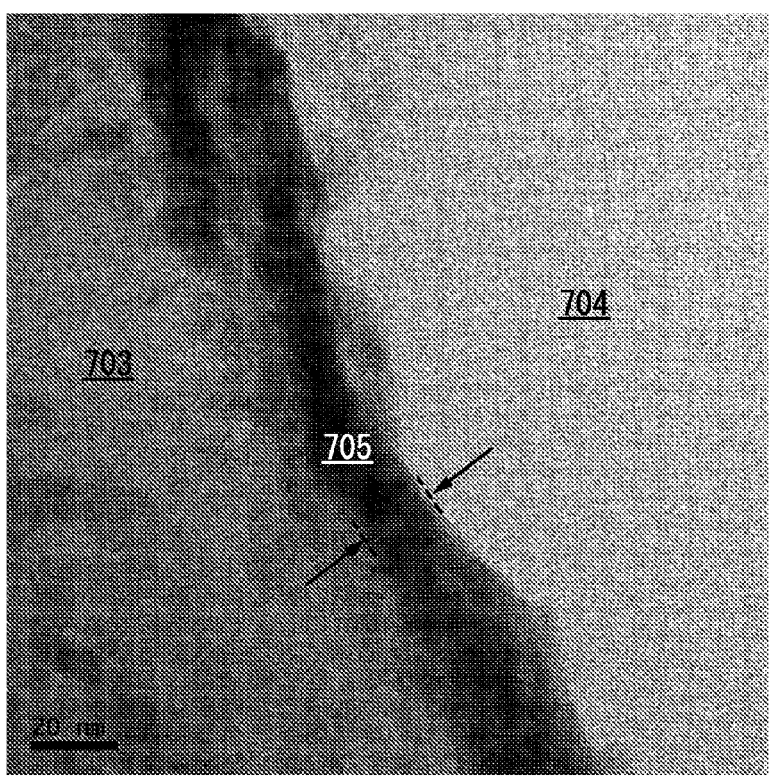

Next, a cross section of the particulate graphite covered with a niobium oxide film by the sol-gel method in such a manner was observed with a transmission electron microscope (TEM). FIGS. 14, 15A, and 15B show TEM images.

FIG. 14 is the TEM image of cross sections of particles of particulate graphite 703. The particulate graphite 703 covered with a niobium oxide film was provided over a silicon wafer, and covered with a carbon film 704 and a tungsten film 706 for processing and observation of the sample.

A layered structure inside the particulate graphite 703 can be observed. The niobium oxide film can be observed in a black color in places on the surface of the particulate graphite 703, that is, edge portions in the cross section of the particulate graphite 703.

FIG. 15A is the enlarged TEM image of the dashed frame in FIG. 14. In the TEM image, the niobium oxide film is observed in a black color on the surface of the particulate graphite 703. In addition, FIG. 15B is the enlarged TEM image of the dashed frame in FIG. 15A. A niobium oxide film 705 formed on the surface of the particulate graphite 703 is formed along the surface of the particulate graphite 703. Since the sample sliced for the observation with TEM is thick in the depth direction in FIG. 15B and the graphite that is the observation object is particles, the thickness of the niobium oxide film 705 is difficult to measure. However, the observation result shows that the niobium oxide film 705 has a thickness of around 10 nm to 20 nm.

From the observation results obtained with the electron microscopes such as SEM and TEM, the niobium oxide film can be formed on the surface of the particulate graphite by the sol-gel method. It is found that the niobium oxide film formed by the sol-gel method is an extremely thin film with a thickness around 10 nm to 20 nm. Further, it is found that the niobium oxide film does not entirely cover the surface of the particulate graphite, but partly covers the surface.

(CV Measurement 1)

Next, whether or not the film of one embodiment of the present invention inserts and extracts lithium ions was confirmed by cyclic voltammetry (CV).

A three-electrode cell was used in the CV measurement. An active material layer including particulate graphite covered with a niobium oxide film was used as a working electrode; metallic lithium, a reference electrode and a counter electrode; and an electrolyte solution, a 1 M of lithium hexafluorophosphate ($LiPF_6$) dissolved in a mixed solution of an ethylene carbonate (EC) solution (1 mol/L) and diethyl carbonate (DEC) (volume ratio 1:1). The measurement was performed at a scanning speed of 0.2 mV/sec in a scan range from 0 V to 2.5 V (vs. $Li^+/Li$) for 3 cycles.

Figure 16A:
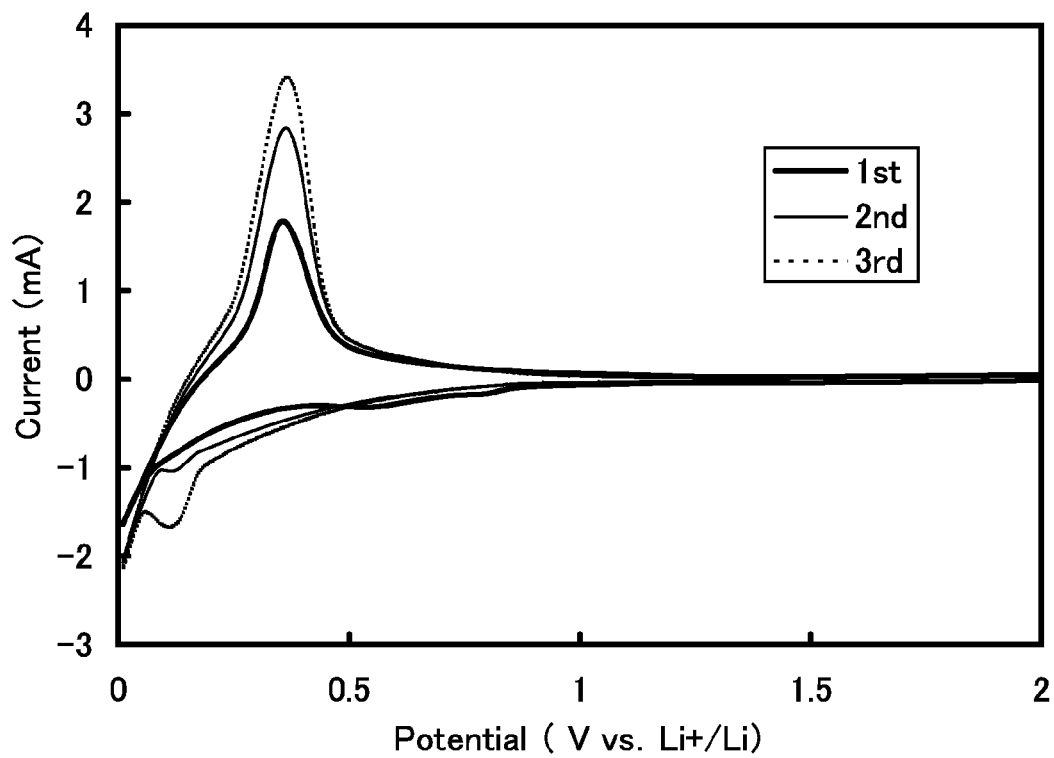
FIGS. 16A and 16B show CV measurement results.
Figure 16B:
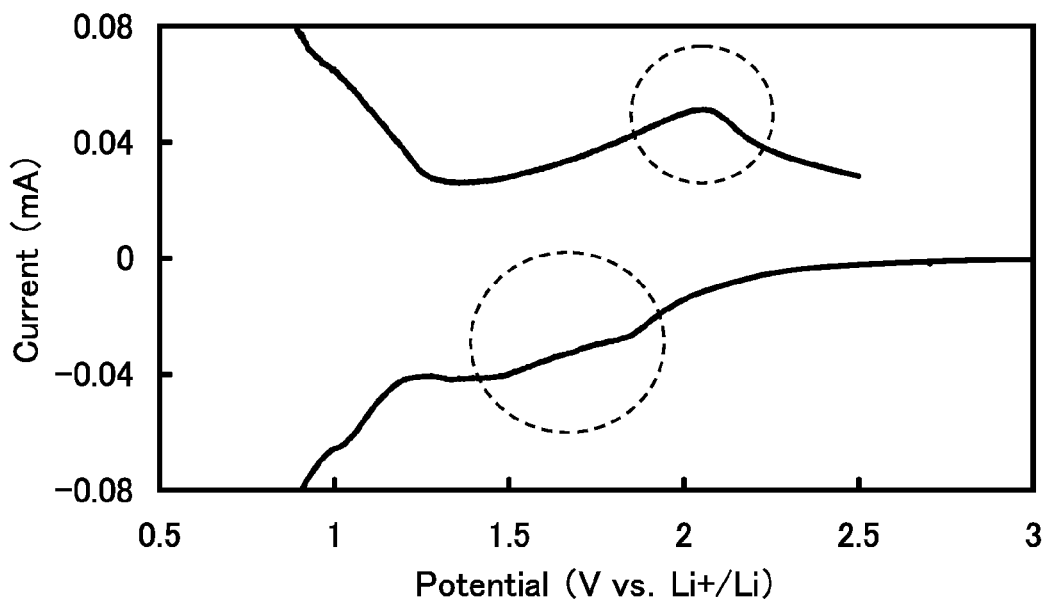

The cyclic voltammograms of the CV measurement results are shown in FIGS. 16A and 16B. FIG. 16A shows the measurement results of the 3 cycles in a scan range from 0 V to 2 V. FIG. 16B focuses on a potential around 1.5 V to 2 V in the first cycle. At the time of the insertion of lithium ions, a change in a current value can be seen inside a portion surrounded by the dashed line on the bottom of the graph. This shows that the niobium oxide film covering the surfaces of the graphite particles reacted with lithium in the first insertion of lithium ions.

Figure 17A:
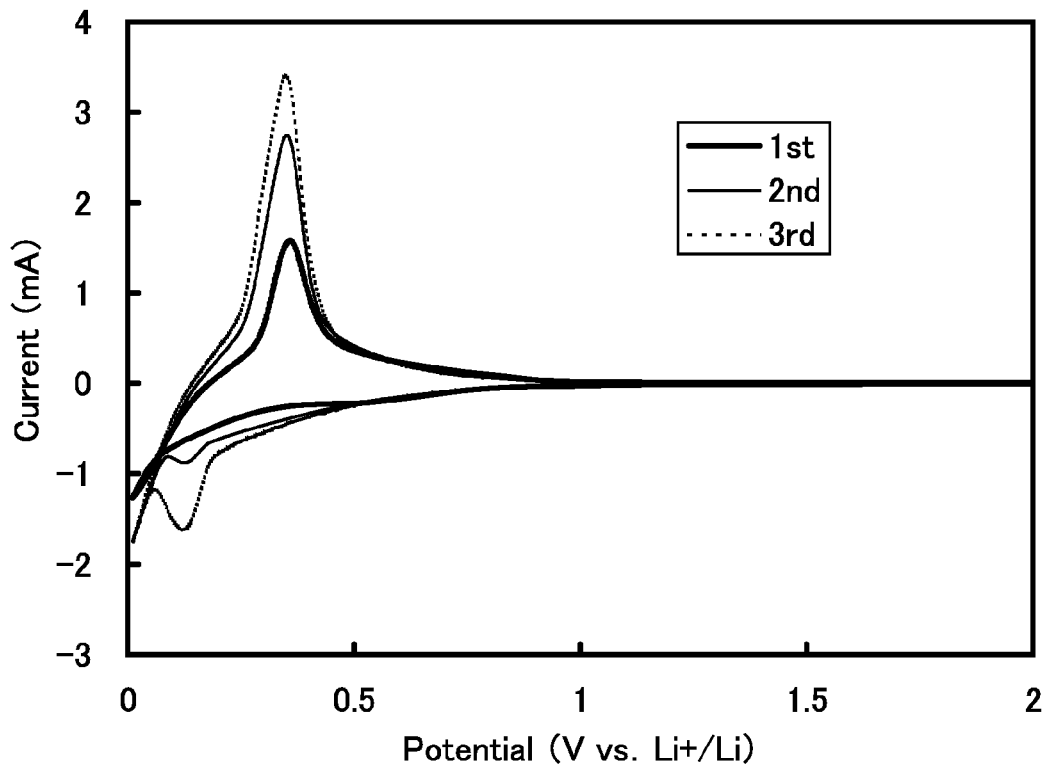
FIGS. 17A and 17B show CV measurement results.
Figure 17B:
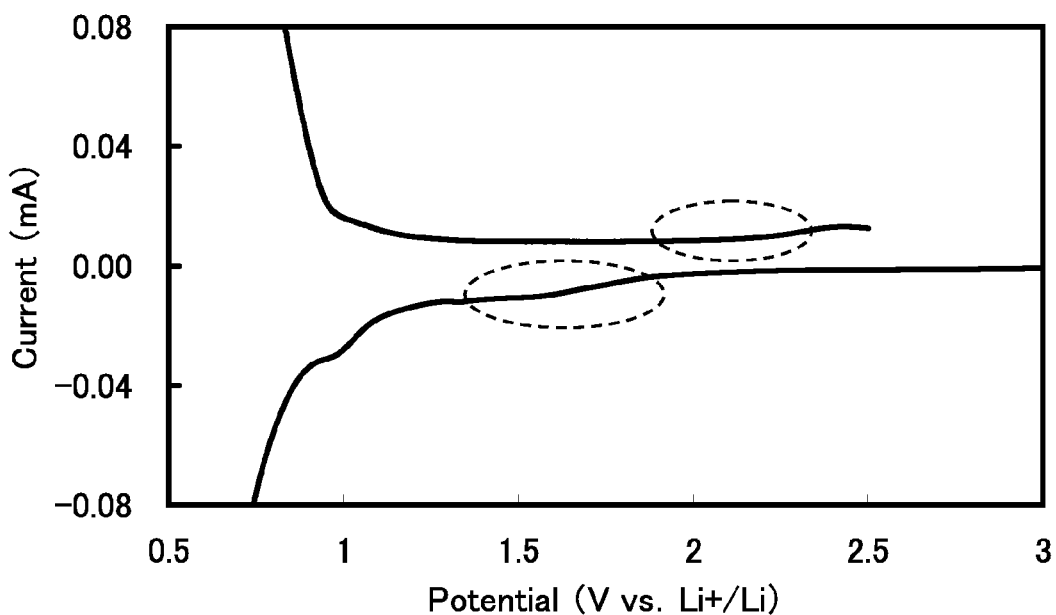

For comparison, graphite similar to the above was not covered with a niobium oxide film, and measured by CV under the same conditions. The measurement results are shown in FIGS. 17A and 17B. As shown in FIG. 17B, a big change is not seen in a current value around 1.5 V to 2 V. Therefore, FIG. 17B confirms that the change in the current value in FIG. 16B shows reaction between lithium and the niobium oxide film.

(CV Measurement 2)

Next, to directly confirm the suppression of reaction between graphite and an electrolyte solution by covering with a niobium oxide film, CV measurement was performed with the use of a highly oriented pyrolytic graphite (HOPG) film as a negative electrode active material.

Since HOPG has a thin plate shape and a flat surface, a surface of the HOPG film can be easily completely covered with a niobium oxide film.

Figure 19:
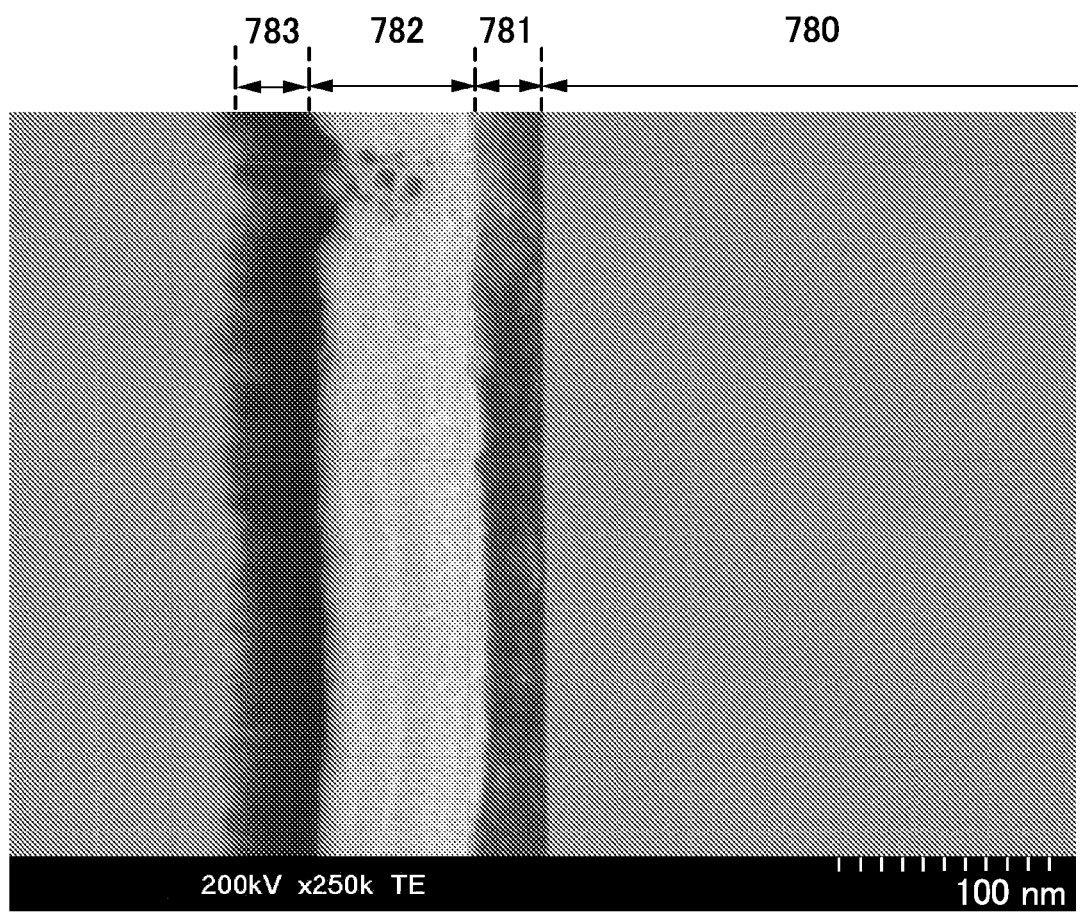
FIG. 19 is a TEM image.

For example, FIG. 19 is a TEM image of a cross section of a sample obtained by forming a niobium oxide film 781 over a glass substrate 780 by an EB evaporation method. The TEM image is rotated 90° counterclockwise, and the glass substrate 780 is on the right side of the image. The glass substrate 780 has a flat surface and an uneven shape is not observed. The niobium oxide film 781 was formed on such a flat surface to have approximately uniform thickness (approximately 30 nm); consequently, the surface of the glass substrate 780 was completely covered with the niobium oxide film. Note that a carbon film 782 and a platinum film 783 were formed over the niobium oxide film 781 for processing and observation of the sample.

In a similar manner, an approximately 10-nm-thick niobium oxide film was formed over the HOPG film having a flat surface by an EB evaporation method. Thus, the niobium oxide film completely covering the surface of the HOPG film was formed.

The HOPG film having the film was used as a working electrode; metallic lithium, a reference electrode and a counter electrode; and an electrolyte solution, a 1 M of lithium perchlorate ($LiClO_4$) dissolved in a mixed solution of an ethylene carbonate (EC) solution (1 mol/L) and diethyl carbonate (DEC) (volume ratio 1:1), and CV measurement was performed. In addition, for comparison, measurement similar to the above was performed on an HOPG film which does not have a film.

Figure 18A:
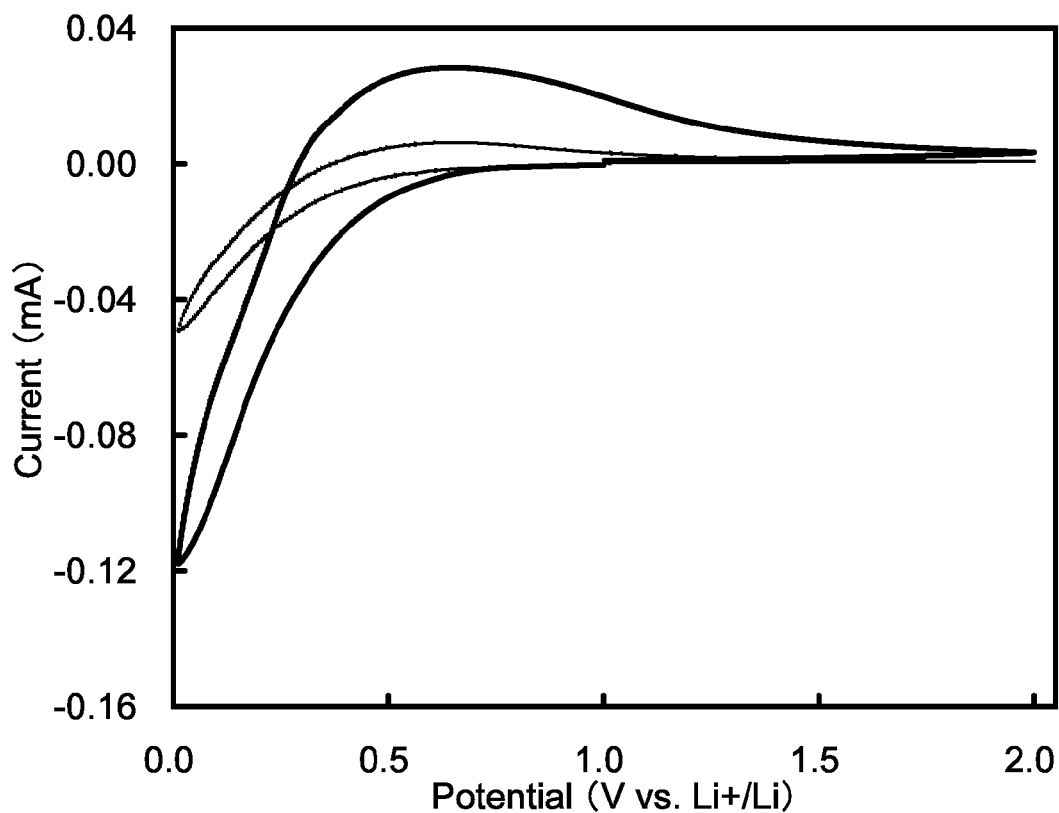
FIGS. 18A and 18B show CV measurement results.
Figure 18B:
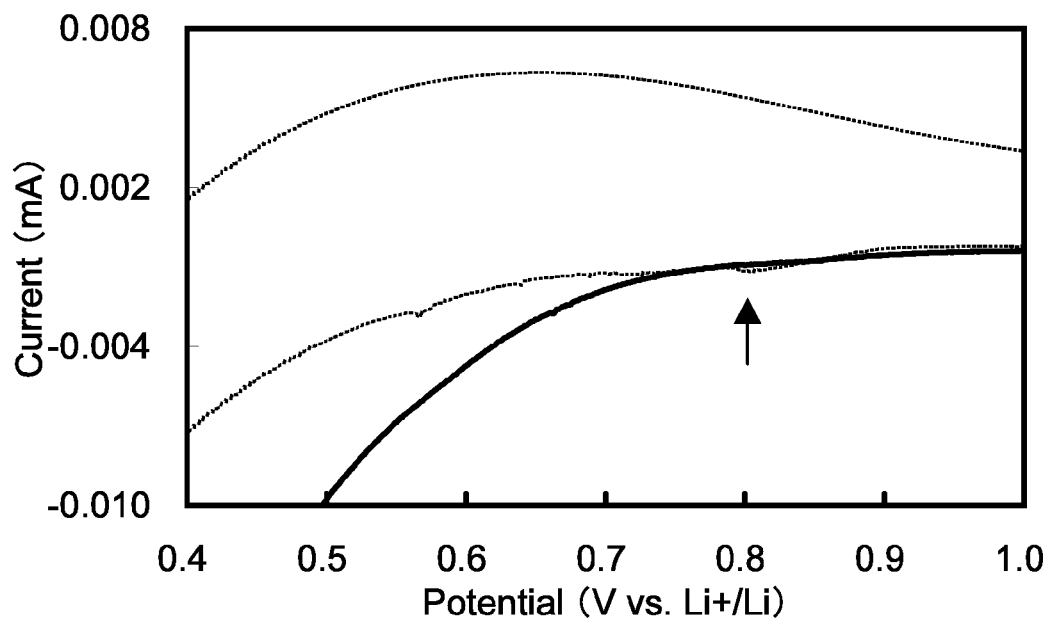

The results of the CV measurement are shown in FIGS. 18A and 18B. FIG. 18A shows the results in a scan range from 0 V to 2 V (vs. $Li^+/Li$); the thick lines represent the results of the HOPG film which has the film and the thin lines represent the results of the HOPG film which does not have the film for comparison. FIG. 18B is an enlarged view of the results in a scan range from 0.4 V to 1.0 V.

The surface of the HOPG film is a basal surface having low reactivity; therefore, a value of current which flows is small. Here, in FIG. 18B, a peak which represents the decomposition of the EC/DEC electrolyte solution can be seen around 0.8 V (vs. Li$^+$/Li) in an electrode using the HOPG film which does not have the film (the peak shown by the arrow in the drawing). On the other hand, a peak is not seen around 0.8 V (vs. Li$^+$/Li) in an electrode using the HOPG film provided with the niobium oxide film.

Therefore, it is found that in the case where a negative electrode active material is covered with a niobium oxide film, decomposition of an electrolyte solution is suppressed.

(Evaluation of Cycle Performance)

Next, a negative electrode including particulate graphite as a negative electrode active material was formed and assembled as a full cell. The particulate graphite has a niobium oxide film formed by the sol-gel method as described above. Then, the cycle performance of a secondary battery was measured.

The performance was measured using coin cells. An electrolyte solution formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 1:1 was used. As the separator, polypropylene (PP) was used. Charge and discharge were performed at a rate of 1 C (it takes 1 hour for charging), voltages ranging from 2 V to 4 V, and an environment temperature of 60° C. Under such conditions, the measurement was performed.

The cycle performance of each of a negative electrode including particulate graphite covered with a niobium oxide film as a negative electrode active material and a negative electrode including particulate graphite, which is not covered, as a negative electrode active material was evaluated. Moreover, as the graphite having the niobium oxide film, the one in which the weight ratio of niobium oxide was 0.5 wt % to the graphite and the one in which the weight ratio of niobium oxide was 2.0 wt % to the graphite were formed.

Figure 20:
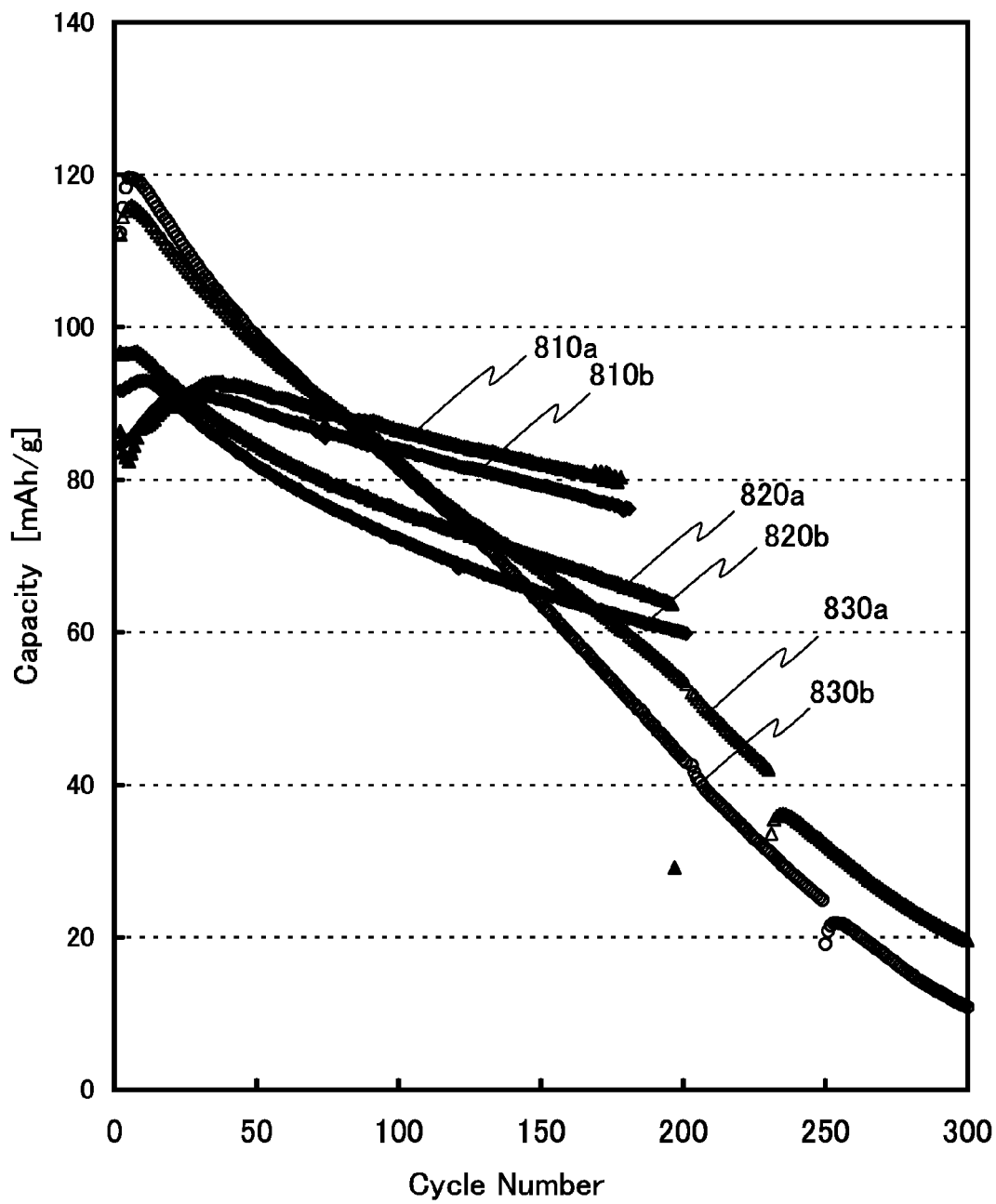
FIG. 20 shows cycle performance.

The measurement results of the cycle performance are shown in FIG. 20. The horizontal axis represents the number of cycles (times) and the vertical axis represents discharge capacity (mAh/g) of the secondary batteries. An electrode which includes 0.5 wt % of niobium oxide, an electrode which includes 2.0 wt % of niobium oxide, and an electrode which does not include a niobium oxide film were measured. The number of samples of each electrode (n) was n=2. In FIG. 20, curves 810a and 810b show the cycle performance of the electrode which includes 0.5 wt % of niobium oxide, curves 820a and 820b show the cycle performance of the electrode which includes 2.0 wt % of niobium oxide, and curves 830a and 830b show the cycle performance of the electrode which does not include a niobium oxide film.

As a result of the measurement, as shown by the curves 830a and 830b, in the case of the secondary battery including particulate graphite which does not have a film formed of a niobium oxide film as a negative electrode active material, the discharge capacity decreases as the number of cycles increases. That is, deterioration is significant.

In contrast, as shown by the curves 810a, 810b, 820a, and 820b, in each of the secondary batteries in which particulate graphite having a niobium oxide film is used as a negative electrode active material, although the discharge capacity tends to decrease, the capacity is not greatly reduced, which is unlike in the secondary battery which does not have the film. Thus, it is found that deterioration is sufficiently suppressed. The deterioration is particularly suppressed at an environment temperature of 60° C. Consequently, it is possible to increase the cycle performance.

Moreover, comparison between the curves 810a and 810b showing the results of the electrode including 0.5 wt % of niobium oxide and the curves 820a and 820b showing the results of the electrode including 2.0 wt % of niobium oxide shows that the electrode including 0.5 wt % of niobium oxide can maintain higher capacity than the electrode including 2.0 wt % of niobium oxide. In addition, the charge and discharge efficiency in each cycle of the electrode which does not include the niobium oxide film was 99.4%, whereas the charge and discharge efficiency in each cycle of the electrode including 0.5 wt % of niobium oxide was 99.7% and the charge and discharge efficiency in each cycle of the electrode including 2.0 wt % of niobium oxide was 99.5%. As a result, it is found that in the case where the film is used, the charge and discharge efficiency is higher than that in the case where the film is not included.

(Evaluation)

As described above, irreversible capacity which causes a decrease in the initial capacity of a lithium ion battery can be reduced and the electrochemical decomposition of an electrolyte solution and the like at a negative electrode can be suppressed. Further, decomposition reaction of an electrolyte solution and the like caused as side reaction of charge and discharge in repeated charges and discharges of the lithium ion battery can be suppressed, and thus the cycle performance of the lithium ion battery can be increased. Furthermore, the decomposition reaction of the electrolyte solution, which speeds up at high temperature is suppressed and a decrease in capacity in charge and discharge at high temperature is prevented so that the operating temperature range of the lithium ion battery can be extended.

EXAMPLE 2

In this example, a negative electrode for a power storage device, which was actually formed and covered with silicon oxide, and a model of the deterioration of a power storage device using the negative electrode are described.

(Example of Power Storage Device)

As an example, a negative electrode for a power storage device and a power storage device using the negative electrode, which was actually manufactured, are described.

In this example, a graphite particle provided with silicon oxide was formed by a sol-gel method. As the graphite particle, graphite produced by JFE Chemical Corporation was used. First, Si(OEt)$_4$, ethyl acetoacetate, and toluene were mixed and stirred to form a Si(OEt)$_4$ toluene solution. At this time, the amount of the Si(OEt)$_4$ was determined so that the proportion of silicon oxide formed later in graphite is 1 wt % (weight percent). The compounding ratio of this solution was as follows: the Si(OEt)$_4$ was 3.14×10$^{-4}$ mol; the ethyl acetoacetate, 6.28×10$^{-4}$ mol; and the toluene, 2 ml. Next, the Si(OEt)$_4$ toluene solution to which graphite was added was stirred in a dry room. Then, the solution was held at 70° C. in a humid environment for 3 hours so that the Si(OEt)$_4$ in the Si(OEt)$_4$ toluene solution to which the graphite was added was hydrolyzed and condensed. In other words, the Si(OEt)$_4$ in the solution was made to react with water in the air so that hydrolysis reaction gradually occurs, and the Si(OEt)$_4$ was condensed by dehydration reaction which sequentially occurred. Then, baking was performed at 500° C. in a nitrogen atmosphere for 3 hours, whereby an electrode material containing the graphite particle covered with a film formed of silicon oxide was formed. In addition, slurry formed by mixing the electrode material, acetylene black, and PVDF was applied over a current collector and dried; thus, an electrode (also referred to as Electrode 1) was formed. At this time, the weight ratio of the PVDF to the graphite was 10:100 (weight percent).

With observation of the formed Electrode 1 with SEM, it was found that a plurality of particles was formed. The plurality of particles has an average diameter of approximately 9 μm.

In addition, observation with a scanning transmission electron microscope (also referred to as STEM) and energy-dispersive X-ray spectroscopy (also referred to as EDX) were performed on Electrode 1. A result of EDX showed that silicon was detected in some regions on a surface of Electrode 1. However, with EDX, silicon was not detected in other regions on the surface of Electrode 1. Therefore, it was found that silicon oxide is not formed on the entire surface of the particle, but formed on part of the surface of the particle.

(Evaluation of Cycle Performance)

Negative electrodes in which the graphite particles provided with silicon oxide by the sol-gel method are used as a negative electrode active material and positive electrodes using $LiPO_4$ were used to manufacture batteries, and the cycle performance was compared between the batteries.

The performance was measured using coin cells. An electrolyte solution formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 3:7 was used. As the separator, polypropylene (PP) was used. Charge and discharge were performed at a rate of 1 C (it takes 1 hour for charging), voltages ranging from 2 V to 4 V, and environment temperatures of 25° C., 50° C., 60° C., 70° C., and 85° C. Under such conditions, two samples were measured at each temperature.

Figure 21:
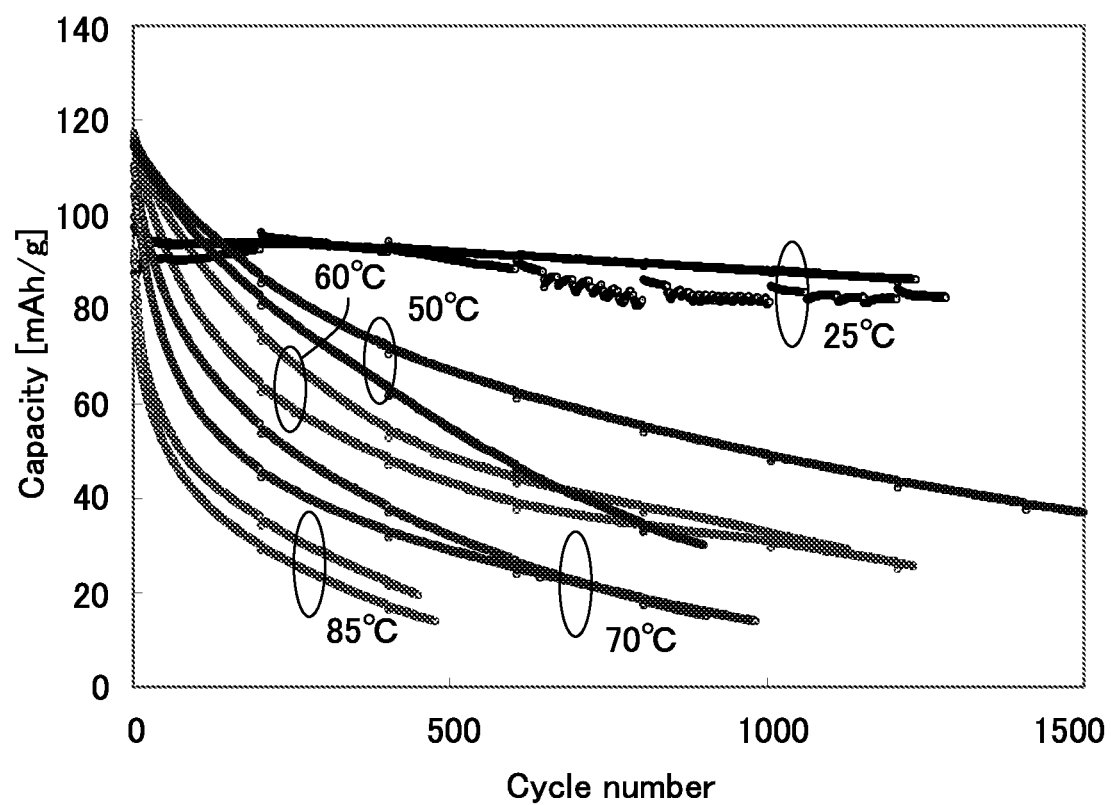
FIG. 21 shows cycle performance.

The measurement results of the cycle performance are shown in FIG. 21. The horizontal axis represents the number of cycles (times) and the vertical axis represents discharge capacity (mAh/g) of the secondary batteries. FIG. 21 shows that as the environmental temperature rises, discharge capacity tends to decrease markedly with the increasing number of cycles.

Figure 22:
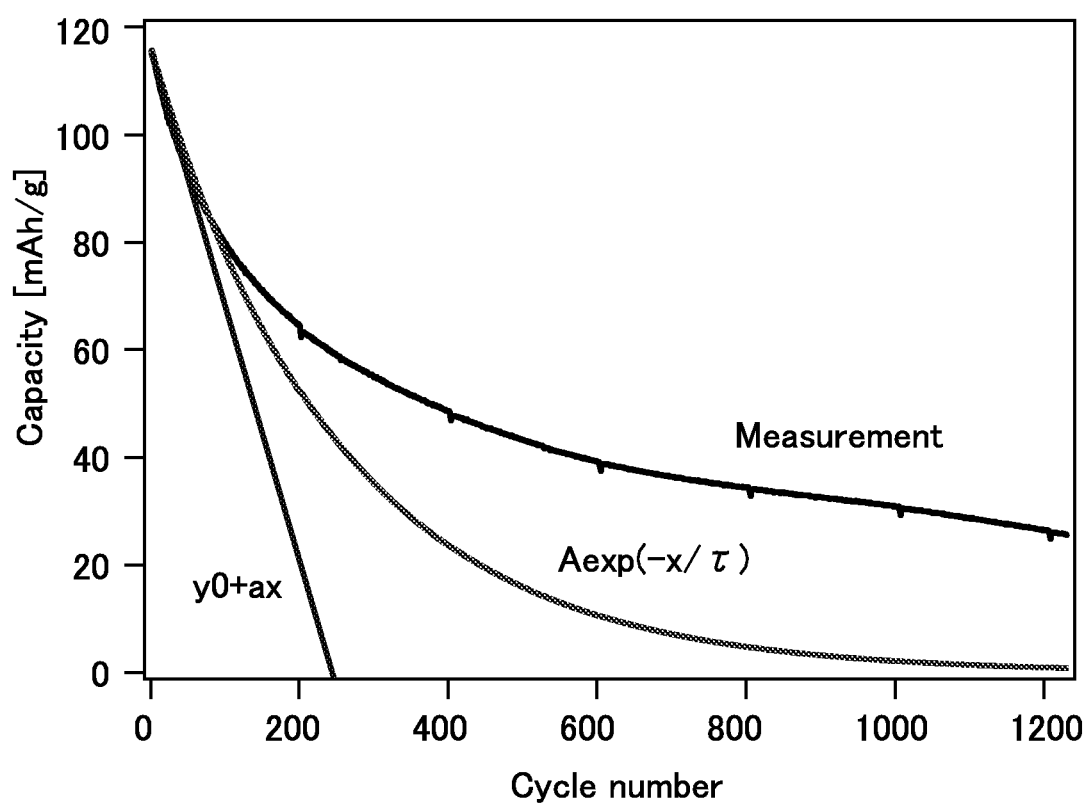
FIG. 22 shows cycle performance.

Here, for example, in the case where a change in initial discharge capacity of each sample measured at an environmental temperature of 60° C. is approximated to a linear function, difference between the linear function and actual measured data is increased, as the number of cycles is increased. Further, in the case where the change is approximated to an exponential function, difference between the exponential function and actual measurement data is increased, as the number of cycles is increased (see FIG. 22).

In view of the above, a model in which difference between such a function and actual measured data is small even when the number of cycles is increased was considered from the tendency of a decrease in discharge capacity with a change in the environmental temperature.

Figure 23:
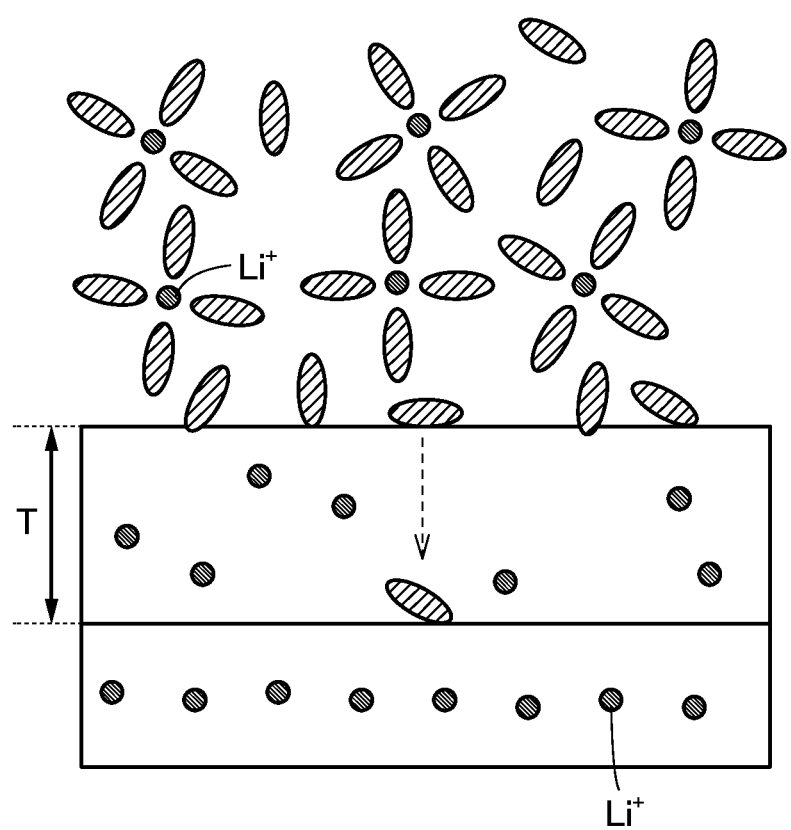
FIG. 23 illustrates a model of film formation.

It is assumed below that discharge capacity of the secondary batteries is decreased entirely due to decomposition of a solvent molecule. As shown in FIG. 23, in the samples of this example, four solvent molecules are coordinated to a lithium ion in an electrolyte solution. When the lithium ion is inserted into a negative electrode, part of the solvent molecules are immediately decomposed on a surface of the negative electrode, and form a film (SEI). This is repeated, and thus the film is gradually grown. Even in the state where the negative electrode is entirely covered with the film, diffusion of the solvent molecules in the film enables part of the solvent molecules to reach the surface of the negative electrode. Therefore, the film grows with a gradually decreasing growth rate.

In the case where a model of the above-described film formation is presented, the formation rate of the film, that is, the decomposition rate of the solvent molecules is probably determined depending on the diffusion coefficient of the solvent molecules in the film. Note that a diffusion distance of the solvent molecules can be represented by Formula 5.

$$\sqrt{4Dt} \qquad \text{[Formula 5]}$$

Here, D represents the diffusion coefficient of the solvent molecules in the film. Further, t represents the length of time of charge in one cycle.

Accordingly, when the thickness of the film is represented by T, the frequency with which the solvent molecules diffused in the film reach the surface of the negative electrode is shown by Formula 6.

$$\frac{\sqrt{4Dt}}{T} \qquad \text{[Formula 6]}$$

Note that when the amount of charge required for the growth of the film is represented by B, the variation of charge capacity q with the number of cycles is shown by Formula 7.

$$\frac{dq}{dn} = -B\frac{dT}{dn} \qquad \text{[Formula 7]}$$

Further, when a charge rate and initial charge capacity are represented by C and $q_0$, respectively, t is shown by Formula 8.

$$t = \frac{q}{Cq_0} \qquad \text{[Formula 8]}$$

Consequently, the growth of the film in each cycle is shown by Formula 9.

$$\frac{dT}{dn} = A\frac{\sqrt{4Dt}}{T} = A\frac{\sqrt{4D\frac{q}{Cq_0}}}{T} \qquad \text{[Formula 9]}$$

Here, A is a constant determined by the surface area of the negative electrode, the concentration of the electrolyte solution, or the like.

Figure 24:
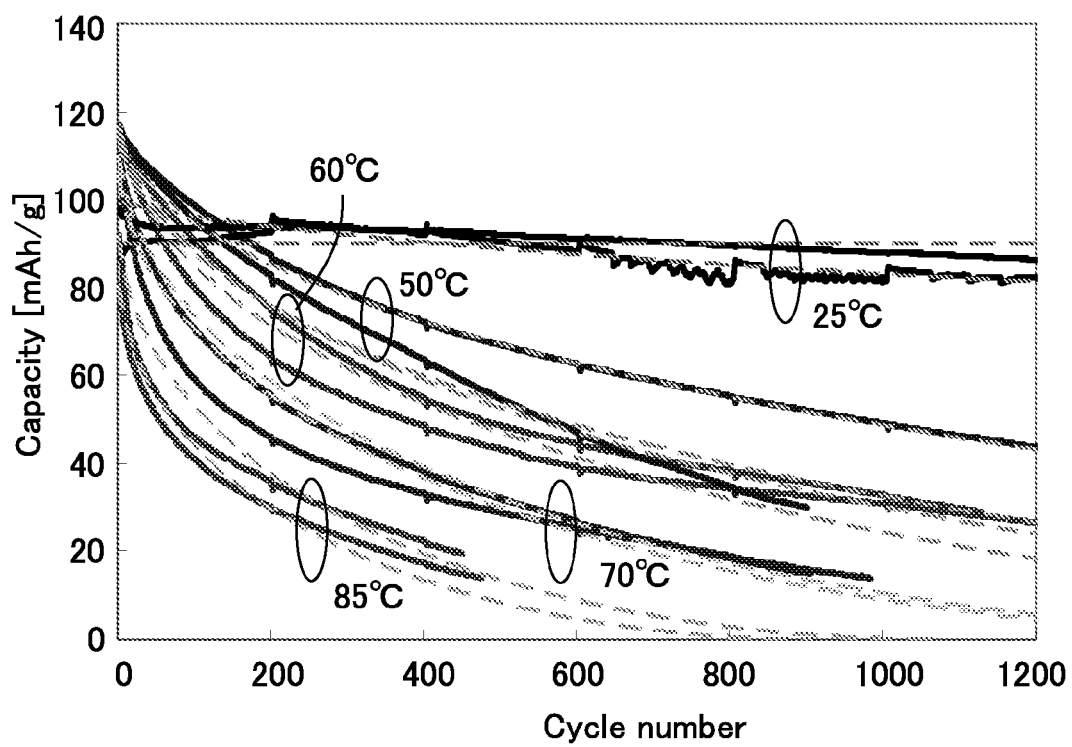
FIG. 24 shows cycle performance.

With the use of Formula 9 obtained as described above, first, the constant A is derived from the analysis of the cycle performance of the samples measured at an environmental temperature of 60° C. Next, the diffusion coefficient D at the other environmental temperatures is derived from the analysis based on the constant A obtained by the analysis. The analysis results corresponding to the measurement results in FIG. 21 are shown by dashed lines in FIG. 24. As shown in FIG. 24, cycle performance obtained by the measurement (solid lines) can be roughly reproduced by the model.

As described above, with the use of the model in consideration of the diffusion of the solvent molecules in the film, the cycle performance of the secondary batteries can be reproduced. As a result, it is found that the decomposition of the solvent molecules and the formation of the film due to the decomposition are a factor in a decrease in discharge capacity of the secondary batteries.

In addition, with the use of the model, by measuring cycle performance at one environmental temperature, cycle performance at the other environmental temperatures can be estimated. Consequently, cycle performance can be easily measured; for example, in the case where a sampling inspection is performed to manufacture a secondary battery, the measurement can be performed in a short time. For this reason, the productivity of the secondary battery can be increased.

Figure 25:
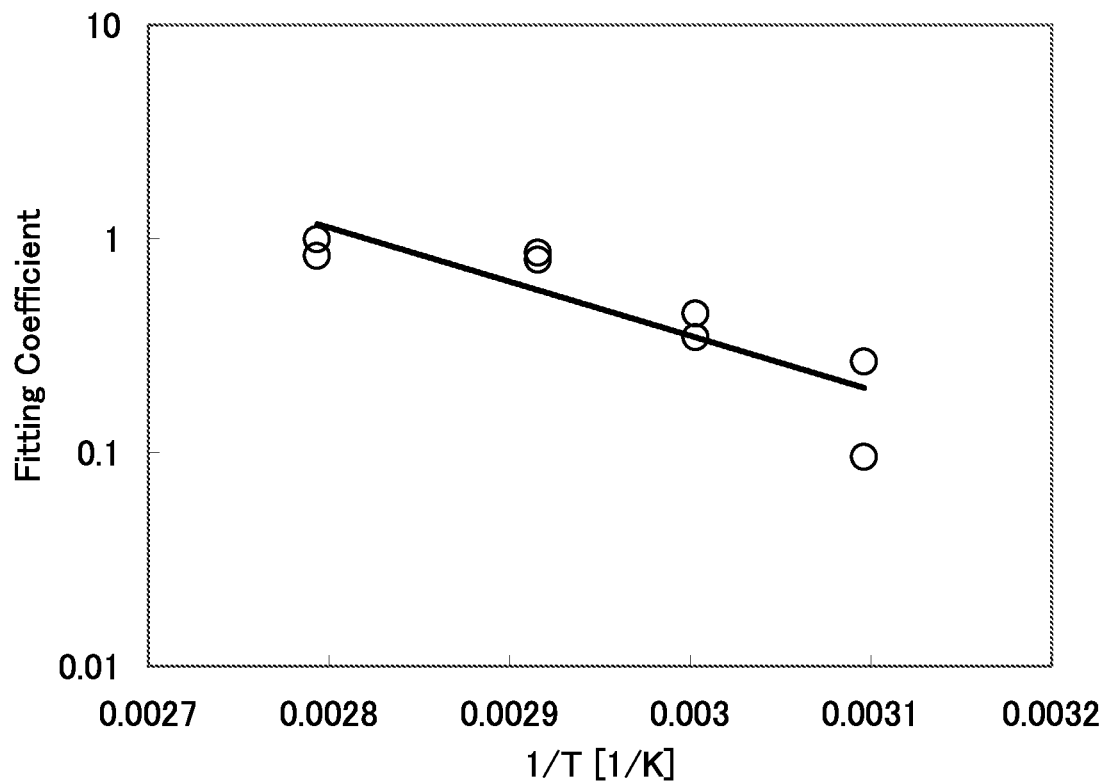
FIG. 25 shows Arrhenius plot.

Next, the Arrhenius plot was obtained (see FIG. 25). The vertical axis represents a fitting coefficient (which includes the constant A and the diffusion coefficient D), and has a logarithmic scale. The horizontal axis represents temperature. From FIG. 25, it is found that there is an error between the Arrhenius plot and an approximate line. This suggests that, other than the decomposition of the solvent molecules, there is another factor which influences a decrease in discharge capacity. However, as shown in FIG. 24, the cycle performance can be roughly reproduced; therefore, the model is likely to be useful in understanding the deterioration of the secondary battery.

EXAMPLE 3

In this example, measurement results of cycle performance of a lithium ion secondary battery using an electrode which is one embodiment of the present invention are described.

First, description is given of a method for forming an electrode used as a negative electrode.

First, graphite produced by JFE Chemical Corporation was used as an active material and PVDF was used as a binder to form slurry in which the ratio of the graphite to the PVDF is 90:10. As a solvent of the slurry, NMP was used.

Copper foil was used as a current collector. The slurry containing the graphite was applied over the current collector, dried at 70° C., and then dried at 170° C. in a vacuum atmosphere for 10 hours. Thus, an active material layer containing graphite was formed.

Next, the current collector provided with the active material layer was stamped out into round shapes, so that Electrode D1 and Electrode D2 were formed.

In addition, Electrodes E1 to E4, Electrodes F1 to F4, and Electrodes G1 to G3 which are different from Electrodes D1 and D2, were formed.

First, $Si(OEt)_4$, ethyl acetoacetate, and toluene were mixed and stirred to form a $Si(OEt)_4$ toluene solution. The compounding ratio of this solution was as follows: the $Si(OEt)_4$ was $3.14 \times 10^{-4}$ mol; the ethyl acetoacetate, $6.28 \times 10^{-4}$ mol; and the toluene, 2 ml. Note that three different amounts of the $Si(OEt)_4$ were prepared so that the proportion of silicon oxide formed later to graphite are 1 wt %, 3 wt %, and 10 wt %, respectively.

Next, the $Si(OEt)_4$ toluene solution to which graphite was added was stirred in a dry room. Then, the solution was held at 70° C. in a humid environment for 3 hours so that the $Si(OEt)_4$ in the $Si(OEt)_4$ toluene solution to which the graphite was added was hydrolyzed and condensed. In other words, the $Si(OEt)_4$ in the solution was made to react with water in the air so that hydrolysis reaction gradually occurs, and the $Si(OEt)_4$ was condensed by dehydration reaction which sequentially occurred. In such a manner, silicon which is a gel was attached on a surface of a graphite particle to form a net-like structure of a C—O—Si bond.

Then, baking was performed at 500° C. in a nitrogen atmosphere for 3 hours, whereby three different kinds of graphite covered with silicon oxide were formed.

Graphite covered with 1 wt % of silicon oxide and PVDF were mixed to form slurry, and the slurry was applied over a current collector and dried; thus, an active material layer was formed. At this time, the weight ratio of the graphite to the PVDF was 90:10. As a solvent of the slurry, NMP was used.

Next, the current collector provided with the active material layer was stamped out into round shapes, so that Electrode E1, Electrode E2, Electrode E3, and Electrode E4 were formed.

Graphite covered with 3 wt % of silicon oxide and PVDF were mixed to form slurry, and the slurry was applied over a current collector and dried; thus, an active material layer was formed. At this time, the weight ratio of the graphite to the PVDF was 90:10. As a solvent of the slurry, NMP was used. Next, the current collector provided with the active material layer was stamped out into round shapes, so that Electrode F1, Electrode F2, Electrode F3, and Electrode F4 were formed.

Graphite covered with 10 wt % of silicon oxide and PVDF were mixed to form slurry, and the slurry was applied over a current collector and dried; thus, an active material layer was formed. At this time, the weight ratio of the graphite to the PVDF was 90:10. As a solvent of the slurry, NMP was used. Next, the current collector provided with the active material layer was stamped out into round shapes, so that Electrode G1, Electrode G2, and Electrode G3 were formed.

Moreover, Electrodes H1 to H3 which are different from the above electrodes were formed.

First, $Si(OEt)_4$, ethyl acetoacetate, and toluene were mixed and stirred to form a $Si(OEt)_4$ toluene solution. At this time, the amount of the $Si(OEt)_4$ was determined so that the proportion of silicon oxide formed later in graphite is 3 wt %. The compounding ratio of this solution was as follows: the $Si(OEt)_4$ was $3.14 \times 10^{-4}$ mol; the ethyl acetoacetate, $6.28 \times 10^{-4}$ mol; and the toluene, 2 ml.

Next, the $Si(OEt)_4$ toluene solution to which graphite was added was stirred in a dry room. Then, the solution was held at 70° C. in a humid environment for 3 hours so that the $Si(OEt)_4$ in the $Si(OEt)_4$ toluene solution to which the graphite was added was hydrolyzed and condensed. In other words, the $Si(OEt)_4$ in the solution was made to react with water in the air so that hydrolysis reaction gradually occurs, and the $Si(OEt)_4$ was condensed by dehydration reaction which sequentially occurred.

Then, baking was performed at 500° C. in a nitrogen atmosphere for 3 hours, whereby graphite covered with silicon oxide was formed.

Graphite covered with 3 wt % of silicon oxide, PVDF, and acetylene black (AB) were mixed to form slurry, and the slurry was applied over a current collector and dried; thus, an active material layer was formed. At this time, the weight ratio of the graphite to the PVDF and the AB was 88:10:2. As a solvent of the slurry, NMP was used. Next, the current collector provided with the active material layer was stamped out into round shapes, so that Electrode H1, Electrode H2, and Electrode H3 were formed.

Next, a full cell including Electrode D1 formed in the above steps as a negative electrode, an electrolyte solution, and a positive electrode was fabricated and charged and discharged once, so that a secondary battery D1 was manufactured. Then, the cycle performance of the secondary battery was measured. In a manner similar to the above, Electrodes D2, E1, E2, E3, F1, F2, F3, G1, G2, G3, H1, H2, and H3 were used to manufacture secondary batteries D2, E1, E2, E3, F1, F2, F3, G1, G2, G3, H1, H2, and H3, respectively. Then, the cycle performance of each of the secondary batteries was measured.

The performance was measured using coin cells. As the positive electrode, an electrode containing $LiFePO_4$ as an active material was used. As the electrolyte solution, an electrolyte solution formed in such a manner that lithium hexafluorophosphate ($LiPF_6$) was dissolved at a concentration of 1 mol/L in a solution in which ethylene carbonate (EC)

and diethyl carbonate (DEC) were mixed at a volume ratio of 1:1 was used. As a separator, polypropylene (PP) was used. Charge and discharge in the first cycle were performed at a rate of 0.2 C (it takes 5 hours for charging), and charge and discharge in the second and the subsequent cycles were performed at a rate of 1 C (it takes 1 hour for charging). Further, charge and discharge were performed at a rate of 0.2 C (it takes 5 hours for charging) every 200 cycles to obtain discharge capacity. Constant current charge and discharge were performed at voltages ranging from 2 V to 4 V and an environmental temperature of 60° C. Under such conditions, measurements were performed.

Figure 26:
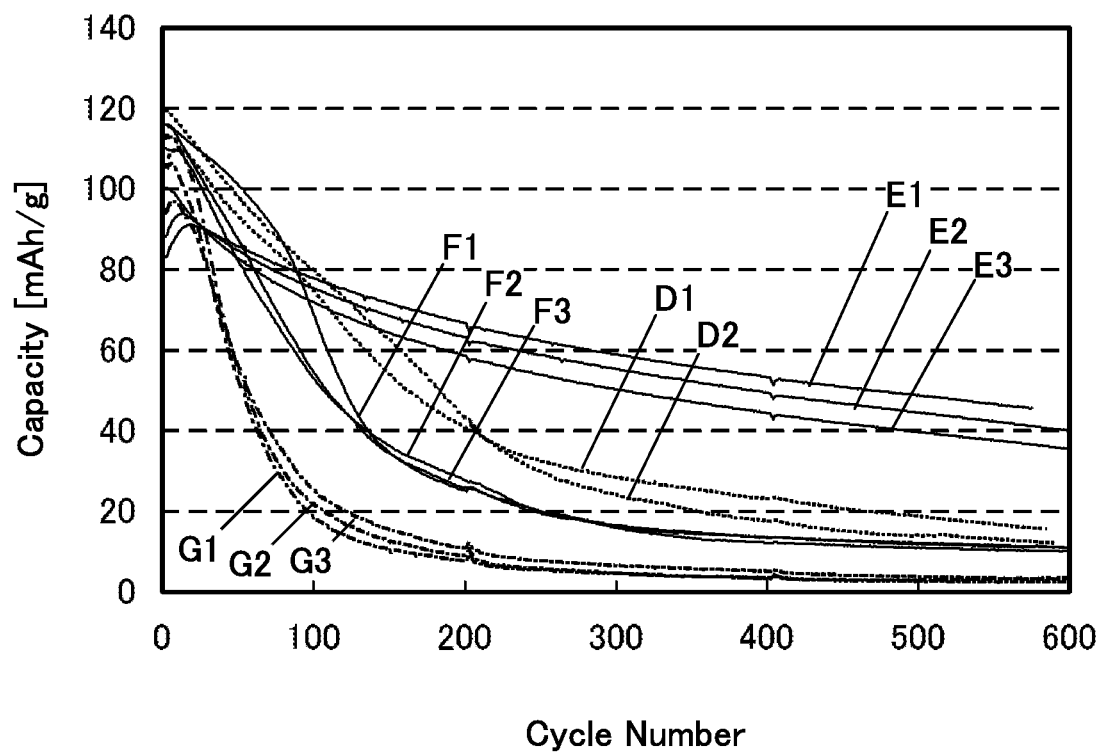
FIG. 26 shows cycle performance.

FIG. 26 shows the measurement results of cycle performance of the secondary batteries using Electrodes D1, D2, E1, E2, E3, F1, F2, F3, G1, G2, and G3 as negative electrodes. The horizontal axis represents the number of cycles (times) and the vertical axis represents discharge capacity (mAh/g) of the secondary batteries.

From FIG. 26, it is found that as the proportion of silicon oxide which covers graphite increases in the electrode of the secondary battery, discharge capacity decreases markedly with the increasing number of cycles.

Figure 27:
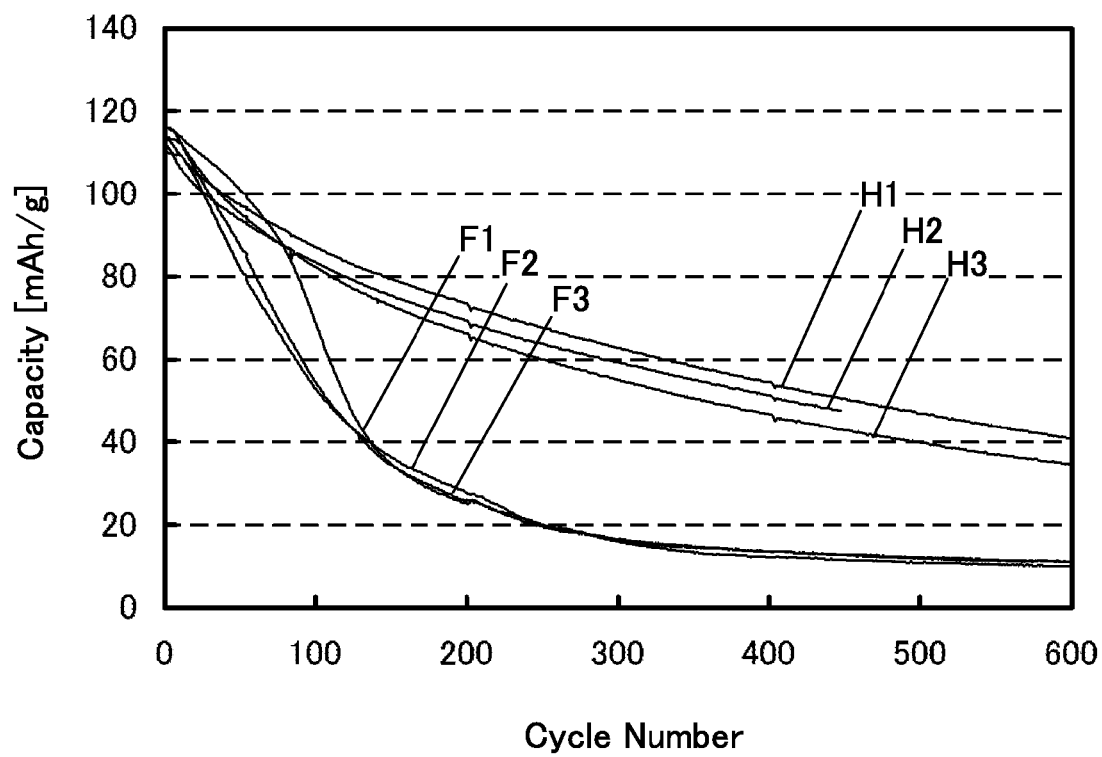
FIG. 27 shows cycle performance.

FIG. 27 shows the measurement results of cycle performance of the secondary batteries using Electrodes F1, F2, F3, H1, H2, and H3 as negative electrodes. The horizontal axis represents the number of cycles (times) and the vertical axis represents discharge capacity (mAh/g) of the secondary batteries.

From FIG. 27, it is found that a decrease in discharge capacity with the increasing number of cycles of Electrodes F1 to F3 is more significant than that of Electrodes H1 to H3. This is likely to be because a covering of silicon oxide inhibits a conduction path to graphite particles in Electrodes F1 to F3, which reduces a current collecting property. On the other hand, the conduction path to the graphite particles can be probably ensured in Electrodes H1 to H3 each containing acetylene black even the graphite particles are covered with silicon oxide, which prevents reduction of a current collecting property.

(Observation of Electrode E4 and Electrode F4 with Electron Microscope)

Figure 28A:
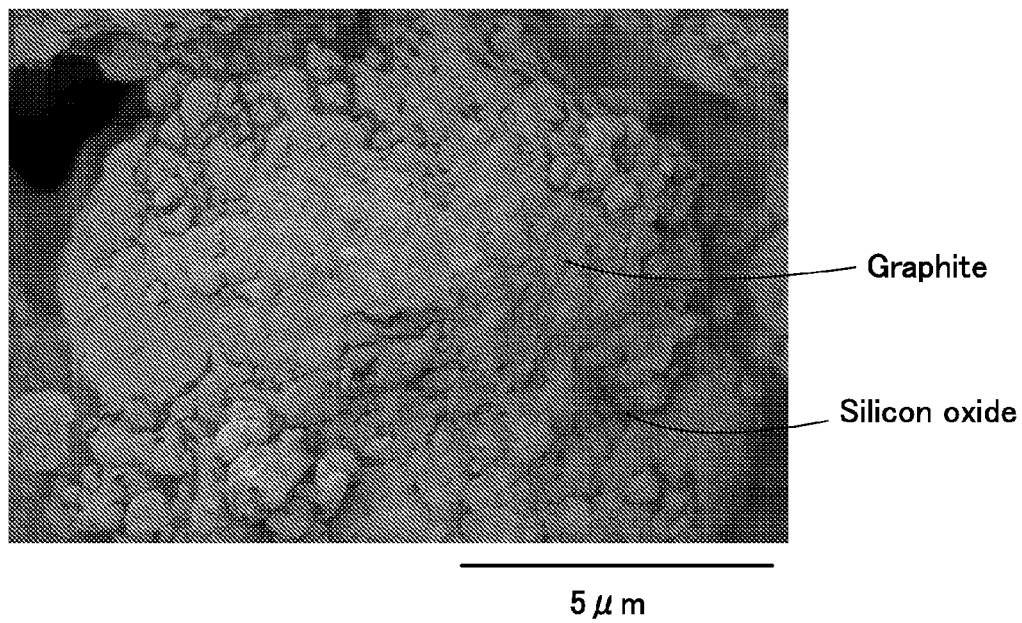
FIGS. 28A and 28B are SEM images.
Figure 28B:
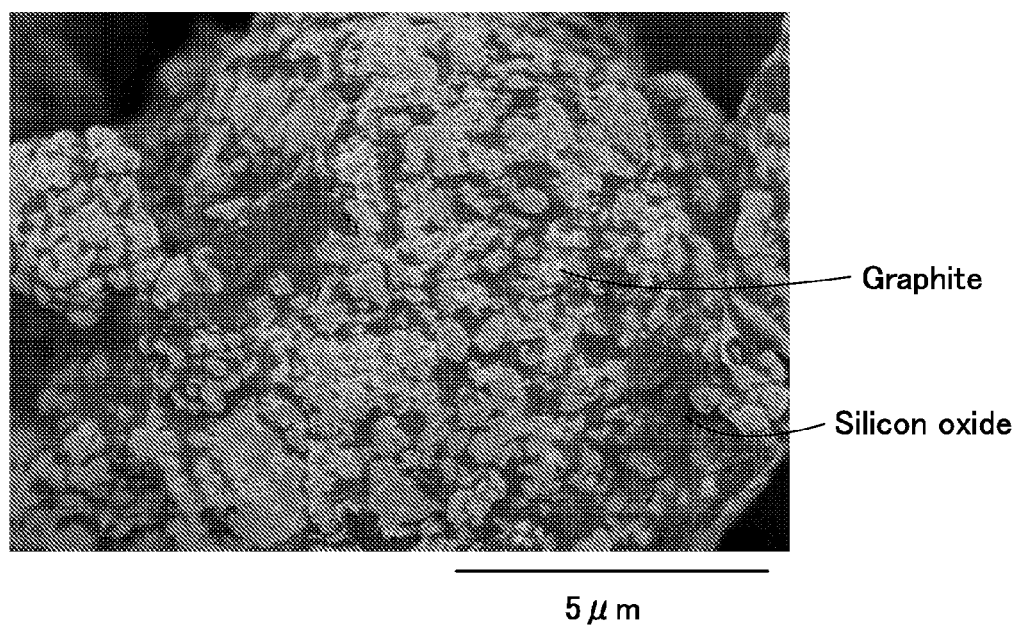

FIGS. 28A and 28B are SEM images of Electrode E4 and Electrode F4. FIG. 28A is the SEM image of Electrode E4 and FIG. 28B is the SEM image of Electrode F4. Note that the SEM image in FIG. 28A and the SEM image in FIG. 28B were observed under the same magnification.

In Electrode E4 in FIG. 28A, a slight amount of silicon oxide formed on a surface of graphite is observed.

In Electrode F4 in FIG. 28B, silicon oxide having an area larger than that of Electrode E4 in FIG. 28A formed on a surface of graphite is observed.

EXAMPLE 4

In this example, a laminated lithium ion battery (also referred to as laminated cell) and a coin-type lithium ion battery (also referred to as coin cell) were manufactured, and the measurement results of electric characteristics thereof are described.

(Formation of Positive Electrode)

As a positive electrode active material, lithium iron phosphate ($LiFePO_4$) provided with a carbon layer on its surface was used. First, lithium iron phosphate and glucose were mixed in acetone, and the mixture was dried and then baked at 600° C., whereby the positive electrode active material was obtained.

Next, the positive electrode active material and NMP (N-methylpyrrolidone) as a polar solvent were stirred and mixed in a mixer at 2000 rpm for 5 minutes, and ultrasonic vibration was applied for 3 minutes. In addition, stirring and mixing at 2000 rpm for 1 minute and application of ultrasonic vibration for 3 minutes were performed twice, so that the mixture was formed. Next, graphene oxide was added to the mixture and stirring and mixing of the mixture in a mixer at 2000 rpm for 5 minutes were performed 5 times. Then, PVDF was added as a binder and the mixture was stirred and mixed in a mixer at 2000 rpm for 5 minutes. Moreover, NMP was added to adjust the viscosity, and the mixture was stirred and mixed at 2000 rpm for 1 minute. The lithium iron phosphate provided with the carbon layer, the graphene oxide, and the PVDF were weighed and adjusted so that the compounding ratio thereof (excluding the polar solvent) is 94.4:0.6:5.0 (weight percent) in the formed mixture.

The mixture formed in such a manner was applied over aluminum foil serving as a current collector. This was dried in hot air to volatilize the polar solvent and then, the active material layer was compressed with a press.

Next, heating was performed at 170° C. in a reduced pressure atmosphere for 10 hours so that the electrode is dried and the graphene oxide is reduced to form graphene serving as a conductive additive.

Then, pressing was conducted again with a gap which is the same as that in the above pressing to compress the active material layer, and the layer was stamped out to form a positive electrode for a secondary battery.

(Formation of Negative Electrode)

As a negative electrode active material, graphite covered with a film formed of silicon oxide was used. As the graphite, graphite with an average diameter of 9 μm (MCMB: mesocarbon microbeads) produced by JFE Chemical Corporation was used. First, water and ethanol were added to $Si(OEt)_4$ and hydrochloric acid serving as a catalyst, and this was stirred to form a $Si(OEt)_4$ solution. The compounding ratio of this solution was as follows: the $Si(OEt)_4$ was $1.8 \times 10^{-2}$ mol; the hydrochloric acid, $4.44 \times 10^{-4}$ mol; the water, 1.9 ml; and the ethanol, 6.3 ml. Next, the $Si(OEt)_4$ toluene solution to which particulate graphite that is the negative electrode active material was added was stirred in a dry room. Then, the solution was held at 70° C. in a humid environment for 20 hours so that the $Si(OEt)_4$ in the mix solution of the $Si(OEt)_4$ solution and the ethanol to which the graphite was added was hydrolyzed and condensed. In other words, the $Si(OEt)_4$ in the solution was made to react with water in the air so that hydrolysis reaction gradually occurs, and the $Si(OEt)_4$ was condensed by dehydration reaction which sequentially occurred. In such a manner, silicon oxide which is a gel was attached on the surface of the particulate graphite. Then, baking was performed at 500° C. in an air atmosphere for 3 hours, whereby graphite covered with a film formed of silicon oxide was formed.

The negative electrode active material having the silicon oxide film formed as described above, PVDF as a binder, and NMP (N-methylpyrrolidone) as a polar solvent were prepared. Stirring and mixing of these in a mixer at 2000 rpm for 10 minutes were performed 3 times to form a mixture. The negative electrode active material and the PVDF were weighed and adjusted so that the compounding ratio thereof (excluding the polar solvent) is 90:10 (weight percent) in the formed mixture.

The mixture formed in such a manner was applied over copper foil serving as a current collector. This was dried in hot air to volatilize the polar solvent.

Then, the active material layer was compressed with a press, and this was stamped out to form a negative electrode for a secondary battery.

(Manufacture of Laminated Lithium Ion Battery)

First, the positive electrode was shaped into a rectangle with a size of 50 mm×41 mm and the negative electrode was shaped into a rectangle with a size of 53 mm×45 mm. Note that the shaped positive electrode and negative electrode were provided so that protrusion portions serving as terminal portions are formed, and part of the active material layers, which are over the protrusion portions, were removed to expose the current collectors.

Next, a separator having a bag-like shape was provided to wrap the positive electrode except the protrusion portion. As the separator, polypropylene (PP) was used. The positive electrode wrapped by the separator and the negative electrode were overlapped so that the active material layers in the electrodes face each other, and eight of this pair of electrodes were stacked to obtain a stack. Then, as electrode terminals, by an ultrasonic welding method, aluminum foil was welded on the protrusion portion of the positive electrode and copper foil plated with nickel was welded on the protrusion portion of the negative electrode. Note that resin was provided in advance in regions in the electrode terminals, which overlap with a thermocompression bonding portion of a laminate film to fill gaps between the laminate film and the electrode terminals.

Next, the stack was wrapped by the laminate film obtained by providing aluminum foil in a resin film, and subjected to thermocompression bonding except one side so that the laminate film has a bag-like shape. Then, the stack in this state was held and dried at 70° C. in a reduced pressure atmosphere (a pressure difference was approximately −100 kPa) for 10 hours. Then, an electrolyte solution was injected into the laminate film in a dry atmosphere. As the electrolyte solution, an electrolyte solution formed in such a manner that lithium hexafluorophosphate (LiPF$_6$) was dissolved at a concentration of 1 mol/L in a solution in which ethylene carbonate (EC) and diethyl carbonate (DEC) were mixed at a volume ratio of 3:7 was used. Then, the one side of the laminate film, which was not subjected to the thermocompression bonding, was subjected to thermocompression bonding in a reduced pressure atmosphere (a pressure difference was approximately −60 kPa); thus, a laminated lithium ion battery was manufactured.

Figure 29A:
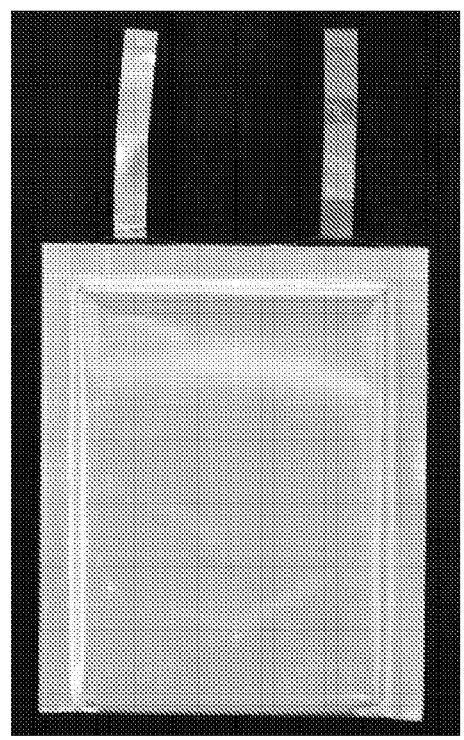
FIGS. 29A and 29B are a photograph and a schematic view of a laminated secondary battery.
Figure 29B:
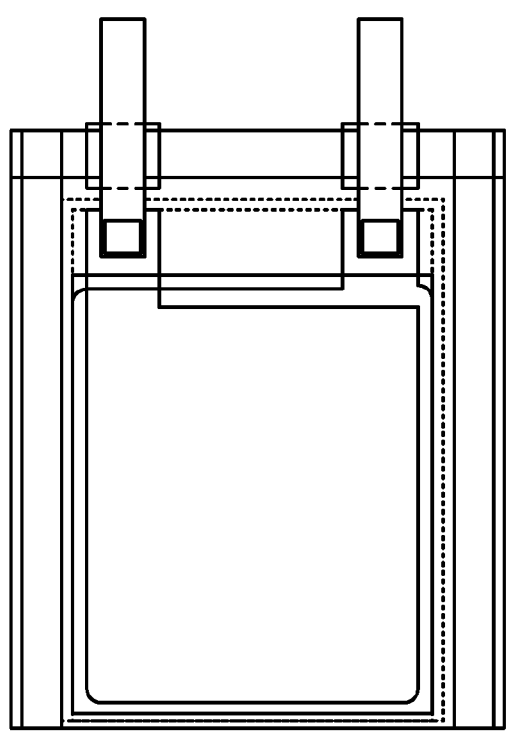

FIG. 29A is a photograph of the manufactured laminated lithium ion battery. FIG. 29B is a schematic view of the laminated lithium ion battery shown in FIG. 29A.

By such a method, Sample 1, Sample 3, Sample 6, and Sample 7 were manufactured.

(Manufacture of Coin-Type Lithium Ion Battery)

First, the above-described negative electrode was heated at 170° C. in a reduced pressure atmosphere for 10 hours to dry the electrode. Next, the positive electrode, the negative electrode, and the separator, which are described above were cut into round shapes. The shape of the cell was CR2032 (with a diameter of 20 mm and a height of 3.2 mm). The positive electrode, the separator impregnated with an electrolyte solution, and the negative electrode were stacked and provided between a positive electrode can and a negative electrode can, which are formed of stainless steel (SUS), and these were crimped; thus, a coin-type lithium ion battery was manufactured.

By such a method, Sample 2, Sample 4, Sample 5, Sample 8, Sample 9, and Sample 10 were manufactured.

(Discharge Characteristics)

First, discharge characteristics of Sample 1 (laminated cell) and Sample 2 (coin cell) were measured. Charge was performed at a rate of 0.2 C by CCCV charging and the upper limit voltage was 4.0 V. Discharge was performed at rates of 0.2 C, 1 C, 2 C, and 5 C by CC discharging and the lower limit voltage was 2 V. The temperature in the measurement was 25° C. The coating amount on the positive electrode, the coating amount on the negative electrode, and the capacity ratio in each sample are shown in Table 1. Note that the "coating amount" in this specification refers to the weight of the active material per unit area of a surface of the electrode.

TABLE 1

| | | Amount (mg/cm$^2$) | | |
|---|---|---|---|---|
| Sample No. | Type of cell | Positive electrode | Negative electrode | Capacity ratio (%) |
| Sample 1 | Laminated | 8.7 | 11.0 | 31 |
| Sample 2 | Coin | 9.0 | 11.7 | 34.1 |

Figure 30A:
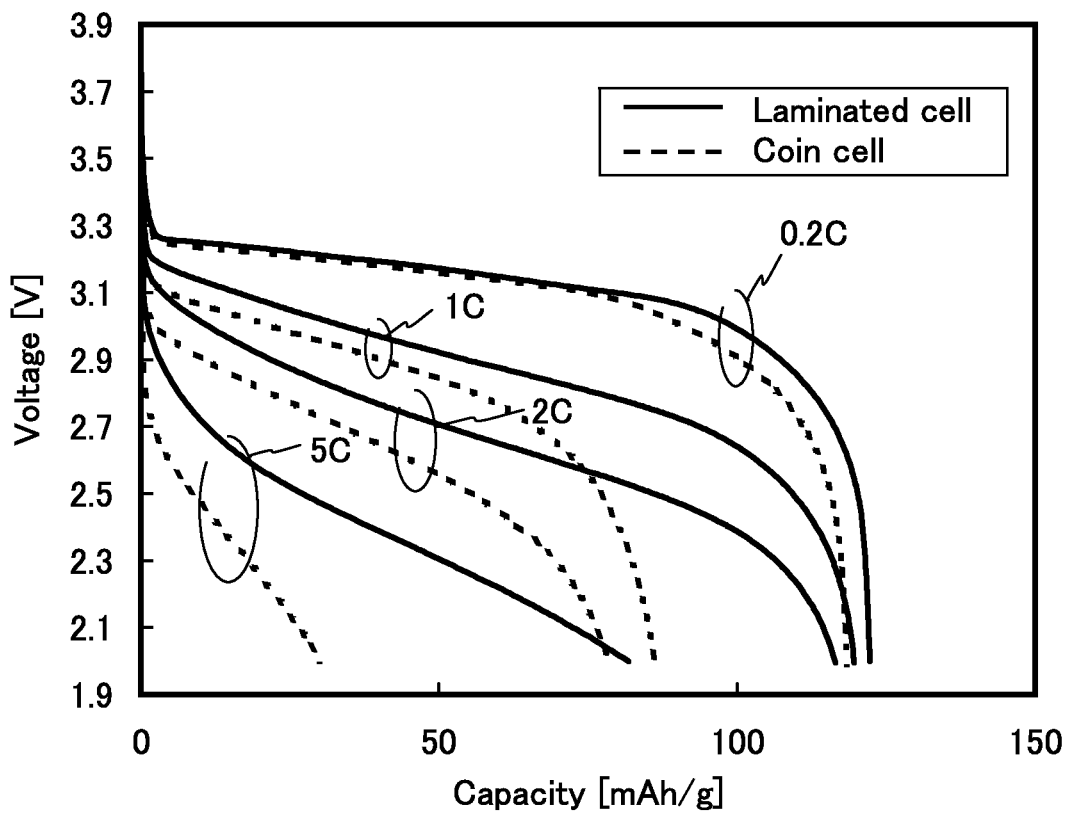
FIGS. 30A and 30B show discharge characteristics.
Figure 30B:
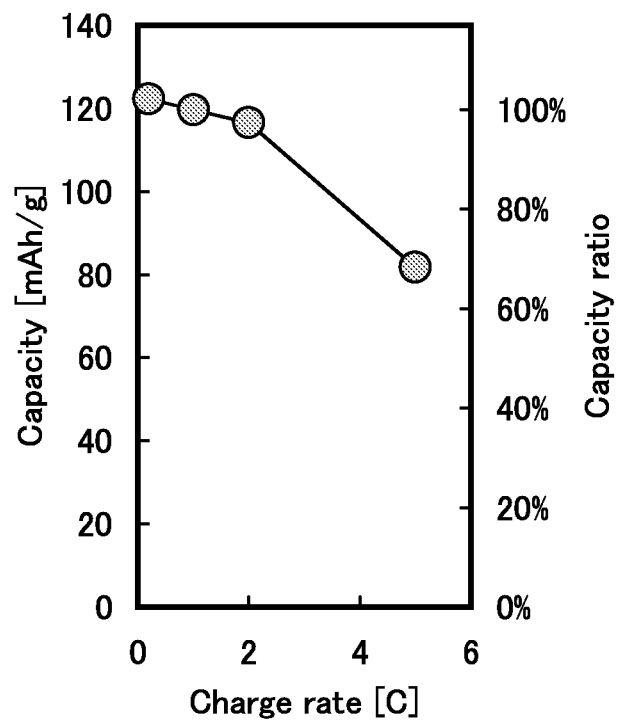

FIG. 30A shows the measurement results of discharge characteristics. The horizontal axis represents discharge capacity per unit mass of the active material (mAh/g) and the vertical axis represents voltage (V). The solid lines represent the results of Sample 1 (laminated cell), and the dashed lines represent the results of Sample 2 (coin cell). FIG. 30B shows discharge capacity and a ratio of capacity to 1 C which are relative to a discharge rate calculated from the results in FIG. 30A.

It is found that in both of the laminated sample and the coin-type sample, capacity is decreased with an increasing discharge rate, that is, the samples show the same tendency regardless of the shapes.

(Discharge Characteristics at Low Temperature)

Next, the measurement results of discharge characteristics at temperatures of −25° C., 0° C., and 25° C. in discharging are shown. Charge was performed in a manner similar to the above, and discharge was performed at a rate of 0.2 C. The measurements were performed with the use of Sample 3 (laminated cell) and Samples 4 and 5 (coin cell). Note that in the measurement of the coin-type samples, Sample 4 was used in the measurements at 25° C. and 0° C. and Sample 5 was used in the measurement at −25° C. The coating amount on the positive electrode, the coating amount on the negative electrode, and the capacity ratio in each sample are shown in Table 2.

TABLE 2

| | | Amount (mg/cm$^2$) | | |
|---|---|---|---|---|
| Sample No. | Type of cell | Positive electrode | Negative electrode | Capacity ratio (%) |
| Sample 3 | Laminated | 8.9 | 11.1 | 31.8 |
| Sample 4 | Coin | 8.4 | 10.3 | 36.4 |
| Sample 5 | Coin | 8.2 | 10.8 | 33.8 |

Figure 31:
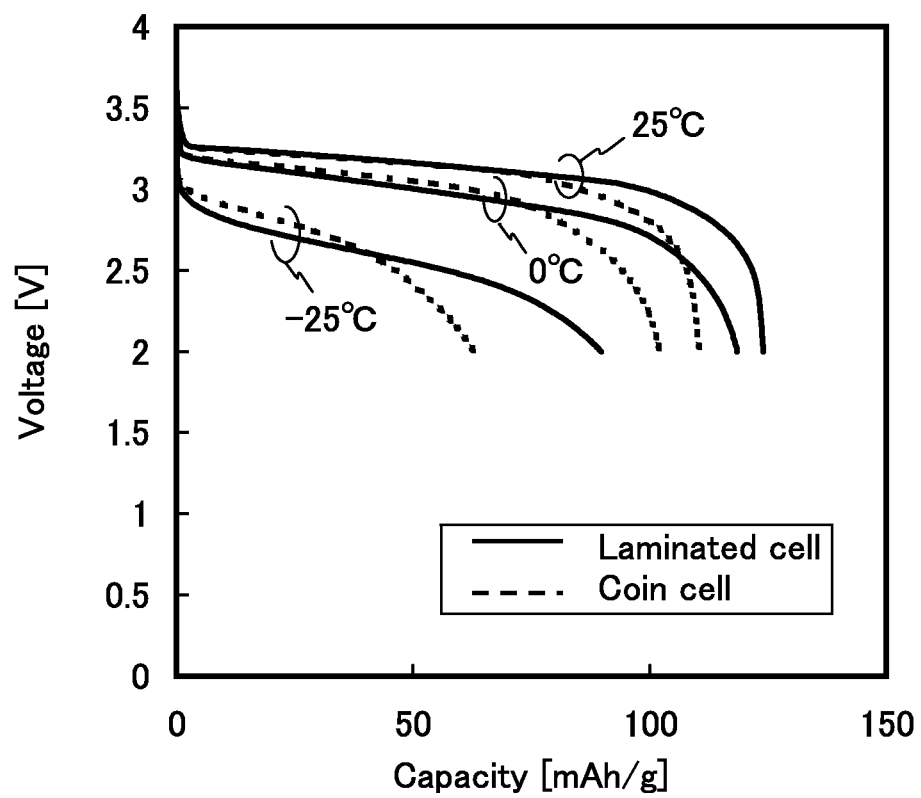
FIG. 31 shows discharge characteristics.

FIG. 31 shows the measurement results of discharge characteristics. The solid lines represent the results of Sample 3 (laminated cell), and the dashed lines represent the results of Samples 4 and 5 (coin cell), as in FIGS. 30A and 30B.

It is found that in both of the laminated sample and the coin-type samples, capacity is decreased with a decreasing temperature, that is, the samples show the same tendency regardless of the shapes.

(Cycle Performance)

Next, cycle performance of the discharge capacity of the laminated samples and the coin-type samples were measured. Charge and discharge were performed at a rate of 1 C, voltages ranging from 2 V to 4 V, and an environmental temperature of 60° C. Under such conditions, the measurements were performed. In the measurements, Samples 6 and 7 (laminated cell) and Samples 8, 9, and 10 (coin cell) were used. The coating amount on the positive electrode, the coating amount on the negative electrode, and the capacity ratio in each sample are shown in Table 3.

TABLE 3

| Sample No. | Type of cell | Amount (mg/cm$^2$) | | Capacity ratio (%) |
| --- | --- | --- | --- | --- |
| | | Positive electrode | Negative electrode | |
| Sample 6 | Laminated | 11.7 | 11.1 | 41.4 |
| Sample 7 | Laminated | 9 | 11.4 | 30.7 |
| Sample 8 | Coin | 9.2 | 11 | 37.2 |
| Sample 9 | Coin | 9.3 | 11 | 37.8 |
| Sample 10 | Coin | 9.4 | 11 | 38 |

Figure 32:
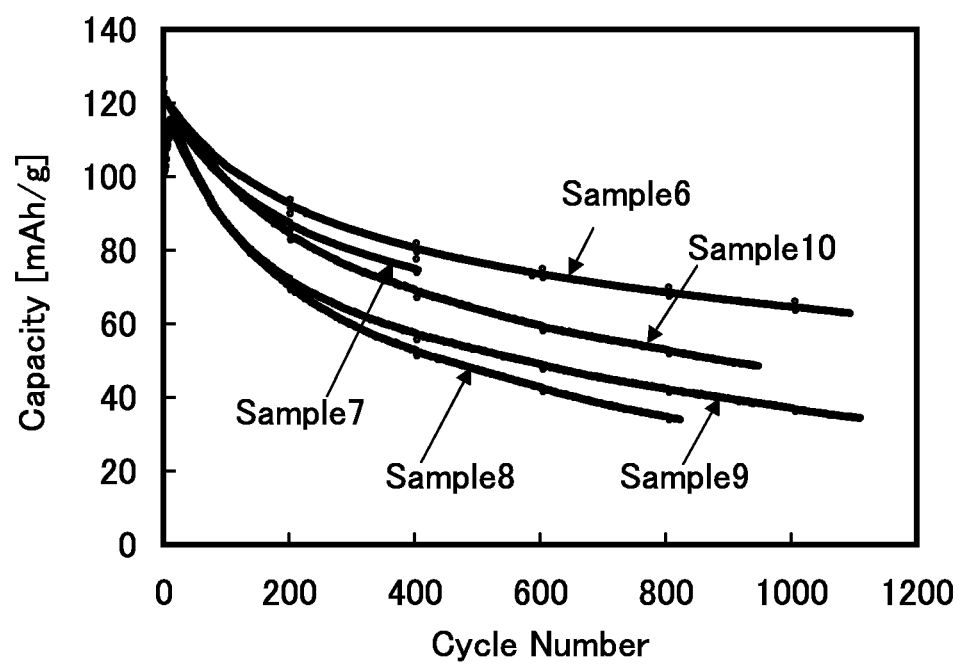
FIG. 32 shows cycle performance.

The measurement results of cycle performance are shown in FIG. 32. The horizontal axis represents the number of cycles (times) and the vertical axis represents discharge capacity (mAh/g) of the secondary batteries.

FIG. 32 shows that the laminated samples and the coin-type samples have equal values of initial discharge capacity. In addition, the capacity of all the samples is decreased with the increasing number of cycles, that is, the same tendency can be seen in all the samples regardless of the shapes. For example, the discharge capacity of Sample 10 in the 500th cycle is approximately 64% of the initial discharge capacity.

This example can be combined with the other examples and any of the embodiments described in this specification as appropriate.

EXPLANATION OF REFERENCE

101: negative electrode active material, 102: film, 200: negative electrode, 201: negative electrode current collector, 202: negative electrode active material layer, 203: negative electrode active material, 204: conductive additive, 205: graphene, 250: positive electrode, 251: positive electrode current collector, 252: positive electrode active material layer, 253: positive electrode active material, 254: graphene, 300: lithium ion battery, 301: positive electrode can, 302: negative electrode can, 303: gasket, 304: positive electrode, 305: positive electrode current collector, 306: positive electrode active material layer, 307: negative electrode, 308: negative electrode current collector, 309: negative electrode active material layer, 310: separator, 400: lithium ion battery, 401: positive electrode current collector, 402: positive electrode active material layer, 403: positive electrode, 404: negative electrode current collector, 405: negative electrode active material layer, 406: negative electrode, 407: separator, 408: electrolyte solution, 409: exterior body, 500: lithium ion battery, 501: positive electrode cap, 502: battery can, 503: positive electrode terminal, 504: positive electrode, 505: separator, 506: negative electrode, 507: negative electrode terminal, 508: insulating plate, 509: insulating plate, 510: gasket (insulating packing), 511: PTC element, 512: safety valve mechanism, 600: display device, 601: housing, 602: display portion, 603: speaker portion, 604: power storage device, 610: lighting device, 611: housing, 612: light source, 613: power storage device, 614: ceiling, 615: wall, 616: floor, 617: window, 620: indoor unit, 621: housing, 622: ventilation duct, 623: power storage device, 624: outdoor unit, 630: electric refrigerator-freezer, 631: housing, 632: door for refrigerator, 633: door for freezer, 634: power storage device, 650: tablet terminal, 651: housing, 652: display portion, 652a: display portion, 652b: display portion, 653: switch for switching display modes, 654: power switch, 655: switch for switching to power-saving mode, 656: operation switch, 657a: region, 657b: region, 658: operation key, 659: button for switching to keyboard display, 660: solar cell, 670: charge and discharge control circuit, 671: battery, 672: DCDC converter, 673: converter, 680: electric vehicle, 681: battery, 682: control circuit, 683: driving device, 684: processing unit, 700: particulate graphite, 701: particulate graphite, 702: niobium oxide film, 703: particulate graphite, 704: carbon film, 705: niobium oxide film, 706: tungsten film, 780: glass substrate, 781: niobium oxide film, 782: carbon film, and 783: platinum film.

This application is based on Japanese Patent Application serial No. 2012-087116 filed with Japan Patent Office on Apr. 6, 2012, the entire contents of which are hereby incorporated by reference.

The invention claimed is:

1. A battery comprising:
   a plurality of laminated bodies enveloped in an exterior body, each of the plurality of laminated bodies comprising a sheet-shaped positive electrode and a sheet-shaped negative electrode with a sheet-shaped separator interposed therebetween,
   wherein at least one of the sheet-shaped negative electrodes comprises:
      a current collector; and
      an active material layer including a graphite particle and acetylene black,
   wherein the graphite particle is partly covered by an insulating film having a conductivity of a carrier ion,
   wherein the graphite particle has concavo-convex shape,
   wherein a concave portion of the graphite particle is covered by the insulating film, and
   wherein the current collectors of the sheet-shaped negative electrodes each have a tab region extending outside from the exterior body.

2. The battery according to claim 1, wherein the insulating film comprises $Nb_2O_5$.

3. The battery according to claim 1, wherein the insulating film comprises silicon oxide.

4. The battery according to claim 1, wherein the carrier ion is a lithium ion.

5. The battery according to claim 1, wherein the insulating film has a thickness of more than or equal to 5 nm and less than or equal to 50 nm.

6. The battery according to claim 1, wherein the battery is flexible.

7. The battery according to claim 1, wherein the battery is configured so that each of the plurality of laminated bodies is able to wholly exist in a planar shape in the exterior body.

8. The battery according to claim 1, wherein the exterior body comprises:
   a flexible metal thin film; and
   an insulating resin film over the flexible metal thin film, and
   wherein an inner surface of the exterior body comprises one of materials selected from a polyethylene, a polypropylene, a polycarbonate, an ionomer, and a polyamide.

* * * * *